(12) United States Patent
Archer et al.

(10) Patent No.: US 9,142,863 B2
(45) Date of Patent: Sep. 22, 2015

(54) NANOPARTICLE ORGANIC HYBRID MATERIALS (NOHMS) AND COMPOSITIONS AND USES OF NOHMS

(71) Applicant: Cornell University, Ithaca, NY (US)

(72) Inventors: Lynden A. Archer, Ithaca, NY (US); Laura Lynne Olenick, Canonsburg, PA (US); Jennifer Lyn Schaefer, Groton, NY (US); Alexandra Mirella Elena Corona, Westminster, CA (US); Daniel Kim, Ithaca, NY (US)

(73) Assignee: Cornell University, Ithaca, NY (US)

( * ) Notice: Subject to any disclaimer, the term of this patent is extended or adjusted under 35 U.S.C. 154(b) by 57 days.

(21) Appl. No.: 13/754,274

(22) Filed: Jan. 30, 2013

(65) Prior Publication Data

US 2013/0209893 A1    Aug. 15, 2013

Related U.S. Application Data

(63) Continuation-in-part of application No. 13/144,431, filed as application No. PCT/US2010/000089 on Jan. 15, 2010.

(60) Provisional application No. 61/193,984, filed on Jan. 15, 2009, provisional application No. 61/592,130, filed on Jan. 30, 2012.

(51) Int. Cl.
*H01M 10/02* (2006.01)
*H01M 4/60* (2006.01)
(Continued)

(52) U.S. Cl.
CPC ........ *H01M 10/0565* (2013.01); *C10M 111/06* (2013.01); *C10M 141/06* (2013.01);
(Continued)

(58) Field of Classification Search
CPC ........ H01M 4/60; H01M 4/36; H01M 4/602; H01M 4/604; H01M 10/052; H01M 10/0565; H01M 10/056; C10M 141/06; C10M 169/04; C10M 111/06
USPC ............. 429/189, 306, 317, 7; 508/144, 136, 508/107
See application file for complete search history.

(56) References Cited

U.S. PATENT DOCUMENTS

2002/0134006 A1* 9/2002 Malfer et al. ............... 44/424
2003/0170313 A1   9/2003 Prokop
(Continued)

FOREIGN PATENT DOCUMENTS

| CN | 101220128 A | 7/2008 |
| KR | 10-2008-0074410 | 8/2008 |
| WO | 2006/110166 | 10/2006 |

OTHER PUBLICATIONS

Robert Rodriguez et al: "Nanoscale Ionic Material", Advanced Materials, vol. 20, No. 22, pp. 4353-4358. Nov. 18, 2008.
(Continued)

*Primary Examiner* — Kenneth Douyette
(74) *Attorney, Agent, or Firm* — Hodgson Russ LLP

(57) ABSTRACT

A nanoparticle organic hybrid material (NOHM) containing an organic polymeric corona having a molecular weight in a range of 100-50,000 g/mol, wherein the organic polymeric corona is covalently attached to an inorganic nanoparticle core, wherein the NOHM exhibits liquid-like properties so that the NOHM moves freely and flows in a manner so that when the NOHM is in a container, the NOHM takes the shape of the container, and wherein the NOHM has a volume fraction (fc) of the inorganic particle ranging from about 0.05 to 0.75, methods of making the NOHMs, and compositions containing the NOHMs.

10 Claims, 40 Drawing Sheets

(51) Int. Cl.
*H01M 4/36* (2006.01)
*C10M 141/06* (2006.01)
*H01M 10/0565* (2010.01)
*H01M 10/052* (2010.01)
*H01M 10/056* (2010.01)
*C10M 169/04* (2006.01)
*C10M 111/06* (2006.01)

(52) U.S. Cl.
CPC .......... *C10M169/04* (2013.01); *H01M 10/052* (2013.01); *H01M 10/056* (2013.01); *C10M 2201/081* (2013.01); *C10M 2201/084* (2013.01); *C10M 2201/085* (2013.01); *C10M 2201/105* (2013.01); *C10M 2201/1053* (2013.01); *C10M 2205/0285* (2013.01); *C10M 2207/1253* (2013.01); *C10M 2209/104* (2013.01); *C10M 2209/108* (2013.01); *C10M 2209/1045* (2013.01); *C10M 2209/1085* (2013.01); *C10M 2219/044* (2013.01); *C10M 2227/08* (2013.01); *C10N 2210/01* (2013.01); *C10N 2220/021* (2013.01); *C10N 2220/028* (2013.01); *C10N 2230/06* (2013.01); *H01M 4/36* (2013.01); *H01M 4/60* (2013.01); *H01M 4/602* (2013.01); *H01M 4/604* (2013.01); *Y02E 60/122* (2013.01)

(56) References Cited

U.S. PATENT DOCUMENTS

2005/0058603 A1   3/2005   Gao et al.
2008/0075667 A1   3/2008   Berkland et al.
2008/0097280 A1   4/2008   Martin et al.
2008/0234149 A1   9/2008   Malshe et al.

OTHER PUBLICATIONS

Jyongsik Jang et al: "Synthesis and characterization of monodisperse silica-ployaniline core-shell nanoparticles", Chemical Communications, No. 15, p. 1622. Jan. 1, 2006.

Ivan Sondi et al: "Encapsulation of Nanosized Silica by in Situ Polymerization of tert-Butyl Acrylate Monomer +", Langmiur, vol. 16, No. 23, pp. 9031-9034. Nov. 1, 2000.

Lizhong Jiang et al: "Synthesis and characterization of stimuli-responsive poly(acrylic acid) grafted silica nanoparticles", Smart Materials and Structures, vol. 16, No. 6, pp. 2169-2174. Dec. 1, 2007.

"Ethomeen 18/25", Guide chem Chemical Tracking Guide, retrieved on Jul. 22, 2014 from http://www.guidechem.com/cas-266/26635-92-7.html.

* cited by examiner

NANOPARTICLE ORGANIC HYBRID MATERIALS (NOHMS) AND COMPOSITIONS AND USES OF NOHMS

CROSS-REFERENCE TO RELATED APPLICATIONS

The present application is a continuation-in-part of U.S. patent application Ser. No. 13/144,431, which is a U.S. National Stage application of PCT patent application no. PCT/US10/00089 filed on Jan. 15, 2010, that claims priority to U.S. provisional patent application No. 61/193,984 filed on Jan. 15, 2009, and the present application also claims priority to U.S. provisional patent No. 61/592,130, filed on Jan. 30, 2012, the disclosures of which are incorporated herein by reference.

FIELD OF THE INVENTION

The present invention relates to nanoparticle organic hybrid materials (NOHMs), methods of making NOHMs, and compositions containing NOHMs.

BACKGROUND OF THE INVENTION

Organic hybrid materials contain both organic and inorganic components. The presence of these organic and inorganic components impart some unusual properties to the materials (e.g., high modulus and high toughness; inherent flame retardance; enhanced gas barrier properties). As a result, organic hybrid materials have captured the interest of a number of industries. However, the manufacturing and use of organic hybrid materials present a number of challenges to the skilled artisan, as these materials often exhibit poor dispersion, miscibility, and interfacial strength between inorganic nanostructures and organic polymers.

The inventors of the present application have-discovered nanoscale organic hybrid materials which overcome these shortcomings.

SUMMARY OF THE INVENTION

A first embodiment of the invention is a nanoparticle organic hybrid material (NOHM), comprising an organic polymeric corona having a molecular weight in a range of 100-50,000 g/mol, wherein the organic polymeric corona is attached to an inorganic nanoparticle core, wherein the NOHM exhibits liquid-like properties so that the NOHM moves freely and flows in a manner so that when the NOHM is in a container the NOHM takes the shape of the container, and wherein the NOHM has a volume fraction $f_c$ of the inorganic particle ranging from about 0.05 to 0.75.

A second embodiment is a method for producing a NOHM, comprising attaching an organic polymeric corona having a molecular weight in a range of 100-50,000 g/mol to an inorganic polymeric corona to obtain a NOHM of the first embodiment.

A third embodiment of this invention is a composition comprising the NOHM of the first embodiment.

A "corona" as recited herein is an organic polymer.

The phrase "the order of magnitude" as recited herein means the critical molecular weight or degree of polymerization below a critical value can be estimated within a factor often.

A "star polymer" recited herein means a polymer with a chain architecture that is composed of at least several branched arms that are combined together through a single joint point or multiple joint points.

The term "hyper-branched polymer" recited herein means chain architectures with multiple branches jointed together in a compact but irregular way.

The term "comb" recited herein means a type of star polymer having chain architecture for a polymer with multiple branches equally distributed along a backbone.

A "dendrimer" as recited herein is a polymer that is branched. This tends to reduce intermolecular chain entanglement and crystallization.

The phrase "newtonian fluid" as recited herein means a fluid or dispersion whose rheological behavior is described by Newton's law of viscosity. Here shear stress is proportional to shear rate, with the proportionality constant being the viscosity.

Viscosity ('thickness') is the term that describes resistance to flow. High viscosity liquids are relatively immobile when subjected to shear (a force applied to make them move), whereas low viscosity fluids flow relatively easily. Measurement of viscosity, and other rheological properties, can be made using either capillary or rotational rheometers, the choice of system depending on the properties of the material being tested and the data required.

The term "shear" as recited herein means the rate of deformation of a fluid when subjected to a mechanical shearing stress.

A "shear stress" as recited herein means an applied force per unit area needed to produce deformation in a fluid.

The phrase "yield stress" as recited herein means the applied stress that must be exceeded in order to make a structured fluid flow. Approximate yield stress measurements can be gained by plotting the shear stress values for a range of shear rates, fitting a curve to the data, and extrapolating through the stress axis. The intersect on the stress axis provides the yield stress. An alternative method for obtaining yield stresses is to use a static vane-based test method. The vane is lowered into the undisturbed sample and then torqued slowly. The sample deforms elastically as the imposed stress increases until a yield stress is attained. At this point the sample starts to flow significantly and the measured stress falls from a peak.

A "random coil" as recited herein means a polymer conformation where the monomer subunits are oriented randomly while still being bonded to adjacent units. It is not one specific shape, but a statistical distribution of shapes for all the chains in a population of macromolecules. The conformation's name is derived from the idea that, in the absence of specific, stabilizing interactions, a polymer backbone will "sample" all possible conformations randomly. Many linear, unbranched homopolymers in solution or above their melting temperatures assume (approximate) random coils. Even copolymers with monomers of unequal length will distribute in random coils if the subunits lack any specific interactions. The parts of branched polymers may also assume random coils.

The phrase "self-solvated" as recited herein means a NOHM solution where no solvent is present.

A "monodisperse corona" as recited herein is an organic polymeric corona having a polydispersity index (PDI) less than 1.3.

A "polydisperse corona" as recited herein is an organic polymeric corona having a PDI greater than 1.3.

The "PDI" as recited herein is a measure of the distribution of molecular mass in a given polymer sample. The PDI calculated is the weight average molecular weight divided by the number average molecular weight. It indicates the distribution of individual molecular masses in a batch of polymers. The PDI has a value equal to or greater than 1, but as the polymer chains approach uniform chain length, the PDI approaches unity. For some natural polymers PDI is almost taken as unity. The PDI from polymerization is often denoted as:

$$PDI = M_w/M_n$$

In one aspect of this embodiment, the phrase "high grafting density" as recited herein means that organic polymeric coronas are attached to an inorganic nanoparticle core in a range of 1 to 10 molecules per square nanometer, and preferably 1 to 5 molecules per square nanometers.

"Bulk polymerization" as recited herein means the formation of polymer from substantially undiluted monomers. Incidental amounts of solvents, coalescents, plasticizers and/or water may also be present. Further description is given in "Bulk Polymerization", *Encyclopedia of Polymer Science and Engineering*, Vol. 2, pp. 500-514 (1989), the disclosure of which is incorporated herein by reference.

"Solution polymerization" as recited herein means a polymerization technique in which both the monomers and resultant polymer are substantially soluble in a diluent (e.g., organic solvents, coalescents, plasticizers and/or water) that is also present. It is described in "Solution Polymerization", *Encyclopedia of Polymer Science and Engineering*, Vol. 15, pp. 402-418, (1989), the disclosure of which is incorporated herein by reference.

"Dispersion polymerization" as recited herein means a polymerization technique in which polymerization of the monomers is at least initially carried out by bulk or solution polymerization, with the reaction system thereafter being emulsified or dispersed in an aqueous medium. It includes polymerization reactions in which polymerization is carried out to substantial or total completion before the bulk or solution polymerization system is dispersed in the aqueous medium.

"Emulsion polymerization" as recited herein means a polymerization technique in which the monomers are emulsified in an aqueous medium containing a water-soluble initiator. Polymerization occurs predominantly in micelles formed by surfactant and not in the initially formed monomer droplets. The latter serve merely as a reservoir of monomers which diffuse out to find micelles and swell them. This mechanism produces polymer particles which are significantly smaller than original monomer droplets.

The "molecular weight" as recited herein can be determined by using gel permeation chromatography (GPC) with a polystyrene standard.

DETAILED DESCRIPTION OF THE INVENTION

Figure 1:
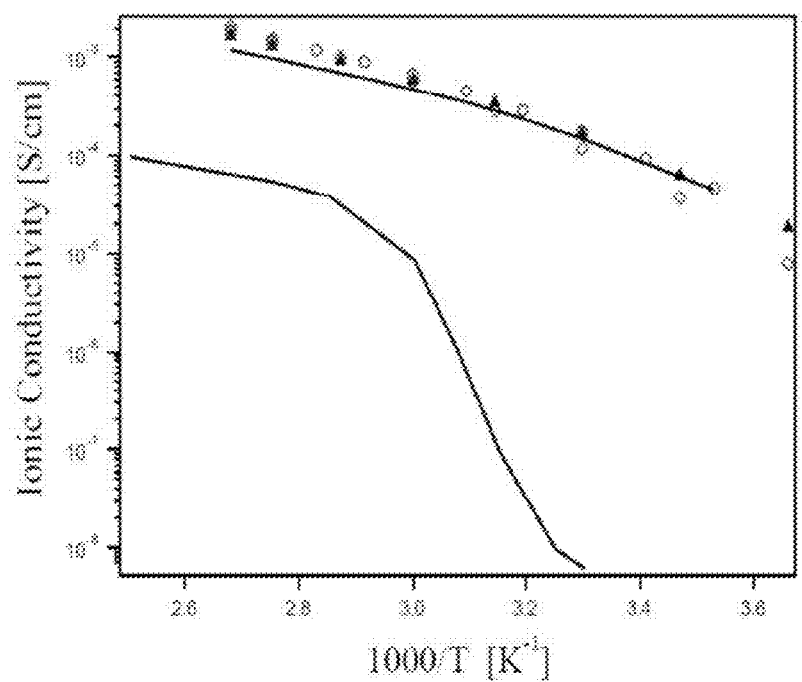
FIG. 1 shows the ionic conductivities of NOHMs and polymer electrolytes as a function of reciprocal temperature. Circles fc=0.2, triangle fc=0.28, diamond fc=0.35.

We turn now to the first embodiment.

A feature of this embodiment is a nanoparticle organic hybrid material (NOHM), comprising an organic polymeric corona or arm having a molecular weight in a range of 100-50,000 g/mol, wherein the organic polymeric corona is attached to an inorganic nanoparticle core. The NOHMs have a volume fraction ($f_c$) of the inorganic particle ranging from about 0.05 to 0.74. The NOHMs exhibit liquid-like properties so that the NOHM moves freely and flows in a manner so that when the NOHM is in a container the NOHM takes the shape of the container in the absence of a suspending solvent. In other words, NOHMS are in the form of a self-suspended, suspension, wherein the particles are loose and can form a distinct surface at the boundaries of its bulk material. A force equal to or slightly greater than the yield stress is optionally applied when NOHMs are placed in the container so that the NOHMs takes the shape of the container.

The organic polymeric coronas are comprised of a single polymer segment or may include multiple blocks from different monomers. In other words, the organic polymeric coronas of the present invention are homopolymers and copolymers. The organic polymeric corona is a linear, branched, hyper-branched, or comb polymer.

Examples of polymeric materials useful for the organic polymeric coronas include, by way of example and without limitation, polyethers, polyesters, polyamides, polysiloxanes, polysulfides, polysulfonates, polysulfonamides, poly (thiol ester)s, polyamines, and the like. Preferred organic polymeric coronas are ethylene carbonate (EC), propylene carbonate (PC), cis-1,4-isoprene (PI), ethylene vinyl acetate (EVA), poly vinyl chloride (PVC), poly(ethylene glycol) (PEG), poly(ethylene oxide) (PEO), polyoxyethylene (POE), polydimethylsiloxane (PDMS), poly-alpha-olefin (PAO), polyvinylidene fluoride (PVDF), PEG-PS diblock copolymer, or a combination thereof. The organic polymeric coronas have a molecular weight in one of the following ranges 100-50,000 g/mol; 100-20,000 g/mol; 100-10,000 g/mol; 100-5,000 g/mol; 250-7,500 g/mol; 500-7,500 g/mol; 500-5,000 g/mol; 250-2,500 g/mol; 250-1,500 g/mol; and 100-2,500 g/mol. These organic polymeric coronas preferably have a molecular weight of 100-1,000 g/mol.

In one aspect of this embodiment, at least two different organic polymeric coronas are tethered to an inorganic nanoparticle core of a NOHM. The NOHM comprises a first organic polymeric corona and a second organic polymeric corona. For example, the first organic polymeric corona is selected from the group consisting of EVA, PVC, PEG, PEO, POE, PDMS, PAO, and PVDF and the second organic polymeric corona is selected from the group consisting of EVA, PVC, PEG, PEO, POE, PDMS, PAO, and PVDF. In yet another example, an inorganic nanoparticle core of a NOHM is tethered to a first organic polymeric corona composed of PEG and a second organic polymeric corona composed of PEO. These types of NOHMs still exhibit liquid-like so that the NOHM moves freely and flows in a manner so that when the NOHM is in a container, the NOHM takes the shape of the container in the absence of a suspending solvent, as discussed above.

The number of organic polymeric arms attached to the inorganic nanoparticle core chains can vary from 1-750, 1-250, 250-750, 250-700, 350-700, or 375-675.

In another feature, the end groups of the organic polymeric coronas are functionalized. Examples of functionalized groups on the organic polymeric coronas are nitroxy, alkene, alkyne, epoxy, ethylene oxide, chloride, bromide, amine, sulfonic acid, hydroxyl carboxyl, anhydride, fluorine, sulfonate esters, amino, hydrazido, mercpato, carbonate, carbamate, chlormate, cyanuryl chloride, epoxide, aldeyhde, or siloxane (See e.g., see Zalipsky, Functionalized Poly(ethylene glycol) for Preparation of Biologically Relevant Conjugates, *Bioconjugate Chem* 9. 195, 6, 150-165, the entirety of which is hereby incorporated by reference. The organic polymeric coronas are functionalized to impart certain properties to the NOHM, and/or to carry out further chemical reactions.

The organic polymeric coronas of the NOHMs are tethered to an inorganic nanoparticle core and are produced as discussed in detail below. An one aspect of this embodiment is that the NOHMs do not contain any ionic bonds and the organic polymeric coronas are covalently attached to the inorganic nanoparticle cores.

A variety of inorganic nanoparticles can be used for the core. A nanoparticle is a small object that behaves as a whole unit in terms of its transport and properties. Nanoparticles generally measure in at least one dimension between 1-1,000 nanometers (nm), preferably 1-500 nm, and more preferably 1-100 nm. Nanoparticles have a very high surface area to volume ratio that provides numerous opportunities to attach organic polymeric coronas on the surface of the nanoparticles. Extensive libraries of nanoparticles, composed of an assortment of different sizes, shapes, and materials, and with various chemical and surface properties, have been constructed. In this regard, a variety of nanoparticles can be used as cores, including multi-lobed nanoparticles, conductive nanoparticles, hollow nanoparticles, quantum dots, nanocrystals, magnetic nanoparticles, metal nanoparticles, metal oxide nanoparticles, and nanorods.

The nanoparticles are selected from a variety of materials including those selected from the group consisting of metal oxide (e.g., $SiO_2$, $SnO_2$, $Fe_2O_3$, $Fe_3O_4$, $Co_3O_4$, MgO, SrO, BaO, CaO, $TiO_2$, $ZrO_2$, FeO, $V_2O_3$, $V_2O_3$, $Mn_2O_3$, NiO, CuO, $Al_2O_3$, $SiO_2$, ZnO, $Ag_2O$), and metals (e.g., Y, Zr, La, Ce, Mg, Sr, Ba, Ca, Ti, Zr, Fe, V, V, Mn, Fe, Ni, Cu, Al, Si, Zn, Ag, Au, Co), and metal salts. Metal oxides includes both oxides, metal hydroxides, metal hydrated oxides, metal oxohydroxides, or metal oxoperoxohydroxides. This also includes precursor materials such as nitrates, carbonates and acetates which can be converted to their corresponding metal oxides by heat treatment.

In another aspect of this invention, the inorganic nanoparticle cores comprise 5-74%; 50-74%; 5-50%; 10-35%; 5-25%; and 10-25% by volume of the NOHM. NOHMS having high inorganic nanoparticle core contents display properties similar to glasses, stiff waxes, and gels. NOHMs having low inorganic nanoparticle core contents generally form particle-based neat fluids, characterized by transport properties (viscosity, ionic conductivity) similar to Newtonian liquids comprised of molecular building-blocks. This conductivity is measured from the dielectric loss using a dielectric spectrometer and the viscosity is measured using a rheometer or viscometer.

In this regard, another feature of this embodiment is that the NOHMs have a volume fraction (fc) of the inorganic nanoparticle core greater than 0.05, 0.1, 0.2, or 0.3. In another feature of this embodiment, the NOHMs have a fc of the inorganic particle ranging from about 0.05 to 0.74, preferably 0.1 to 0.62, more preferably greater than 0.1 to and less than 0.52, and even more preferably 0.1 to 0.5. In NOHMs having a fc greater than 0.1, the cores begin to percolate (i.e. exhibit connectivity/cooperativity) up the macroscopic scale, but aggregation of the cores is inhibited by the tethered organic polymeric corona.

The effects of volume fraction on viscosity are described using the Krieger-Dougherty equation:

$$\frac{\eta}{\eta_{medium}} = \left(1 - \frac{\phi}{\phi_m}\right)^{-[\eta]\phi_m}$$

where $\eta$ is the viscosity of the suspension, $\eta_{medium}$ is the viscosity of the base medium, $\phi$ is the volume fraction of solids in the suspension, $\phi_m$ is the maximum volume fraction of solids in the suspension and $[\eta]$ in the intrinsic viscosity of the medium, which is 2.5 for spheres. This correlation shows a general increase in viscosity with increasing volume fraction. As the volume fraction of solids in the system goes up: the particles generally become more closely packed together; it becomes more difficult for them to move freely; particle-particle interactions increase; and resistance to flow (viscosity) rises. As the volume fraction nears maximum for the sample, viscosity rises very steeply.

In another aspect of this embodiment, the random-coil size of the organic polymeric coronas is the same size or within 10%, preferably 5% and more preferably within 2.5% of a diameter of the inorganic nanoparticle core. When the random-coil size of the tethered oligomers (corona) are of a comparable size to a diameter of the inorganic nanoparticle core, NOHMs manifest excellent stability against aggregation and exhibit rheological features characteristic of a soft-glassy solid.

NOHMs of this embodiment exhibit unusual physical properties, e.g., high mechanical modulus, hardness, lithium intercalation efficiency, high refractive index, large heat capacity, high electrical/thermal conductivity, normally only seen in inorganic materials and exert a measurable influence upon the behavior of the NOHM or a composition comprising the NOHM.

We turn now to the second embodiment

A second embodiment is a method for producing, comprising attaching an organic polymeric corona having a molecular weight in a range of 100-50,000 g/mol to an inorganic polymeric corona to obtain a NOHM of the first embodiment. In one feature of this embodiment, the organic polymeric corona is attached to the inorganic nanoparticles core via a covalent bond and the NOHM does not contain any ionic bonds.

The organic polymeric coronas used in accordance with this embodiment can be produced by a variety of techniques known to those skilled in the art, including bulk, solution, dispersion, emulsion, condensation, anionic, free-radical and living radical polymerizations (e.g., see Morrison and Boyd, Organic Chemistry, the entirety of which is incorporated by reference).

Likewise, the NOHMs of the first embodiment can be produced by a variety of techniques known to those skilled in the art.

One approach for producing the NOHMs of the first embodiment is the "graft-to" methodology, which involves the reaction of pre-synthesized polymer molecules of controlled molecular weight (i.e., a molecular weight of 100-50,000 g/mol) bearing reactive groups at one or both ends of the chain with complementary functional groups naturally present on or introduced onto the core (see e.g., Jang, J.; Ha, J.; Kim, B., Synthesis and characterization of monodisperse silica-polyaniline core-shell nanoparticles. *Chemical Communications* 2006, 1622-1624).

In this approach, sterics play an important role in the graft density of the polymer on the core. For example, a polymer with a high molecular weight may only be able to attach to a few places on the core before the sterics of the molecules block any further reactions. In this regard, the use of organic polymeric coronas having a low molecular weight (e.g., 100-50,000 g/mol) and as discussed above is preferable as such organic polymeric coronas will not be affected as much by the sterics of the molecules and will exhibit a higher graft density than an organic polymeric corona having a higher molecular weight. The main benefit to this approach is the ability to synthesize the polymer to a low polydispersity index (PDI). Another benefit is the control over the molecular weight of the polymer which can be exercised.

For example, NOHMs are produced by dispersing a reactive polymer and an inorganic nanoparticle within the same solution. For example, organic polyether polymers containing a terminal reactive functional group (e.g., alkoxysilane-PEG-OH, alkoxysilane-PEG-epoxide) are dissolved in water to form a dilute polymer solution. The precursor core particles, stored in the form of an aqueous suspension stabilized by dissociable cations (e.g., $Na^+$ or $NH_4^+$) is diluted with an aqueous solution. Temporary hydrogen bonds are created between the organic polymer and hydroxyl groups that have formed at the surface of the inorganic nanoparticle. The temporary bonds can then be cured between the inorganic nanoparticle core and organic polymeric corona, resulting in permanent covalent bonds (e.g., see example 1).

Scheme 1 illustrates this approach as follows:

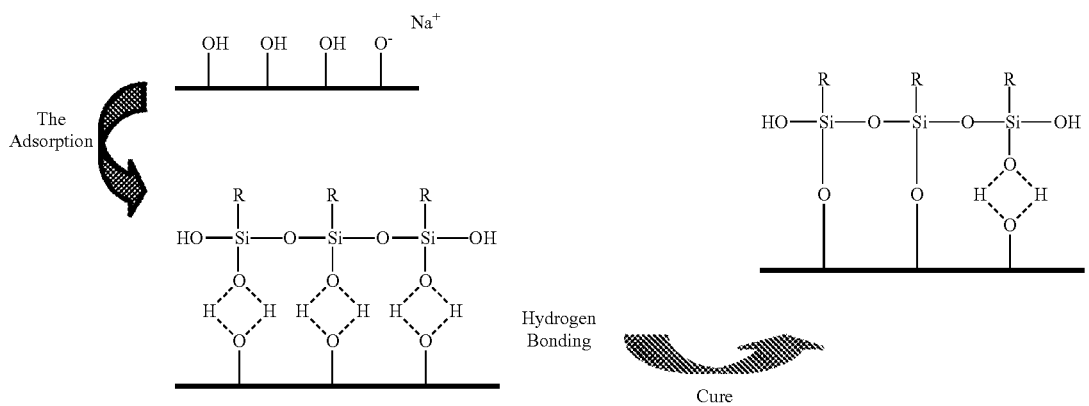

Krieger-Dougherty model as discussed above is used to predict the solubility of the NOHMs. The ability to predict the relative viscosity of NOHMs using this straightforward extension of the Krieger-Dougherty suspension model confirms that NOHMs are self-suspended, sterically-stabilized suspensions of nanoparticles.

Another approach for producing NOHMs of the first embodiment is the "grow from" approach as discussed in Matyjaszewski et al., Atom Tranfer Radical *Polymerization. Chemical Reviews* 2001, 101, 2921-2990. Zhang, et al., Synthesis and Characterization of Polymer Brushes Containing Metal Nanoparticles, *Polymer Bulletin,* 57, 253-259 (2006).

In this approach, the inorganic core is first reacted with a small molecule initiator. This initiator is able to bind to the core with a higher graft density than a functionalized polymer. The core-initiator molecule is then used as an initiator for controlled living polymerization (CLP). The CLP process utilized is preferably atom transfer radical polymerization (ATRP) as described by Zhang et al., Synthesis and Characterization of Polymer Brushes Containing Metal Nanoparticles. *Polymer Bulletin*, 57, 253-259, (2006).

Yet another benefit of using ATRP over other living radical polymerizations is that the use of the catalyst (e.g., the 2-bromoisobutyrl bromide, CuBr/tris[2-pyridyl)meth]/amine or CuB/tris[2-pyridyl)ethl]amine) inhibit biomolecular termination events, whereby each monomer to the propagating species is "capped" with a halogen atom that has been transferred from the catalyst. This capping, which is reversible, assures that the propagating radical species will not interact with each other, terminating the reaction. The deactivation of the propagating species allows for more control over molecular weights and molecular weight dispersities (see Kamigaito, M.; Ando, T.; Sawamoto, M., Metal-Catalyzed Living Radical Polymerization. *Chemical Reviews* 2001, 101, 3689-3745).

ATRP has been used to polymerize a variety of monomers, such as ethacrylates, acrylates, styrenes, acrylonitrile, dienes, acrylamides, methylacrylamides as discussed in Matyjaszewski et al., Atom Tranfer Radical Polymerization. *Chemical Reviews*, 101, 2921-2990, (2001), the entirety of which is hereby incorporated by reference. The catalyst system, which includes a halogenated metal coupled with a ligand, is tailored to fit these monomers. In choosing the appropriate catalytic system, the monomer, polymer solubility, halogenated metal solubility, the redox potential of the catalyst system, and the activity of the carbon-halogen bond in the initiator and monomer are all considered. For a catalyst system to be effective, the lower oxidation state of the metal center should be more stable than the higher oxidation state so that there exists a low concentration of the radical species (see e.g., Kamigaito, M.; Ando, T.; Sawamoto, M., Metal-Catalyzed Living Radical Polymerization. *Chemical Reviews* 2001, 101, 3689-3745).

Polymerization rates and molecular weight dispersities are also improved by additives and the use of additives should be taken into account if the needed catalytic system for the chosen monomer does not produce the desired result. For example, the additive, $Al(Oi-Pr)_3$, has been used to stabilize higher oxidation states of the metal complex to aid in the radical generation from a dormant species as disclosed in Ando, T.; Kamigaito, M.; Sawamoto, M., Metal Alkoxides as Additives for Ruthenium(II)—Catalyzed Living Radical Polymerization. *Macromolecules* 2000, 33, (18), 6732-6737.

We turn now to the third embodiment.

A feature of this embodiment is a composition containing the NOHMs of the first embodiment. The NOHMs are present in the composition alone or in combination with other components. In other words, there are applications for these NOHMs, where no additional components are needed. For example, as discussed in more detail below, NOHMs have been developed by the inventors of the present application that can be used as a lubricant without having to add any additional components.

In another feature of this embodiment, at least two different NOHMs are combined to form a composition. The at least two different NOHMs have different organic polymeric coronas and/or inorganic nanoparticle cores. For example, a first NOHM contains an organic polymeric corona that is different from the second NOHM. The organic polymeric corona of the first NOHM is preferably is selected from the group consisting of EVA, PVC, PEG, PEO, POE, PDMS, PAO, and PVDF and the organic polymeric corona of the second NOHM is selected from the group consisting of EVA, PVC, PEG, PEO, POE, PDMS, PAO, and PVDF. Despite each NOHM having a different organic polymeric corona, the NOHMs are miscible and the composition exhibits liquid-like properties so that the NOHMs move freely and flow in a manner so that when the NOHMs are in a container, the NOHMs take the shape of the container. The addition of a suspending solvent is optional.

NOHMs exhibit features of synthetic polymers (e.g., low density, low cost, and facile low-temperature processing), along with unusual functionalities (e.g., mechanical strength, high refractive index, lithium ion intercalation, thermal/electrical conductivity, photovoltaic properties) typical of inorganic materials.

In this regard, NOHMs are useful for a wide range of applications, such as lubricants, personal care products (e.g., sunscreens), adhesives formulations, ferrofluids, paints, coatings, LIB electrodes, electrolytes for rechargeable batteries, electrolytes for fuel cells, shear-thickening coatings, and adhesive formulations. For example, the addition of NOHMs to a composition is desirable, wherein the covalent attachment of the suspending media to particle cores reinforces the mechanical properties of the polymer corona; and suggests that the vapor pressures of the liquids are low, facilitating high temperature operations without the need for expensive packaging/sealing.

In yet another aspect of this invention, NOHMs are able to behave as a fluid in part because the effective solvent (e.g., organic polymeric corona) is chemically tethered to the inorganic nanoparticle core. As a result, the vapor pressures of NOHMs liquids tend to be negligible.

This feature generally makes NOHMS suitable for high temperature applications (e.g., as lubricants, heat transfer liquids for solar thermal cells, and rechargeable battery electrolytes/electrodes), where colloidal suspensions either cannot be used or require specialized packaging designs to inhibit solvent loss. A high temperature application is an application that utilizes temperatures from 250 to 600° F., and preferably 300 to 500° F.

In one aspect of this embodiment, NOHMs are produced that exhibit large ion mobilities and high mechanical moduli (e.g., NOHMs as an electrolyte); low viscosity and high thermal conductivity (e.g., NOHMs as a lubricant); high moduli and shear thickening rheology (e.g., NOHMs as a coatings and stable liquid body armor); phase change capability and high heat transfer (e.g., NOHMs as an electrolyte). These properties are obtained by manipulating/varying the geometric and steric characteristics of the inorganic core particle and organic polymeric corona.

A preferred feature is that the NOHMs of the invention can be used to produce an electrolyte in light of the remarks that follow. Reliable, cost-effective technologies for efficiently storing and retrieving electric power have long been recognized as the limiting factor in portable technology development. Currently, rechargeable batteries are the technology of choice, but even the best systems are expensive, accident-prone, cumbersome, and suffer from gradual loss of capacity over time; there exists a need for a safe, reliable battery with higher energy density and sufficient recharge rates. Lithium is the lightest and most electropositive metal, thus rechargeable batteries based on lithium anodes offer the potential for exceptional energy storage capabilities in a light-weight platform (see Linden, D.; Reddy, T. B. *Handbook of Batteries*, $3^{rd}$ Ed., McGraw-Hill, New York (1995)). Lithium is also more abundant and cheaper than Ni—its primary competitor for high energy density rechargeable batteries. Rechargeable lithium metal batteries generally suffer from two main problems that mitigate the advantages outlined in the previous section. First, electrochemically-induced lithium dendrite growth during charge/discharge cycles produces internal short circuits, which are a fire/explosion hazard. Second, lithium metal dendrites generated over multiple charge/discharge cycles form a high surface area mossy film at the lithium anode that reacts with many electrolytes to deplete lithium metal from the battery. Prior to the present invention, a common solution was to use a three- to four-fold excess of lithium metal in the anode to minimize loss of storage capacity (fading) over time (see Linden, D.; Reddy, T. B. *Handbook of Batteries*, 3rd Ed., McGraw-Hill, New York (1995)).

Another solution was to also use solid polyethylene oxide (PEO/PEG) electrolytes. Lithium metal reacts minimally with PEO/PEG, so that capacity fading is also avoided in lithium batteries employing solid polymer electrolytes. A draw-back of based on solid polymer electrolytes, however, is that the internal resistance is high at Normal operating temperatures. A direct consequence is that the discharge rate of lithium polymer batteries are as a rule low (i.e. a 2-3× oversized battery is required to deliver the power needed for fast acceleration in electric vehicles). The battery also had to be operated at elevated temperatures to achieve sufficient current flow. It is not unusual for these types of batteries to have to operate at temperatures above the melting point of the solid electrolytes (e.g., above 60° C. for PEO/PEG electrolytes). Both deficiencies of lithium polymer batteries can be easily traced to the low ionic conductivity of the solid electrolyte.

The NOHMs of the first embodiment can be used as conductive liquid electrolytes that are un-reactive with lithium, possess high ionic conductivities at ambient temperatures, and provide a complex pathway that can be used to dramatically slowdown/eliminate dendrite growth between battery electrodes. Specifically, because the volume fraction of inorganic nanoparticle cores in the NOHMs is high, dendrites may only grow in the confined pathways offered by the organic polymeric corona chains. Because the organic polymer corona chains are short and their coverage on the cores high, transport of lithium ions will be unaffected, leading to high ionic conductivities.

In one aspect of this invention, the NOHMS are doped with a lithium salt selected from the group consisting of $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiB(CF_3SO_2)_2$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, $LiCF_3CO_3$, $NaClO_3$, $NaSCN$, $KBF_4$, $Mg(ClO_4)_2$, and $Mg(BF_4)_2$. The NOHMS are preferably doped with $LiClO_4$, $LiPF_6$, $LiCF_3SO_3$, $LiAsF_6$, or $LiN(CF_3SO_2)_2$ and the inorganic nanoparticle cores are preferably selected from the group consisting of $TiO_2$, $SiO_2$, $SnO_2$, $Fe_2O_3$, $Fe_3O_4$, and $Co_3O_4$.

The electrolytes can be formed via two routes: sulfonic acid functionalization of the silica nanoparticle suspension followed by reaction with an amine terminated polyethylene glycol methyl ether as set forth in scheme 2 (see pathways 1 and 2) and direct reaction of a trimethoxysilane functionalized polyethylene glycol methyl ether with nanoparticle suspensions of either silica or titania (see pathway 3).

Scheme 2 is as follows:

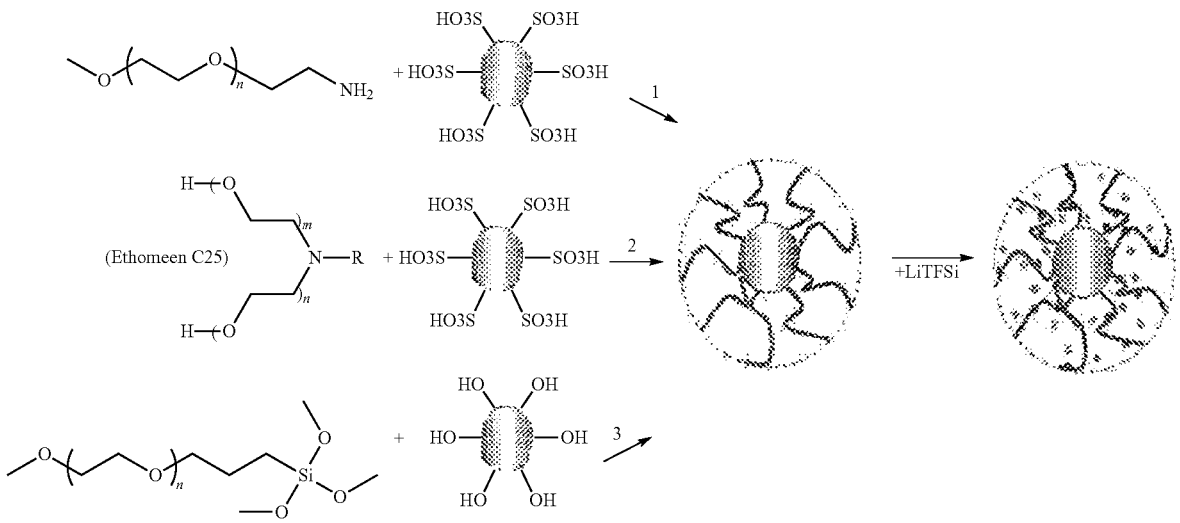

After synthesis, the hybrids are mixed with a lithium salt to form an electrolyte of lithium salt (e.g., 1M-3M) in the organic phase. Both synthetic routes yielded electrolytes with uniformly disperse nanoparticle cores.

NOHMs constructed from hard inorganic particles and corona with good lithium ion conductivities (e.g., $LiClO_4$, $LiPF_6$, $LiCF_3SO_3$, $LiAsF_6$, or $LiN(CF_3SO_2)_2$— doped PEG oligomers with $M_w$<10000 g/mol), novel room-temperature liquid electrolytes capable of arresting harmful dendrite growth in rechargeable lithium metal batteries can be created. Additional control over NOHMs physical properties can be achieved by exploiting a large library of available inorganic particle chemistries and shapes (liquid NOHMs based on $SiO_2$, $SnO_2$, $\gamma$—$Fe_2O_3$, $Fe_3O_4$, and $Co_3O_4$ nanocores have already been demonstrated).

FIG. 1 is an Arrehenius temperature plot summarizing ionic conductivities of $SiO_2$—PEG NOHMs (symbols) with varying core particle volume fractions ($f_c$). Conductivities for currently used solid-PEO electrolytes (broken line) and the untethered PEG corona used to create a NOHM electrolyte are presented for comparison. $LiClO_4$ salt is used as the ionic dopant. It is evident from FIG. 1 that the ionic conductivities for these PEG-based NOHMs are only weakly dependent on the temperature and volume fraction of the NOHMs. FIG. 1 also shows that the ionic conductivities of the NOHMs liquids are generally comparable to those of the oligomeric PEG corona (continuous line) over the entire range of temperatures studied.

FIG. 1 further shows that ionic conductivities of the $SiO_2$— PEG NOHMs electrolytes can exceed those of solid-PEO electrolyte by amounts ranging from 1 to nearly 5 orders of magnitude, depending on the temperature. The fact that these large improvements in ionic conductivity are achieved in materials with comparable or better thermal, mechanical, and viscous properties evidences that electrolytes comprising NOHMs of the first embodiment exhibit a number of desirable properties. It is also noteworthy that NOHMs electrolytes represented by the filled triangles in FIG. 1 are large enough that these materials manifest a yield stress. This means that at low stresses they will resist deformation in an analogous manner to a solid. At higher stresses they flow like liquids. Together these features mean that by varying the $f_c$ of the NOHMs, an electrolyte is obtained that is capable of inhibiting arrest growth of lithium dendrites.

Based on rheological and ionic conductivity measurements employing NOHMs with a range of fc values, NOHMs employing a lithium ion conducting polymer, e.g., PEG or PVDF, are preferred for use as electrolytes. NOHMs having a fc in the range $0.1 < fc < 0.5$ are also preferred. Thus, an aspect of this embodiment is a functional room-temperature electrolyte (i.e. ionic conductivity $>10^{-4}$ S/cm at 25° C.). In NOHMs having a $f_c$ less than 0.1, the mechanical properties of these materials do not limit dendrite growth as well. Likewise, while it is possible to create NOHMs having $f_c > 0.5$, which can completely localize dendrites to the region around the Li anode, the conductivity of these materials are not as desirable.

The preferred overall volume fraction of the inorganic nanoparticle cores (i.e. based on the volume of the inorganic nanoparticle core relative to corona and plasticizing electrolytes) of NOHMs is also in a range of about 0.1 to about 0.5, where both the conductivities and mechanical properties of the electrolytes are suitable for lithium battery applications.

In yet another aspect of this embodiment, provided are compositions that can be used as electrolytes comprising a plurality of organic-hybrid silica nanoparticles. In an embodiment, the compositions comprise a) a plurality of organic-hybrid silica nanoparticles, the individual nanoparticles comprising a silica core and an organic polymeric corona comprising polyethylene glycol methyl ether polymer chains with average molecular weight of 88 g/mol to 10,000 g/mol, including all integer g/mol values and ranges therebetween, the individual polymer chains of the organic polymeric corona bonded to the silica core; b) a lithium salt; and c) a carrier selected from the group consisting of oligomeric ethylene glycol dimethyl ether, propylene carbonate, where the organic-hybrid silica nanoparticles and lithium salt are dispersed in the carrier.

In an embodiment of this aspect, the electrolyte composition comprises: a) a plurality of organic-hybrid silica nanoparticles, the individual nanoparticles comprising a silica core and an organic polymeric corona comprising individual polyethylene glycol methyl ether polymer chains with average molecular weight of 88 g/mol to 10,000 g/mol, including all integer g/mol values and ranges therebetween, the individual polymer chains of the organic polymeric corona bonded to the silica core; b) a first lithium salt bonded to the silica core; c) a carrier selected from the group consisting of oligomeric ethylene glycol dimethyl ether, propylene carbonate, ethylene carbonate, trimethylene carbonate, 1,3-dioxalane, and combinations thereof; and d) a second lithium salt not bonded to the particle, where the organic-hybrid silica nanoparticles and second lithium salt are dispersed in the carrier.

In this aspect, the organic-hybrid silica nanoparticles are present at 0.1% by weight to 70% by weight, including all integer % by weight values and ranges therebetween. The first lithium salt is present at 0.1% by weight to 20% by weight, including all integer % by weight values and ranges therebetween. The second lithium salt is present at 0.1% by weight to 20% by weight, including all integer % by weight values and ranges therebetween. For example, the carrier is oligomeric ethylene glycol dimethyl ether having a molecular weight ($M_w$) of 88 g/mol to 10000 g/mol, including all integer % by weight values and ranges therebetween.

In this aspect, the organic-hybrid silica nanoparticles have at least one tethered lithium salt (i.e., the first lithium salt). An anionic moiety (e.g., $-SO^{3-}$, $-SO_4^{-2}$, $-CF_3SO^{3-}$, $-C(SO_2CF_3)^{3-}$, $-(CF_3SO_2)_2N^-$, $-(C_2F_5SO_2)_2N^-$, $SO_3C_2F_5^-$, $-B(SO_2CF_3)^{2-}$, $-CH(SO_2CF_3)^{2-}$, $-C(CH_3)(SO_2CF_3)^{2-}$, $-ClO^{4-}$, $-BF^{4-}$, $-OH^-$, $-AsO_4^{-3}$, $-PF^{6-}$, $-PO_3^{-4}$, $-NO_3^-$, $-(COO)_2^{2-}$, and $-RCOO^-$, where R is an alkyl group) is tethered to the silica nanoparticle surface by a covalent bond such that at least one lithium cation can be ionically bonded to the anionic moiety. For example, the anionic moiety is covalently bonded to an alkyl moiety covalently bonded to the silica nanoparticle surface. Such a tethered anionic moiety can be synthesized by condensation of a silane comprising one or more anionic moieties covalently bound to the silane (e.g., (3-trihydroxysilyl)-propane sulfonic acid)) with a nanoscale silica particle. For example, a diprotic or polyprotic sulfonic acid (such as ethane disulfonic acid or polystyrene sulfonic acid) or a polymer (degree of polymerization—n, based on a repeat unit that contains any of the anions above can be used to produce n-protic forms of the corresponding tethered anions. The density of anions can be from 0.01 to 5 molecules/nm$^2$, including all values to 0.01 molecules/nm$^2$ and ranges therebetween. The second lithium salt is a free lithium salt that is not bonded to the particle and is dispersed in the carrier.

Examples of suitable lithium salts (e.g., the first lithium salt and/or second lithium salt) include $LiSO_3$, $Li_3PO_4$, $LiSO_3CF_3$, $LiN(SO_2CF_3)_2$, $LiC(SO_2CF_3)_3$, $LiC(CH_3)(SO_2CF_3)_2$, $LiCH(SO_2CF_3)_2$, $LiCH_2(SO_2CF_3)$, $Li\,SO_3C_2F_5$, $LiN(SO_2C_2F_5)_2$, $LiB(SO_2CF_3)_2$, LiCl, LiBr, LiI, LiF, $LiPF_6$, $LiClO_4$, $LiBF_4$, LiSCN, $LiAsF_6$, $Li\,CO_3CF_3$. Combination of lithium salts can be used. The first and second lithium salts can be the same or different.

The composition of these electrolyte compositions can vary. The organic-hybrid silica nanoparticles may be present at 0.1% by weight to 70% by weight, including all integer % by weight values and ranges therebetween. The tethered lithium salt may be present at 0.1% by weight to 20% by weight, including all integer % by weight values and ranges therebetween. The free lithium salt may be present at 0.1% by weight to 20% by weight, including all integer % by weight values and ranges therebetween.

The composition can be used in a method for conducting an electric current. For example, the method of conducting an electric current comprises disposing the composition between an anode and a cathode (e.g., an anode or cathode of a rechargeable battery) such that a current flows between them, where the composition is in electrical contact with the anode and cathode. The composition can be present in device. For example, the composition can be used in a rechargeable battery (e.g., a rechargeable battery as described herein), a rechargeable lithium battery that has metallic lithium in the anode, a rechargeable lithium ion battery that uses carbon or a metal oxide as the anode, a rechargeable sodium battery that uses metallic sodium in the anode, a rechargeable aluminum battery that uses metallic aluminum in the anode).

A feature of this embodiment is a rechargeable battery, comprising: (i) an electrolyte as discussed above, (ii) a lithium metal anode, and (iii) a cathode (see Xu, Nonaqueous Liquid Electrolytes for Lithium-based Reachargeable Batteries, *Chem Review,* 104, 4303-4417 (2004), the entirety of which is incorporated by reference). A separator is not required.

Another feature of this embodiment is that the NOHMs of the first embodiment can be used alone or in combination with other components as a lubricant. Lubricants with dielectric properties that match those of the components they lubricate, and which possess high mechanical moduli and good thermal conductivity are often needed to operate high-performance machinery and aircraft. Prior to the present invention, these requirements have been met by dispersing conducting particles such as, $SiO_2$, $TiO_2$, $Al_2O_3$, $Fe_3O_4$, Ag, Cu, or graphite, in organic lubricating oils and greases. The introduction of nanometer sized particles has also been attempted, but aggregation between the surface-area particles has limited use of these materials.

A lubricant comprising NOHMs of the first embodiment overcomes these deficiencies. In particular, by varying the architecture of the organic polymeric corona and/or inorganic polymeric core of the NOHM, the properties of the lubricant can be varied. For example, the molecular weight of PEG-ethoxy silane corona chains of the NOHMs. For PEGs with molecular weights below 2,500 g/mol, the viscosity of the lubricant becomes lower as the corona polymer molecular weight is increased. The organic polymeric corona can also be functionalized to manipulate the properties of the NOHMs and lubricant. For example, the hydroxyl group at the end of PEG-based NOHMs provides a route for introducing a host of functionalities to the NOHMs corona—by covalent attachment.

The size of the inorganic nanoparticle varies. For example, up to a five-fold increase in viscosity can be observed when the core particle diameter is increased from 15 nm to 30 nm, keeping the corona polymer molecular weight and surface grafting density fixed. Addition of non reactive PEG (e.g., PEG-dimethyl ether) provides another effective means for manipulating the flow properties of the NOHMs, along with the lubricant.

An example of a lubricant composition of this embodiment comprises: a) a plurality of organic-hybrid silica nanoparticles, the individual nanoparticles comprising a silica core and an organic polymeric corona comprising amphiphilic polymer chains with a molecular weight ($M_w$) of 100 g/mol to 50,000 g/mol, including all integer % by weight values and ranges therebetween, the individual amphiphilic polymer chains of the organic polymeric corona covalently bonded to the silica core; and b) a carrier selected from a hydrogenated organic poly($\alpha$-olefin) oligomer (PAO), a fatty acid, polyalkylene glycol (PAG) and combinations thereof, where the organic-hybrid silica nanoparticles are dispersed in the carrier. In an embodiment, organic-hybrid silica nanoparticles do not exhibit observable aggregation and/or phase separation.

In this example, the organic-hybrid nanoparticles may be present at 0.1% by weight to 75% by weight, including all integer % by weight values and ranges therebetween. The organic-hybrid nanoparticles may have a silica nanoparticle core having a diameter of 3 nm to 100 nm, including all integer nm values and ranges therebetween. The volume fraction of the nanoparticles may be 0.02 to 0.5, including all values to 0.01 and ranges therebetween.

In this example, the amphiphilic polymer chains may have at least one alkyl amino moiety, the alkyl moiety of the alkyl amino moiety having 2 to 18 carbon atoms, including all integer carbon values and ranges therebetween.

In this example, the hydrogenated poly($\alpha$-olefin) oligomer may have a molecular weight (Mw) of 100 g/mol to 50,000 g/mol, including all integer g/mol values and ranges therebetween. The hydrogenated poly($\alpha$-olefin) oligomer may be an oligomer of a $C_2$ to $C_{12}$ $\alpha$-olefin.

It is desirable the fatty acid be a soluble fatty acid. The fatty acid can be a C8 to C22 fatty acid, including all integer carbon fatty acids and ranges therebetween. Examples of suitable fatty acids include lauric acid (C12), myristic (C14), palmitic (C16), stearic (C18), and oleic (C18).

The composition can be used in a method of lubricating a mechanical device. For example, the method of lubricating a mechanical device comprises disposing the composition between two surfaces such that the coefficient of sliding friction between the surfaces is reduced, the wear between two surfaces is decreased, or the relative speed between two surfaces increased. The composition can be present as a thin film disposed on a surface of the mechanical device.

The effectiveness of the lubricant can be established, for example, by using a tribometer that characterizes the interfacial friction and its dependence on sliding rate. Tribometers come in a variety of designs from pin-on disc, ball-on-flat, bead on Flat as in atomic force microscopes with lateral force measurement capabilities, disc on flat—as in mechanical rheometers. It is also possible to determine the lubricity of a surface by measuring the amount of wear or changes in relative speed of motion that occurs as it is moved over some period of time relative to another surface to which it makes periodic or continuous contact.

The composition can be present in a device. For example, digital light processing instruments, engine parts in, for example, automobiles, trucks, trains, aircraft, space craft, and water craft, escalators and moving platforms, wind turbines and wind mills, magnetic hard Disk drives, microelectromechanical systems (MEMs), and automated syringes.

Moreover, if a higher thermal conductivity is desired, the NOHMs can be produced with metal inorganic nanoparticles. The synthesis of NOHMs based on metallic cores is achieved by straightforward extension of the organic polymeric coronas as discussed earlier. Specifically, if a metal (e.g., Au or Pd) inorganic nanoparticle core is desired, an oligomer polymers bearing thiol or amine groups at one end can be employed to couple via a hydrogen bond or covalent bond the organic polymers to the inorganic nanoparticle cores.

If other conducting metals (e.g., Cu, Ag, or Pb) inorganic nanoparticle cores are desired, organic polymeric corona bearing different kinds of function groups of carboxylic acid, sulfonic acid, or the corresponding acid chlorides or anhydrides must be used.

In one feature of this embodiment, the lubricant has a velocity independent fraction coefficient of 0.1 to $6\times10^{-3}$ and preferably 0.1 to $4\times10^{-3}$, and more preferably at 1 to $4\times10^{-3}$ at room temperature.

In yet another aspect of this embodiment, a shear thickening material is obtained by adding cube-shaped $Co_3O_4$ nanoparticles to a cream, coating, or gel. A benefit of cube-shaped NOHMs is that these materials manifest desirable shear-thickening features at moderate shear rates, which can be employed as the basis for novel protective creams and gels for law enforcement and military personnel.

Example 1

SiO$_2$-PEG NOHMs are produced by adding 700 ml of reverse osmosis (RO) water to a 1 L glass bottle with magnetic stirrer rotated at high speed >500 rpm; slowly adding a 333 g Ludox AS-30, TM-30, or SM-30 aqueous suspension (i.e. 100 g SiO$_2$) to the water and then stirring; dissolving 100 g PEG-ethoxysilane in 200 ml water; vigorous stirring; continue stirring for 10 hours with intermediate conditions at 12 hours at 110° C.; transferring the resulting material to an evaporating dish (glass); and placing the resulting material and dish in a convection oven at 75° C. until water has evaporated.

The resultant materials show that as the volume fraction of the SiO$_2$ core particles is decreased from $f_c \approx 0.55$, to 0.34 to 0.23 the consistency of the nanoparticle organic hybrid materials (NOHMs) changes from a non-flowing gel, to a simple viscous liquid.

Example 2

NOHMs produced using the procedure described in Example 1 are re-suspended in water and any un-tethered corona chains are removed by dialysis. In the dialysis approach, the re-dissolved material is added to the interior of a Spectrum laboratories dialysis bag (5 nm. size cut-off). The end is closed with tubing clamps. The material to be dialyzed is submerged in a 1000 ml bath containing RO water and dialysis allowed to proceed with gentle stirring. For the first 12 hours of dialysis, the water in the bath was refreshed every four hours. For the remaining 12 hours, the water was refreshed once.

Thermal gravimetric analysis (TGA) was used to characterize the organic content of the materials obtained after the dialysis procedure. Results indicate that approximately 32% of the mass of each hybrid nanoparticle consists of PEG. The PEG has a molecular weight (M$_w$) of 550 g/mol and an inorganic particle core having a diameter of nm. This implies that there are on average 650 PEG chains tethered to each silica inorganic nanoparticle core.

Example 3

Biodegradable NOHMs are produced by adding 700 ml of reverse osmosis (RO) water to a 1 L glass bottle with magnetic stirrer >500 rpm; adding a NaOH base to adjust the pH of the water to 9-10; slowly adding 333 g Ludox AS-30, TM-30, or SM-30 aqueous suspension to the water (i.e. 100 g SiO$_2$) and then stirring to form a solution; dissolving 100 g of PEG-ethoxysilane in 200 ml water to form a mixture; and slowly adding the solution and mixture together with stirring; stirring for 1 hour at 100° C. with intermediate periods of ultrasonification; transferring the material to an evaporating dish (glass); and placing dish and material in a convection oven at 75° C. until water is removed after 12 hours.

The product of this synthesis is labeled S1.

The hydroxyl group at the end of the S1-series PEG-based NOHMs provides a route for introducing a host of functionalities to the NOHMs corona—by covalent attachment. We reacted the S1 NOHMs with a 2:1 molar excess (i.e. based on the mole fraction of terminal hydroxyl groups on the PEG) of epichlorohydrin in dichloromethane or THF (i.e., 100 g S1 NOHMs, 15 g epichlorohydrin, 2 g sodium hydroxide pellets, and 100 ml dichloromethane/THF). The reactants were reacted for 24 hours under an aqueous solution reflux. This reaction transforms terminal hydroxyl groups on the PEG to epoxide groups. The resultant epoxy functionalized PEG was separated from the unreacted epichlorohydrin and sodium hydroxide by centrifugation and repeated washing with solvent.

The epoxy functionalized S1 material was dispersed in dichloro methane and an equimolar (again based on the amount of reactive terminal groups in a 100 g sample) and amine terminated polydimethylsiloxane (PDMS, silicone oils) were added to the mixture. Upon addition of 2 grams of SnCl$_2$ catalyst, the amine-epoxy reaction was allowed to proceed to completion (24 hours under reflux with vigorous stirring).

Figure 2:
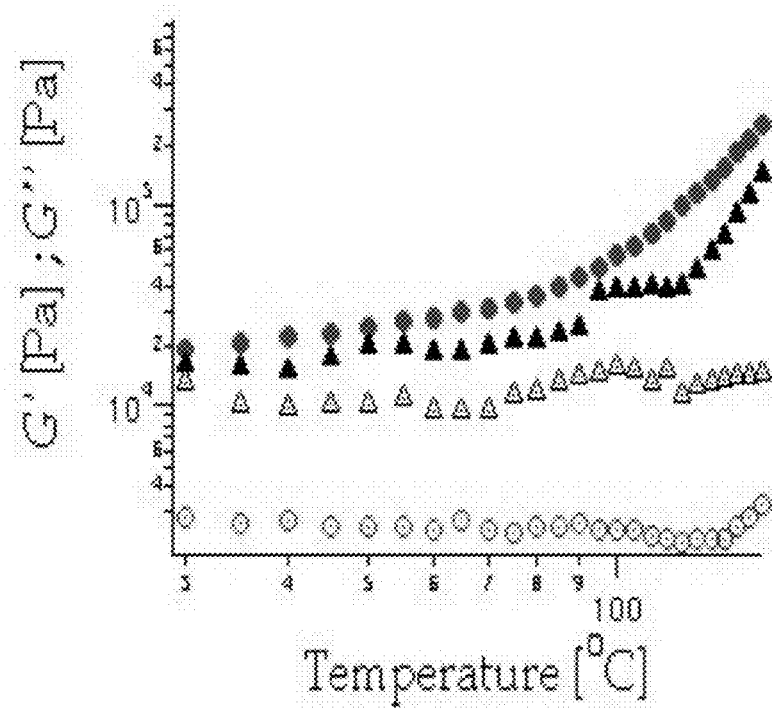
FIG. 2 shows Storage and Loss Modulus of NOHMs as function of temperature, ω=10 s−1, and strain=1%.

Residual SnCl$_2$ was removed by filtration and repeated washing with THF. The material was transferred to an evaporating dish and the solvent removed by evaporation in a convection oven maintained at 80° C. for 8 hours. The material is labeled S2 material. The triangles in FIG. 2 illustrate how the storage and loss moduli for this material varies with temperature. It is apparent from this figure, that the S2 material has a lower viscosity than its S1 precursor, but the viscosity is less temperature dependent.

Equimolar amounts of 2 M solutions of steric acid and octadecanoic acid, respectively, in warm organophilic solvents (e.g., dichloro methane or chloroform) were added to another portion of the S1 material in the same solvent discussed above. The reaction was allowed to proceed under reflux with vigorous stirring for 24 hours, to produce a hydrophobic (steryl or octadecanyl) canopy on the exterior of a PEG corona. The materials were labeled S3 and S4, respectively. In comparison to the corona, the canopy molar mass is small, which means that the overall volume fraction of the cores in the S3 and S4 is only marginally different from the S1 material. This treatment nonetheless results in a greasy/waxy material. The organophilic canopy tethered to the PEG corona also makes the NOHMs amphiphilic.

FIG. 2 summarizes the corresponding mechanical properties of the S1 series NOHMs. Specifically, this figure plots the elastic or storage modulus, G', (filled symbols) and the viscous or loss modulus, G", (open symbols) as a function of temperature. Circles are data for the S1 series material represented by the continuous line (ie. containing approx 40 wt % silica, $\omega_{SiO2} \approx 0.4$). The triangles are data for the S2 material ($\omega_{SiO2} \approx 0.2$). The materials manifest solid-like (G'>G") mechanical response and that they maintain high viscosities over the full range of temperatures (30° C.-150° C.) studied.

Example 4

Amine-based NOHMs are produced by adding 700 ml of Reverse Osmosis (RO) water to a 1 L glass bottle with magnetic stirrer >500 rpm; adding KOH in dry or aqueous form to adjust the pH of the water to 9-10; slowly adding 333 g Ludox AS-30 suspension of silica nanoparticles in water (i.e. 100 g SiO$_2$) to the water to form a mixture; dissolving 100 g of (3 Trimethoxysilylpropyl) diethylene triamine (TMPDT) in 200 ml water to form a solution; slowly adding the solution and mixture, with vigorous stirring together; stirring for 10 hours at 120° C. with 20 minute periods of ultrasonication every fours; allowing approx ¾ of the volume of water to evaporate. The solution maintains a uniform, pale yellow appearance and has a consistency similar to that of water. The material is then transferred to an ultracentrifuge and centrifuged for 2 hours at 40 k rpm. The supernatant is decanted and redispersed in RO water. This procedure was reported three times to remove unattached TMPDT and base. The product was then washed in THF. 100 g of the material was then dispersed in 500 ml of dichloromethane. An equimolar amount (based on TGA analysis of solid product produced by drying the suspension, which indicates that there are approx 2.5 TMPDT molecules per $nm^2$ of surface area of silica), of a commercial monofunctional, epoxy terminated, PDMS (Aldrich, $M_w$, PDMS=5,000 g/mol) and 5 grams of a $SnCl_2$ catalyst is added to the mixture. The resulting reaction is allowed to proceed for at least two days at room temperature with vigorous stirring. The resulting product is washed with water to remove the $SnCl_2$ catalyst and dried dry overnight in a convection oven to recover the PDMS NOHMs.

Example 5

Sixty grams of $NaNO_3$ was added to a 3 neck flask with a condenser attached. Thirty milliliters of 1M NaOH and 70 mL of deionized water were subsequently added to the flask. The flask was placed in a silicon oil bath set to a temperature of 120° C. A continuous supply of air at 50 ml/min was bubbled into the system. Twenty milliliters of 1M $Co(NO_3)_2$ was added drop wise to the flask after the temperature in the flask had equilibrated. This synthesis was allowed to proceed for 22 hours and yielded a black suspension.

After allowing 5 minutes for cooling, 100 mL of 0.1M of HCl was added to the contents of the flask and the mixture maintained at room temperature for 24 hours to allow solid side products produced in the synthesis to be dissolved and separated from the targeted product, $Co_3O_4$ nanocubes. The supernatant was discarded and the bottom phase centrifuged at 6000 rpm for 30 minutes to further separate the by products. This procedure was repeated three times to enhance the purity of the $Co_3O_4$ product. Glycerol was added to the bottom phase and thoroughly mixed into the particles.

The same procedure was employed for tethering PEG to the surface of silica in Example 2 was used to covalently attached PEG chains with molecular weights ranging from 500 g/mol to 10 kg/mol to the surface of the $Co_3O_4$ cubes. For PEG molecular weights below 1.5 kg/mol, the resulting $Co_3O_4$ NOHMs were neat black liquids. For higher PEG molecular weights, the NOHMs though solid at room temperature, manifest a dramatic melting transition at a temperature close to 60° C., the melting temperature of PEG.

The viscosity of the $Co_3O_4$ NOHMs at 65° C. for systems where the volume fraction $f_c$ of the cores ranges from 0.36 to 0.62. In addition to the usual shear-thinning characteristics (viscosity reduces with increasing shear rate), the NOHMs liquids manifest a regime at high shear rates where the viscosity increases with shear rate.

The shear-thickening transition in suspensions of spheres is generally attributed to formation of hydroclusters at a critical Peclet number, $Pe_c = \dot{\gamma} \& * \eta_s/(kT/d^3)$, of order unity; here $\dot{\gamma}$ is the shear rate, d the particle dimension, $\eta_s$ the suspending medium viscosity, k Boltzmann's constant and T the Kelvin temperature. $Pe_c=0.07$ for fc=0.62, and that the magnitude of the viscosity rise is generally larger. Applicants do not want to be bound by any particular theory but it is believed that shear-induced hydroclusters is resisted by large forces needed to confine the captive solvent—i.e., the tethered corona.

Example 6

NOHMs were produced with PEG corona ranging from 500 to 5000 molecular weight; inorganic fractions ranged from 12 to 49 wt %. Table 1 displays the specifications for these electrolytes. The NOHMs were then doped with LiTFSI as follows:

TABLE 1

NOHMs Electrolyte Specifications

| Elect. # | Synthesis Pathway # in FIG. 1 | Core Chemistry | Core Diameter (nm) | PEG Corona MMW (g/mol) | Core Fraction | Cryst. Temp., $T_c$ (° C.) | Melting Temp., $T_m$ (° C.) |
|---|---|---|---|---|---|---|---|
| 1 | 1 | $SiO_2$ | 8 | 550 | 0.48 | −36 | 10 |
| 2 | 3 | $SiO_2$ | 8 | 595-725 | 0.45 | −39 | 5 |
| 3 | 1 | $SiO_2$ | 8 | 800 | 0.40 | −35 | 10 |
| 4 | 2 | $SiO_2$ | 8 | 825-909* | 0.43 | — | — |
| 5 | 1 | $SiO_2$ | 8 | 1100 | 0.36 | — | — |
| 6 | 1 | $SiO_2$ | 8 | 2000 | 0.24 | −12 | 31 |
| 7 | 1 | $SiO_2$ | 8 | 5000 | 0.12 | 23 | 44 |
| 8 | 3 | $SiO_2$ | 18 | 595-725 | 0.49 | −35 | 5 |
| 9 | 3 | $TiO_2$ | 15 | 595-725 | 0.39 | −30 | 9 |

*Full molecular weight of branched poly(ethylene glycol) functionalized amine (Ethomeen C25)

The thermal properties of the hybrid electrolytes were measured by differential scanning calorimetry (DSC) and thermal gravimetric analysis (TGA). The inorganic nanoparticle fraction of each hybrid, prior to the addition of LiTFSI, was determined by TGA as reported in Table 1. The electrolytes were thermally stable to near 300 deg C. Samples #6 and #7 that displayed melting transitions above room temperature by DSC were those with the longest corona, 2000 and 5000 molecular weight; these electrolytes are soft, semi-crystalline, self-supporting gels at room temperature.

Figure 3:
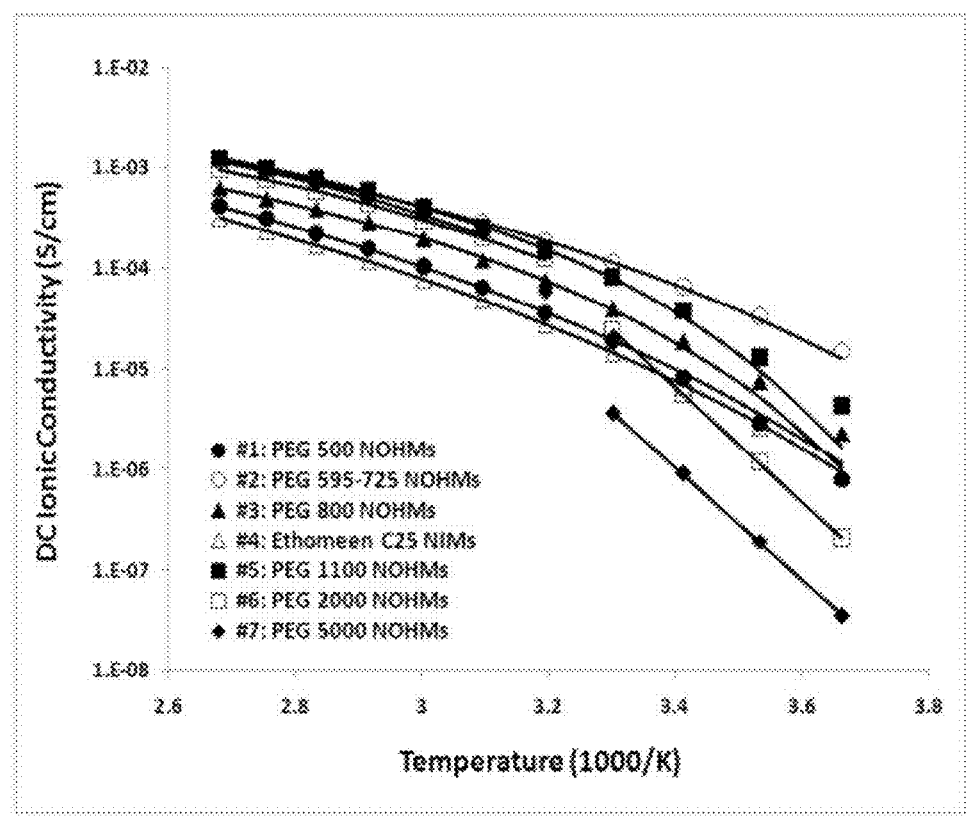
FIG. 3 shows results of a DC ionic conductivity of NOHMs electrolytes with 8 nm $SiO_2$ cores and varying types of PEG corona.
Figure 4:
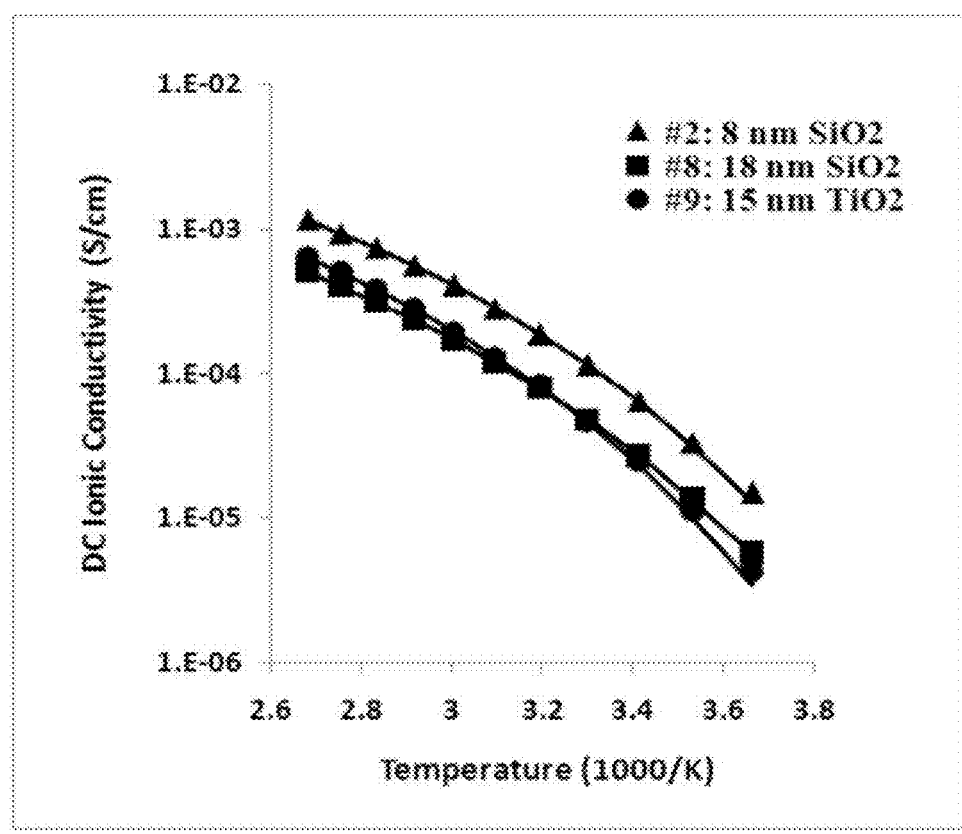
FIG. 4 shows the DC conductivity of NOHMs electrolytes with varying inorganic nanoparticle core chemistry and size.

The dielectric properties of the electrolytes were studied using temperature dependent broadband dielectric spectroscopy. DC ionic conductivity values as well as the frequency of tan(δ) maxima were extracted from this data. FIG. 3 displays temperature dependent ionic conductivity data for hybrids with 8 nm silica cores and varying length polyethylene glycol corona, electrolytes #1-7. FIG. 4 displays conductivity of hybrids with varying core sizes and chemistry, all with 595-725 molecular weight PEG corona, electrolytes #2, 8-9. The lines on FIGS. 3 and 4 are fits to Vogel-Thamman-Fulcher (VTF) or Arrhenius temperature dependence.

FIG. 3 shows that PEG corona length has a large effect on ionic conductivity, especially at ambient conditions. Electrolytes #6 and #7 that exhibit both a crystalline and melt transition accessible during the temperature dependent dielectric measurements have an Arrhenius temperature dependent ionic conductivity below the melt transition. All other samples exhibited VTF conductivity throughout, which indicates that the conduction mechanism is governed by the segmental motion of the oligomer chains. In addition, the frequency maximum of the tan(δ) as extracted from the dielectric data exhibits analogous temperature dependence as with the conductivity, with activation and pseudo-activation energies within error of that of the ionic conductivity. The mechanism for ion transport is coupled to the relaxation of the tethered oligomer chains. Several of the hybrids reach the same conductivity, within error, at high temperatures; this conductivity is similar to that recorded for a pure high molecular weight PEO-LiTFSI system. Thus, the PEG chains in these systems have similar dynamics at the microscale. Hybrids with short corona (#1, #3, #4) have poor conductivity in comparison with the other systems, this is likely due to slower relaxation as a result of chain tethering. The sample with the highest ionic conductivity at room temperature, electrolyte #2, has a polydisperse corona.

FIG. 4 shows an increase in the hybrid core size, even while maintaining organic fraction, results in a fractional decrease in ionic conductivity. This could be due to decreased segmental motion in the matrix as a result of increased chain crowding and extension around the cores. The change in core chemistry from silica to titania appears to have a negligible effect on ionic conductivity. This further implies that the mechanism of ion transport is through motion of the PEG chains and that the inorganic cores have little effect on the transport pathway.

Figure 5:
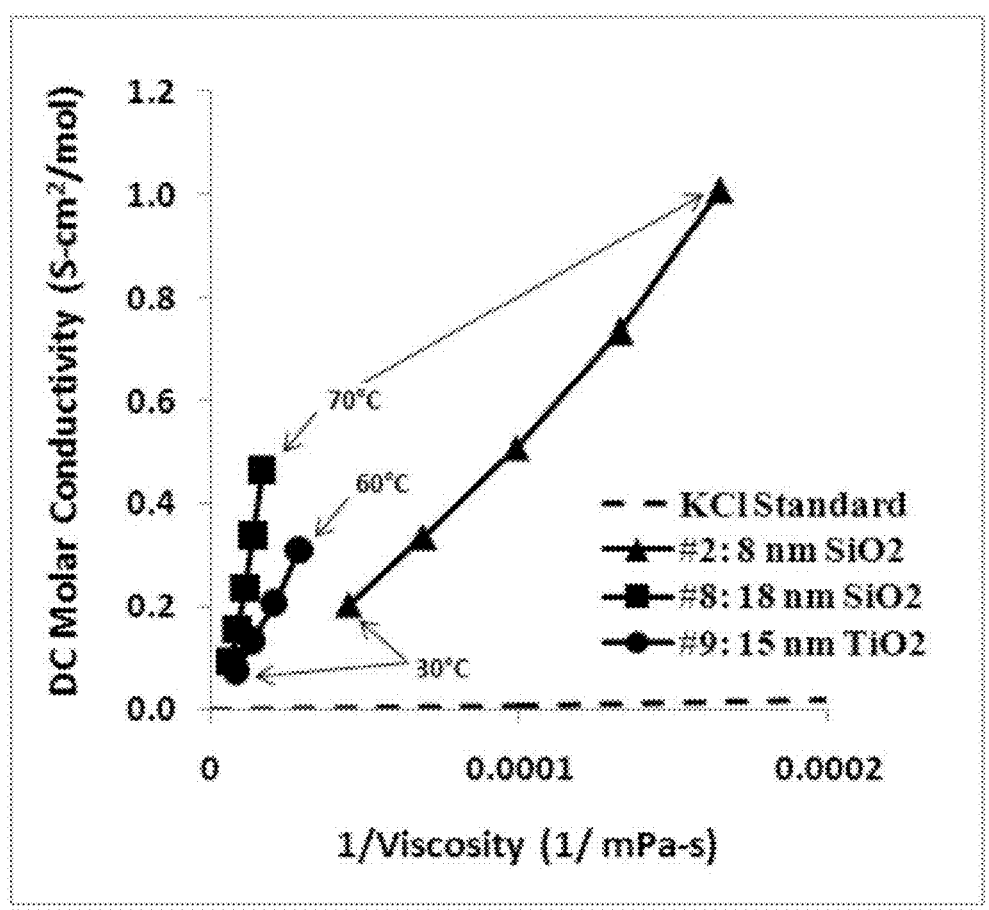
FIG. 5 is a Walden plot of NOHMs electrolytes with varying inorganic nanoparticle cores and 595-725 PEG corona.

FIG. 5 displays the DC molar conductivity vs. the shear fluidity (inverse viscosity), the Walden plot of the same electrolyte series (#2, #8, #9) with varying cores and 595-725 molecular weight PEG corona. Compare FIG. 5 with FIG. 6, the Walden plot of polyethylene glycol monomethyl ether (MPEG) oligomers doped with 1 M LiTFSI. In both plots, the dashed line represents the standard result for dilute KCl in aqueous solution. The data for the NOHM electrolytes in FIG. 5 is presented from 30-70° C.; the data for MPEG electrolytes in FIG. 6 is presented from 70-100° C. as several samples were crystalline at room temperature.

FIG. 5 illustrates that the NOHMs electrolytes even with short PEG corona are superionic according to Walden plot standards: high ionic conductivity relative to fluidity. In comparison, free MPEG electrolytes are superionic only in the entanglement regime (MW>3200), as shown by FIG. 6. Moreover, the superionic regime is accessible at room temperature with NOHMs electrolytes. The Walden plot has not commonly been used in the display of polymer electrolyte data, as the traditional use of the plot was to understand the microscopic behavior of ions moving in small molecule solvent and a macroscopic property; the standard KCl data is of a dilute, fully dissociated solution of ions of equal mobility. While the conduction mechanism in polymer electrolytes is more closely related to free volume than viscosity, the Walden plot does show that the electrolytes exhibit good conductivity and viscosity.

Figure 6:
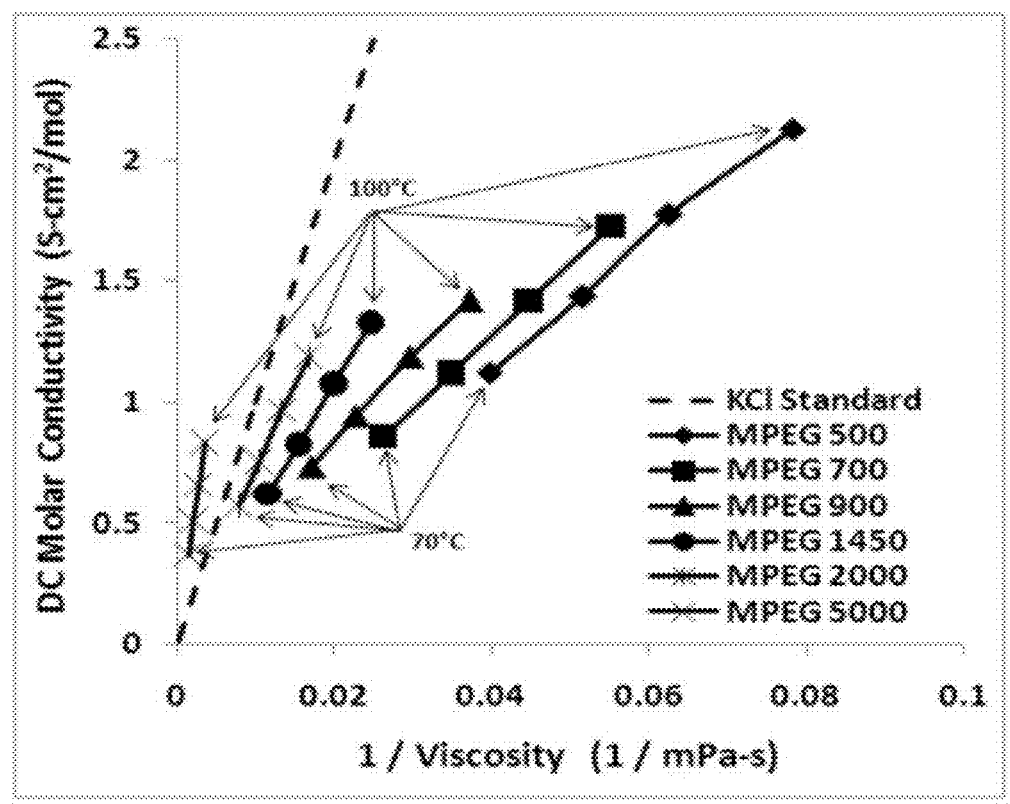
FIG. 6 is a Walden plot of MPEG electrolytes.
Figure 7:
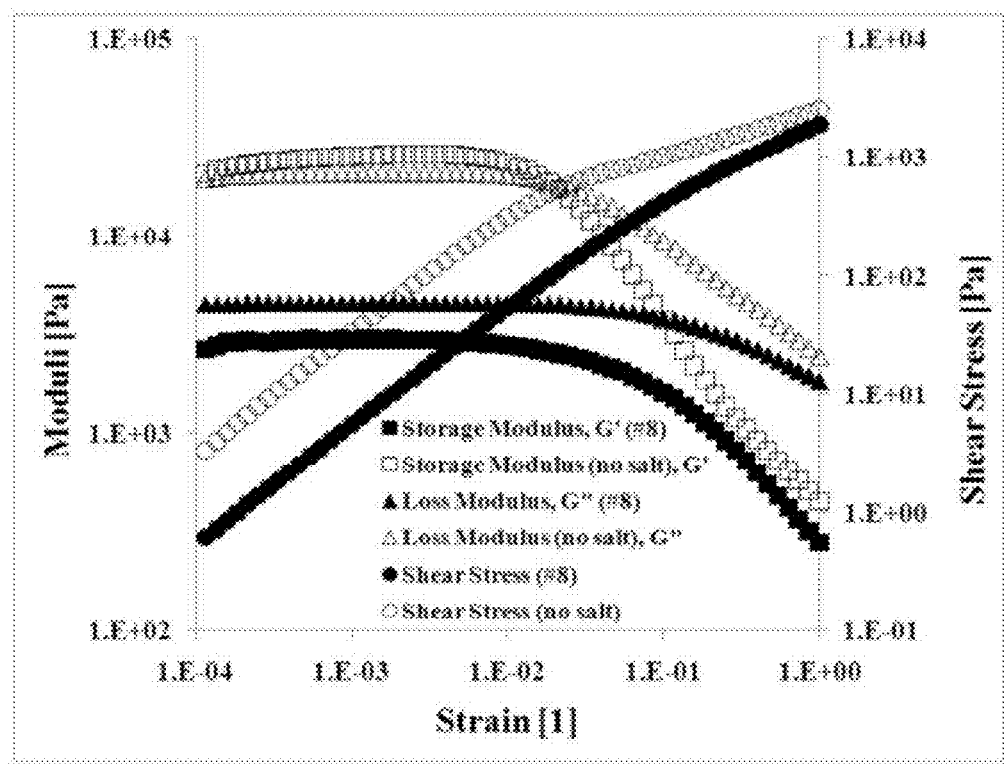
FIG. 7 shows the shear stress, storage, and loss modulus of a NOHMs electrolyte (filled symbols) and NOHMs without LiTFSI (open symbols) undergoing a strain sweep with ω=10 rad/sec.

Comparison of FIGS. 5 and 6 also shows that while MPEG electrolytes have a linear relationship between conductivity and fluidity, this relationship is non-linear for NOHM electrolytes. This is because while MPEG conductivity and fluidity as well as NOHM conductivity above the melt transition has VFT temperature dependence, the NOHM electrolyte shear fluidity has Arrhenian temperature dependence. It is also apparent from FIG. 5 that the change in core size has a greater effect on viscosity than conductivity; an increase in core diameter from 8 to 18 nm increases viscosity by nearly an order of magnitude, whereas conductivity decreases only fractionally. This behavior is consistent with jamming of the hybrid cores during shear flow. This finding is in agreement with results from strain sweep measurements (FIG. 7), which show a well-defined yield stress for both the salt-free and LiTFSI-doped NOHMs. The yielding transition is accompanied by strain softening moduli, and for the salt-free NOHMS, a weak maximum in G", indicative of soft-glassy rheology. It is therefore clear that addition of LiTFSI to the hybrid results in a significant decrease in the moduli. This result has been noted for other PEO-LiTFSI systems, typically attributed to a drop in the crystalline fraction of PEO, as discussed by Edman, L., Ferry, A. & Doeff, M. M., Slow recrystallization in the polymer electrolyte system poly(ethylene oxide)n-LiN(CF2SO2)s. Journal of Materials Research 15, 1950-1954 (2000).

Example 7

Hydroxy(polyethylyeneoxy)propyl]triethoxysilane, 50% in ethanol (SIH6188.0, silane-PEO, PEO MW between 500 and 550) was used as received from Gelest, Inc. Water, potassium hydroxide (KOH), and silicon dioxide nanoparticles (Ludox SM-30, 30% in water) were used as received from Sigma-Aldrich. Ludox solution was diluted to 4% (w/v) with a KOH solution of pH 10. The silane-PEO solution was added dropwise while stirring to the diluted Ludox solution to inhibit aggregation of the silicon dioxide nanoparticles. This Ludox-silane-PEO solution was placed, uncapped in a 100° C. oil bath for 1 hour. The solution was ultrasonicated for 15 minutes and returned to the 100° C. oil bath for 1 hour. The solution was ultrasonicated for another 15 minutes and returned to the oil bath for 6 hours. The ultrasonication was performed to inhibit aggregation of the nanoparticles and promote even graft density of the silane-PEG to the nanoparticles. The resulting solution was put in a large petri dish and placed in a convection oven, uncovered, at 70° C. until all of the water had evaporated. The nanoparticle-silane-PEO was collected from the petri dish and stored in a 100 mL media bottle in a glovebox under argon. The synthesis of an inorganic nanoparticle-tethered initiator is illustrated by scheme 3 as follows:

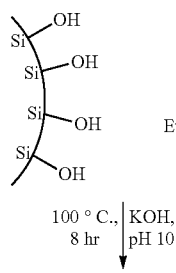

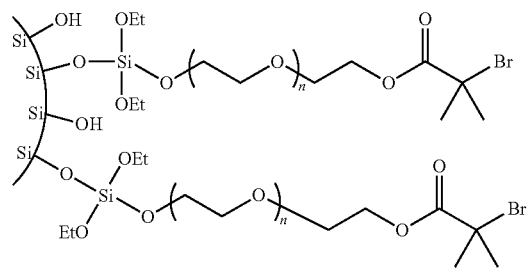

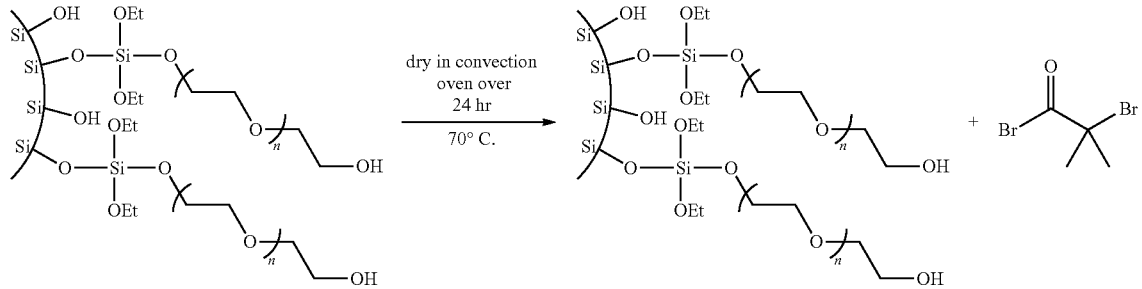

Tetrahydrofuran (THF) was purified in a solvent still under nitrogen using 1,1-diphenylethylene 97% and n-butyllithium. 1,1-diphenylethylene was added in a ratio of 1 drop to 50 mL THF. n-butyllithium was added in a ratio of 1 mL to 50 mL THF. After approximately 2 days, the purified THF was vacuum distilled and stored under argon. 2-bromoisobutyrl bromide (2-b-b) was vacuum distilled under nitrogen and stored in a glovebox under argon prior to use. Triethylamine ($Et_3N$) was purified using approximately 10 wt % of calcium hydride. This solution was stirred uncapped for 24 hours and then capped and kept stirring at room temperature until used. Prior to use, $Et_3N$ was vacuum distilled under nitrogen and stored in a glovebox under argon.

The synthesis of poly(hexyl methacrylate)-grafted nanoparticles (PHMA-g-$SiO_2$) is as follows:

capped, covered with parafilm and stored at room temperature. Toluene was distilled and placed in a glovebox under argon. Immediately prior to use, hexyl methacrylate was stirred over $CaH_2$ for 24 hours then vacuum distilled and placed in a glovebox under argon. The functionalized $SiO_2$-peo-2bb solution was added to a round bottom flask. To this flask purified toluene, dibromobis triphenyl phosphine and hexyl methacrylate were added. The flask was capped with a rubber septum and attached to a nitrogen line equipped with a bubbler to allow for solvent evaporation. The flask was placed in a 90° C. oil bath for 10 hours. After 10 hours, the reaction was exposed to oxygen to deactivate the catalyst and then placed in the refrigerator to inhibit further polymerization.

Scheme 4

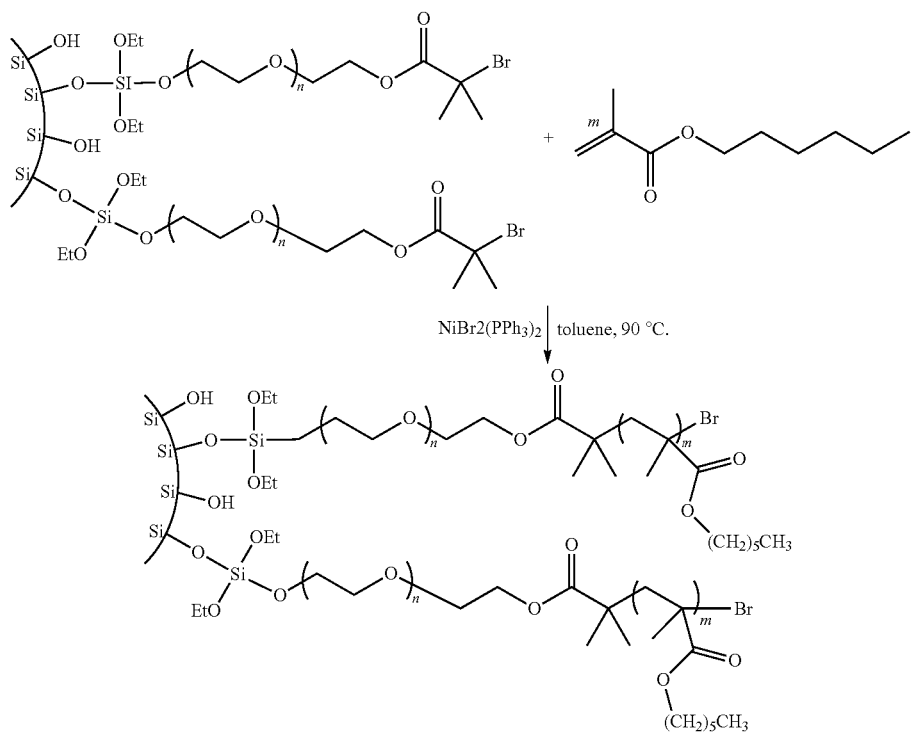

Toluene was purified with approximately 10 wt. % calcium hydride. This solution was stirred for 24 hours and then The nickel catalyst was removed through a column of neutral alumina and distilled until a small amount of solvent remained. The solution was dialyzed in chloroform for 3 rounds of solvent changes totaling approximately 36 hours. After dialysis, the solution was placed in a 100 mL media bottle and put in a vacuum oven at 60° C. The resulting NOHMS were stored capped at room temperature. The preparation of SiO$_2$—PEG-PAN Nanoparticle-Organic Hybrid Molecules (NOHMS) occurred as follows:

remained. The solution was dialyzed in chloroform for 3 rounds of solvent changes totaling approximately 36 hours. After dialysis, the solution was placed in a 100 mL media bottle and put in a vacuum oven at 60° C. The resulting NOHMS were stored capped at room temperature.

To characterize the molecular weight of the polymer chains, it is desirable to detach them from the SiO$_2$ cores. A

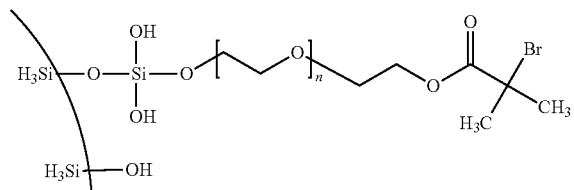

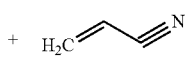

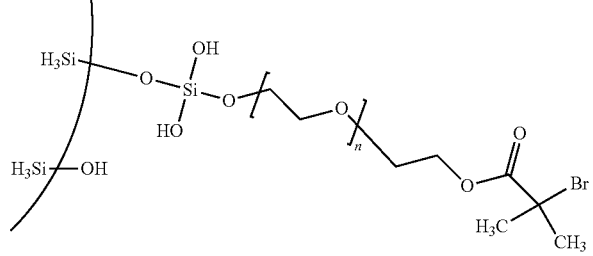

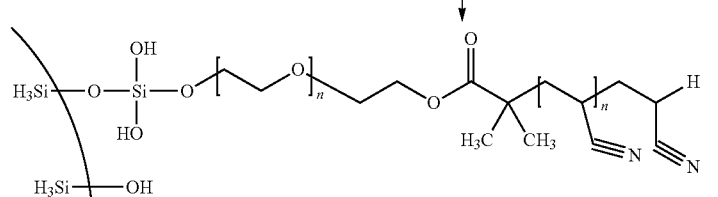

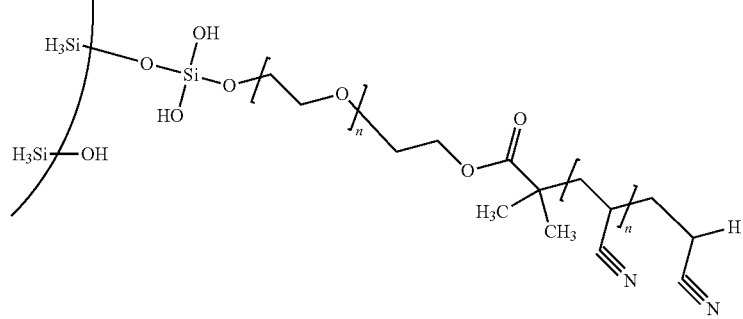

ATRP synthesis of PAN was carried out using a procedure similar to Leiston-Belanger et al., *Macromolecules*, 39(5), 1766-1770, (2006). N,N-dimethylformamide (DMF) was distilled and placed in a glovebox under argon. Immediately prior to use, acrylonitrile was purified with activated basic aluminum oxide then vacuum distilled and placed in a glovebox under argon.

In a glovebox, under argon, the functionalized SiO$_2$-peo-2bb solution was added to a round bottom flask. To this flask purified DMF, copper (I) bromide, 4,4'-dionyl-2,2'-dipyridyl (DNBPY), and acrylonitrile were added. The flask was capped with a rubber septum and placed in a 70° C. oil bath for 20 hours. After 20 hours, the reaction was exposed to oxygen to deactivate the catalyst and then placed in the refrigerator to inhibit further polymerization.

The copper catalyst was removed through a column of basic alumina and distilled until a small amount of solvent HF etching process, which is known to be highly selective for Silica, was used. 300 mg of NOHMS were mixed with NH$_4$ HF and stirred for 24 hours at room temperature. The polymer was then extracted from the solution via separation with toluene. The toluene layer was washed with distilled water 4 times and then removed with rotary evaporation.

Thermogravimetric analysis (TGA) was carried out from room temperature to 550° C. using a TA Instruments Q500 under an atmosphere of nitrogen at heating rate of 10° C./min. TGA shows the percentage of weight remaining in the samples as a function of temperature and the derivative weight loss. The remaining mass after heating to 550° C. indicates presence of inorganic material.

The TGA results display drastic changes in the degradation temperatures of the tethered PEO-PAN copolymer as compared to the pure polymers. PEG has a degradation temperature of 400° C. and pure PAN has a degradation temperature of 150° C. while the PEG-PAN tethered to a silica nanoparticle displays two degradation peaks at 270° C. and 425° C. which correspond to the PAN block and PEG block, respectively. The rise in degradation temperature of the two blocks is a confirmation of the block nature of the copolymer as well as evidence that a charred layer of PAN is forming on the outside of the nanoparticle which must be burned through before the next layer of PAN-b-PEG can be degraded.

DSC was performed using a T. A. Instruments Q1000TA Modulated Differential Scanning calorimeter under an atmosphere of nitrogen. Samples were heated at a rate of 5° C./min from room temperature to 110° C. during cycle 1, cooled at a rate of 10° C./min from 110° C. to −100° C. during cycle 2, and heated at a rate of 5° C./min from −100° C. to 110° C. during cycle 3. DSC results show several important features of the $SiO_2$PEG-PHMA samples. First, the presence of only one glass transition temperature around −55° C. indicates the presence of a block copolymer. Had this sample been a mixture of PEG and PHMA, two distinct glass transitions would have be seen: one near −5° C. for PHMA and one near −40° C. for PEG. Second, the results show a peak near 25° C. that may be contributed to the melting of the polymer. Third, these results clearly show a minimum around 60° C. This minimum is due to crystallization of the polymer.

DLS measurements were done on Malvern Instruments Zetasizer Nano. Each sample was suspended in chloroform and filtered through a 0.45 um PTFE filter into a glass cuvette.

DSC and DLA show that the samples have a high concentration of NOHMS with diameters around 11 nm. with some particles being larger. These large particles are not numerous enough to affect the volume vs. size plot, but do to their large size affect the intensity vs. size plot. These results show that these samples are narrowly dispersed.

FT-IR experiments were performed using a Thermo Scientific iZ10. A background sample was taken before each sample. A total of 64 scans were run per sample.

GPC experiments were done using a Waters 717 plus Autosampler and a Waters 515 HPLC pump with tetrahydrofuran as the eluent. Samples were made 24 hours prior to characterization to a concentration of 1 mg/ml and allowed to equilibrate on a mechanical shaker.

An analysis of the GPC elugrams pertaining to the kinetics study of the MPEG-2bb-PHMA demonstrated that 98% conversion is achieved after 20 hours. The ATRP technique yields a bimodal distribution for moderate conversions of PHMA as evidenced by overlapping peaks that were seen between 16 and 23 ml. of elution volume of the 5 hour sample. However, as the reaction is allowed to progress, the polymer blend became less polydisperse as the PHMA conversion increases. The result reveals a narrowing of the polymer distribution from a polydispersity of 1.605 at 5 hours 1.222 for the 25 hour sample.

The elugrams indicate that the ATRP synthesis follows a living polymerization scheme, and the initial bimodal distribution can be attributed to the polydisperse nature of the MPEG as no effort was made to rigorously separate the MPEG reagent. An analysis of the GPC elugram for the PAN indicates a living polymerization scheme resulting in a fairly monodisperse sample that achieves 98% completion at 15 hours.

Rheology experiments were done using an Anton Parr Physica MCR 300 rheometer with an electrically controlled oven. Depending on the sample, the fixtures used were either a cone and plate fixture of diameter 6 mm or a cone and plate fixture of diameter 10 mm. Prior to running the experiments, the gap was zeroed at each temperature, followed by sample loading, a 30 min rest, a preshear to erase thermal history, and a 2 hour rest.

Example 8

Figure 8:
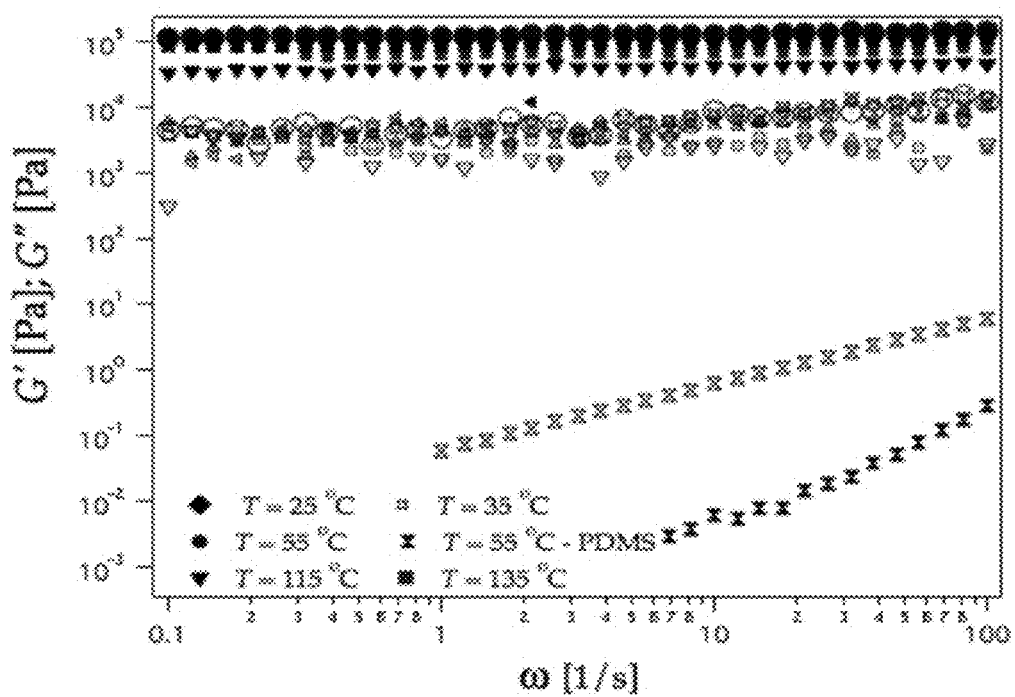
FIG. 8 shows the dynamic storage (G', filled symbols) and loss (G", open) moduli as a function of frequency and temperature for $SiO_2$—PDMS NOHMs ($d_p$=18 nm; s≈3 $nm^{-2}$) and free/untethered PDMS ($M_w$≈5 k) corona.
Figure 9:
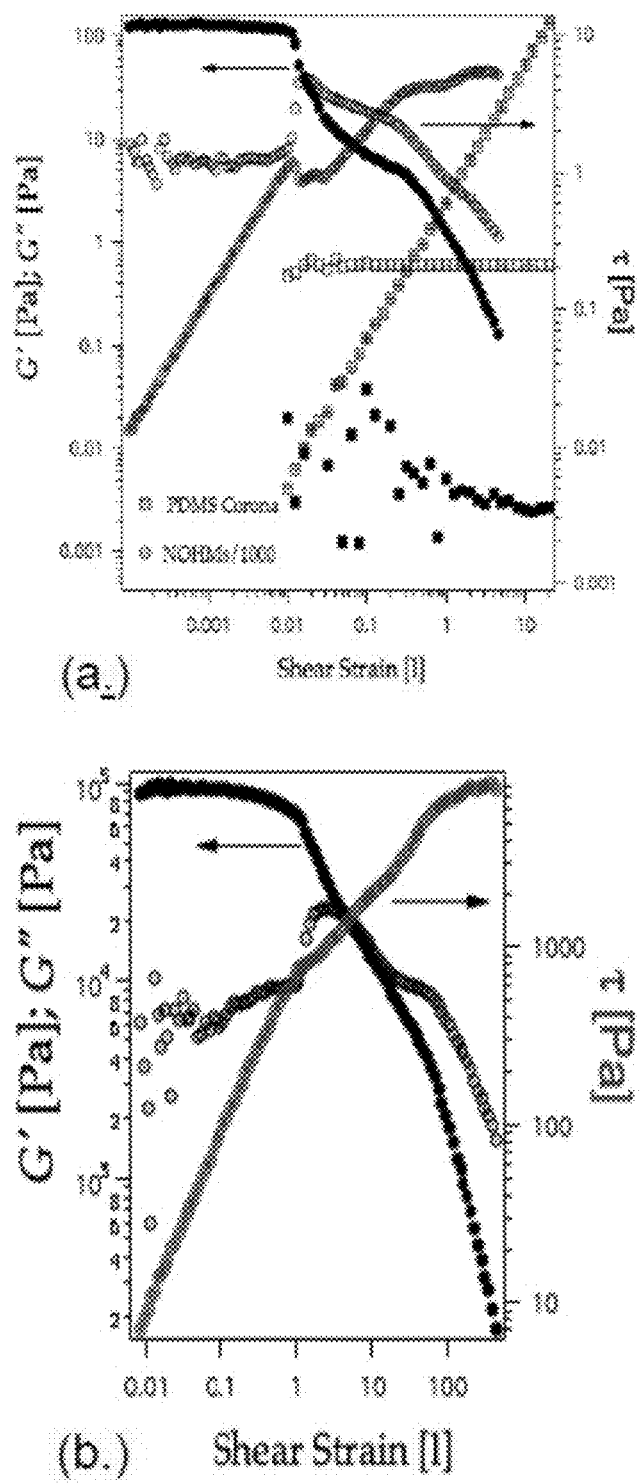
FIG. 9 shows the Storage (G') and loss (G") moduli versus shear strain, g for $SiO_2$—PDMS NOHMs with $d_p$=18 nm., s≈3 $nm^{-2}$, and corona $M_w$≈5 k: (a.) T=55° C.; (b.) T=25° C.; (c.) T=75° C.
Figure 9:
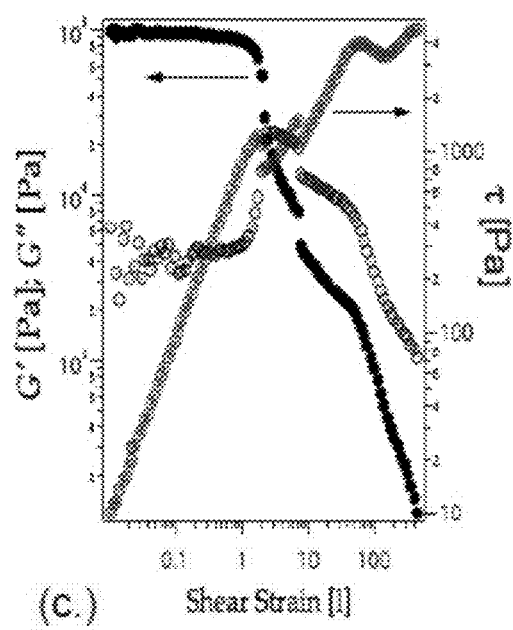

A NOHM is produced having a PDMS organic polymeric corona. NOHMs based on oligomeric PDMS corona possess at least four attributes that are desirable in a high-performance lubricant. First, they are homogeneous soft solids down to the length scale of their nanoscale building blocks. Second, NOHMs manifest rate-independent and weakly temperature-dependent shear moduli (G') that are many orders of magnitude greater than the shear modulus of the untethered PDMS corona (see FIG. 8). Third, even without any efforts at optimization, coatings of $SiO_2$—PDMS NOHMs on silicon exhibit a velocity-independent friction coefficient $\mu \approx 16.4 \times 10^{-3}$ at room temperature, which is comparable to the COF of our most slippery hyperbranched (PDMS) brushes. FIGS. 9(a)-9(c) are the corresponding results for the $SiO_2$-PDMS NOHMs material used for the frequency-dependent, dynamic rheology measurements in The figure clearly shows that whereas the unattached PDMS corona (squares) exhibit simple fluid like rheology (G">G'≠f(g)), the rheology of the NOHMs is again consistent with expectations for a soft glass. For the PDMS NOHMs, however, the initial increase in G", corresponding decrease in G', and slope change in t(g) are more abrupt. FIGS. 9(b) and 9(c) indicate that the sharpness of the yielding transition is temperature-dependent, with signatures of a slip-stick like transition at the highest temperature. It is believed that these behaviors reflect greater levels of interpenetration of corona chains at higher temperatures, and arise from interfacial slip between tethered chains.

Example 9

Figure 10:
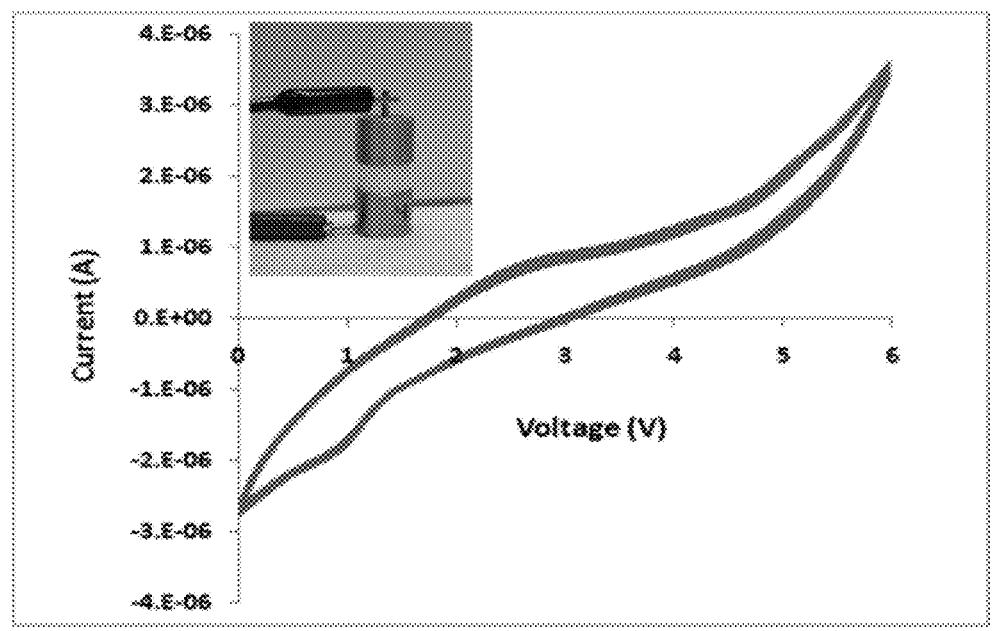
FIG. 10 is a cyclic voltammagram (CV) for $SiO_2$-MPEG NOHMs with fc=0.33, as 1 M $LiClO_4$ electrolyte. Measurements were performed at room temperature using a symmetric swage-lock type (top photograph) Li cell at a scan rate of 15 mV/s.

$SiO_2$—PEG NOHMs are produced as discussed above and doped with 1 M $LiClO_4$ to obtain an electrolyte. A rechargeable battery, comprising: (i) the electrolyte, (ii) a lithium metal anode, and (iii) a lithium metal cathode. The electrolyte is disposed between the electrodes without the need for a separator. FIG. 10 reports current voltage data from cyclic voltammetry experiments. The experiments were repeated four times. The measurements were carried out in a symmetric swage-lock type lithium cell employing a $SiO_2$—PEG NOHMs/1M $LiClO_4$ as electrolyte. The figure shows that the material produces a working cell, which exhibits repeatable CV traces even after measurements at voltages up to 6 V (the highest studied). This stood true after each experiment.

Example 10

Figure 11:
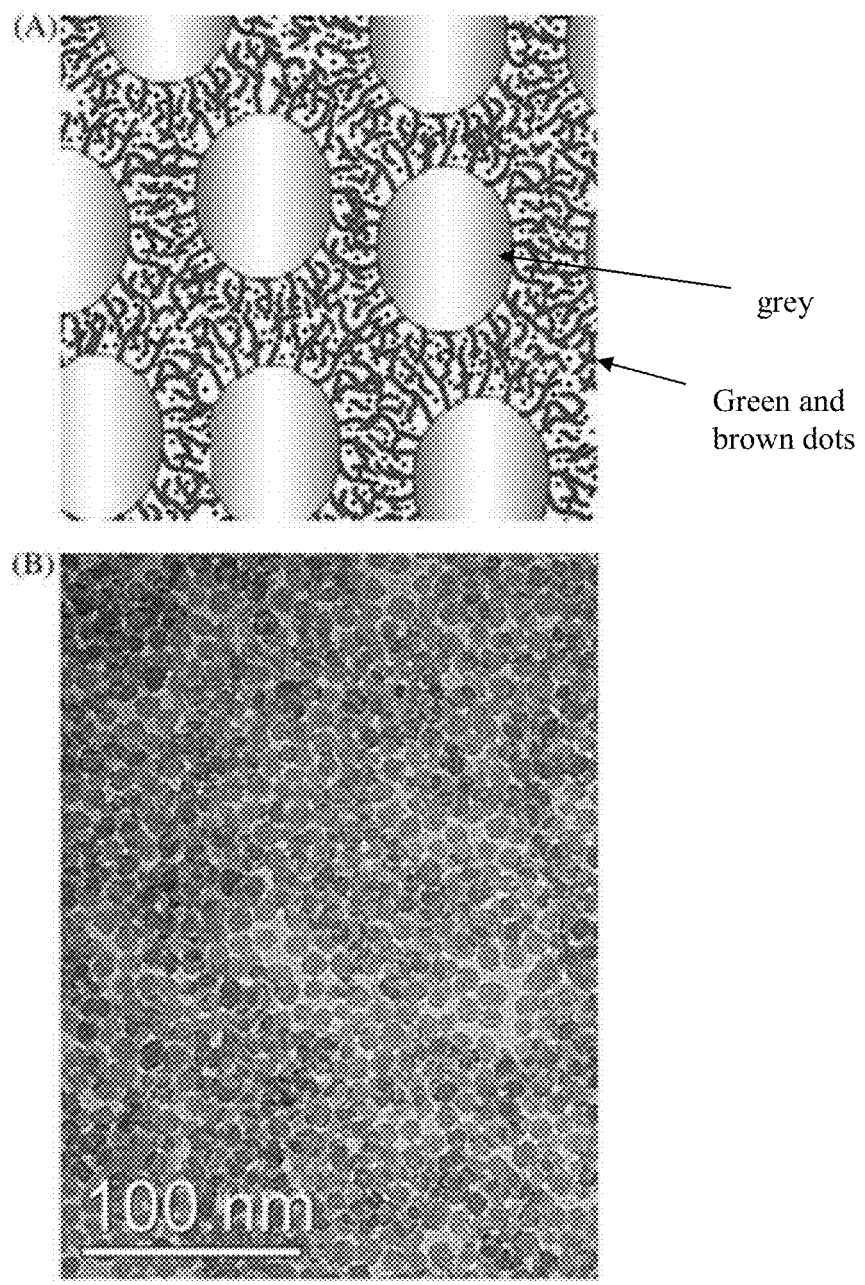
FIG. 11 is an example of a hydraulically interconnected framework: (A) schematic—grey circles represent impermeable particles; green and brown dots represent the lithium cations and TFSI anions, respectively. (B) TEM micrograph of a PEGDME 250-$SiO_2$ hybrid electrolyte with φ≈0.3.

In this example, reported are the mechanical properties, conductivity, and electrochemical stability of a family of hybrid electrolytes based on concentrated suspensions of $SiO_2$ nanoparticles in oligomeric PEG. In order to create homogeneous suspensions at high silica volume fraction $\phi$, the $SiO_2$ nanoparticles were sterically stabilized by covalently tethering a dense brush of oligo-PEG chains to each particle (FIG. 11B). This approach allowed for the creation of suspension electrolytes with a wide range of nanoparticle filler fraction and yet uniformly dispersed, non-percolated, ceramic cores.

Oligomer-suspended $SiO_2$-polyethylene glycol nanoparticles were studied as porous media electrolytes. At $SiO_2$ volume fractions, $\phi$, bracketing a critical value $\phi_j \approx 0.29$, the suspensions jam and their mechanical modulus increase by more than seven orders. For $\phi > \phi_y$, the mean pore diameter is close to the anion size, yet the ionic conductivity remains surprisingly high and can be understood, at all $\phi$, using a simple effective medium model proposed by Maxwell. SiO$_2$-polyethylene glycol hybrid electrolytes are also reported to manifest attractive electrochemical stability windows (0.3-6.3 V) and to reach a steady-state interfacial impedance when in contact with metallic lithium.

Experimental Synthesis

Figure 12:
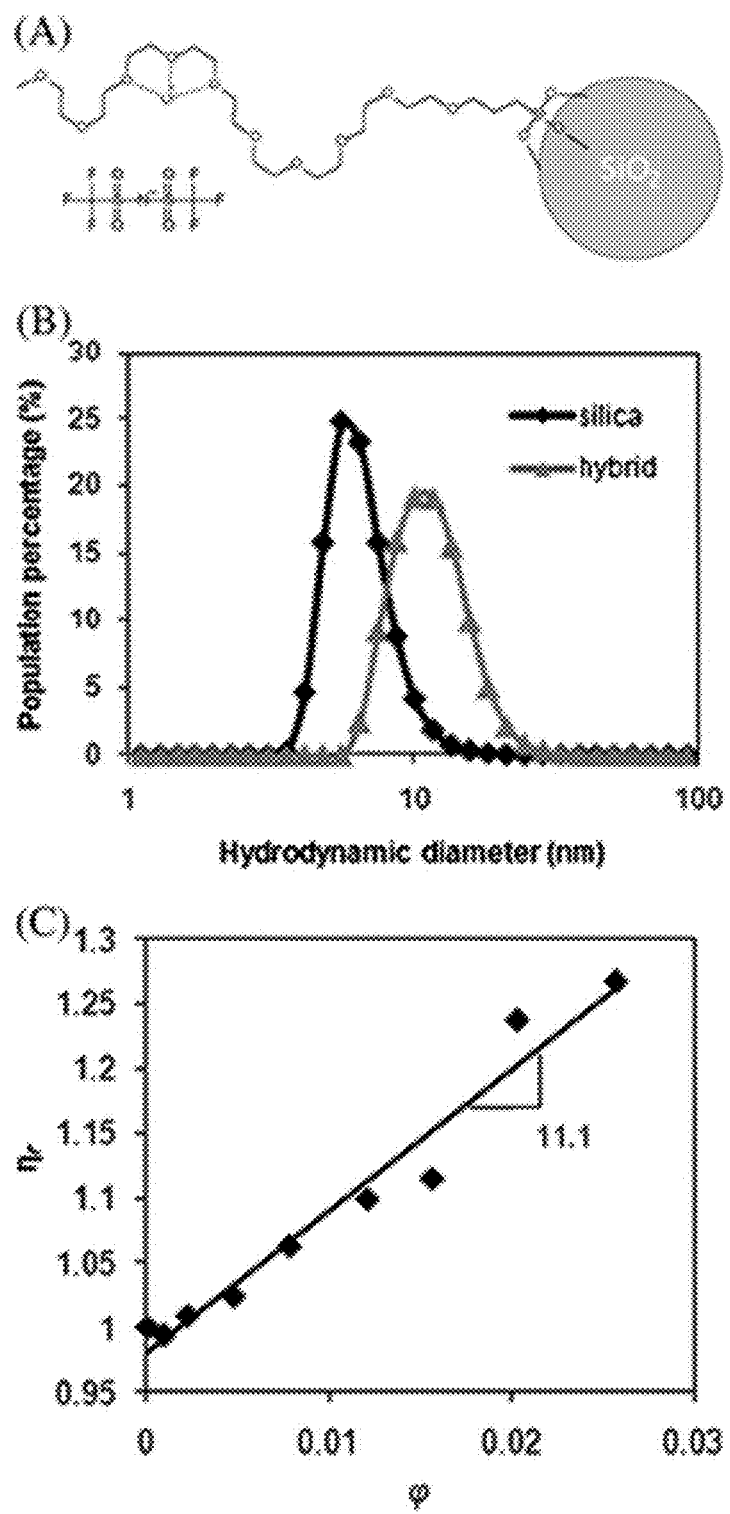
FIG. 12 is an example of $SiO_2$—PEG NOHMs hybrids: (A) schematic of polymer chain bonded to silica core with associated ions. (B) Dynamic light scattering measurements of the base silica and purified hybrid. (C) Plot of relative viscosity vs. φ used to determine the intrinsic viscosity of the hybrid units.

Silica nanoparticles were densely grafted, $\Sigma \approx 1.1$ chains nm$^{-2}$, with a polyethylene glycol methyl ether corona (FIG. 12A), and purified rigorously by repeated precipitation in ethanol. Electrolytes were prepared ranging from 0-100 wt % NOHMs in PEGDME, polyethylene glycol dimethyl ether (M$_n$, =250, Aldrich) and doped with lithium salt. PEGDME was chosen because it is a low-cost, non-volatile material known to exhibit excellent lithium ion conductivity. A solution of lithium bis(trifluoromethanesulfone imide) (LiTFSI, Aldrich) was prepared in dry methanol (Aldrich) in an Argon-filled glove box (MBraun Labmaster) before use. The lithium salt solution was added to the NOHMs/PEGDME blends at a concentration of 1 M in the organic phase for all samples. After mixing, samples were dried in the convection oven at 50° C. overnight and for at least 24 hours under high vacuum.

Characterization

The tethered PEG brush on the purified SiO$_2$ particles was characterized by several methods. Dynamic light scattering (DLS) was performed on a Malvern Instruments Zetasizer Nano-ZS at 25° C. Intrinsic viscosity of the particles in a low molecular weight polyethylene glycol dimethyl ether host was determined from dilute solution viscosity measurements at 35° C. using a Rheometrics Scientific ARES rheometer outfitted with 50 mm parallel plate fixtures. The core particle weight fraction in the hybrids was determined by thermal gravimetric analysis (TGA); heating at 10° C. min$^{-1}$ to 550° C.

The dynamic shear rheological properties of the electrolytes were studied using frequency- and strain-dependent oscillatory shear measurements on an ARES Rheometer and an Anton Paar MCR501. All experiments were performed at 35° C. Strain sweep measurements were executed at a fixed shear frequency, $\omega = 10$ rad s$^{-1}$; frequency sweep experiments were performed at a strain within the linear viscoelastic regime for the material—0.5% for the stiff hybrid electrolytes and 25% for the liquid-like materials. Glass transition temperatures of the electrolytes were determined with a TA Differential Scanning calorimeter at a ramp rate of 10° C. min$^{-1}$.

Electrochemical Measurements

The ionic conductivity and relaxation frequency of the electrolytes were measured as a function of temperature (−5 to 100° C.) using a Novocontrol Broadband Dielectric Spectrometer. The DC conductivity at each temperature was determined from the plateau value of a plot of Re[conductivity] as a function of frequency, as described by Jonscher The segmental relaxation frequency was taken to be the frequency associated with the major peak in tan($\delta$).

Electrochemical stability window, lithium transference number, and interfacial impedance of the hybrid electrolytes were performed on a Solortron Electrochemical Impedance Spectrometer. For all experiments, electrolytes with a high fraction of hybrid were charged to a donut shaped Teflon ring, which prevented short circuiting of the two lithium metal electrodes in the Swagelok stainless steel—Teflon cells. Electrochemical stability windows were determined by linear scan voltammetry at a scan rate of 1 mV s$^{-1}$, and taken to be the values at the change in slope of the current vs. voltage plot. The lithium transference number of the electrolytes was determined using the method proposed by Bruce and Scrosati where initial and steady state values of current are found for a symmetric lithium cell undergoing polarization, with corrections from impedance measurements of the interfacial resistance both before and after polarization.

Characterization of Nanoscale Hybrids

Dynamic light scattering (DLS) measurements in chloroform (FIG. 12B) indicated that the hybrids were comprised of a 2.4 nm PEG brush tethered to each SiO$_2$ nanoparticle core. Viscosity measurements (FIG. 12C) preformed on dilute suspensions of the SiO$_2$-oligo PEG particles in polyethylene glycol dimethyl ether, M$_n \approx 500$, can be fitted using the Einstein formula, $\eta = \mu_s(1+[\eta]\phi)$, to yield an intrinsic viscosity $[\eta] \approx 11.1$ for the particles. Here, $\eta$ is the suspension viscosity, $\mu_s$ is the viscosity of the suspending medium (PEG-500), and $\phi$ is the volume fraction of SiO$_2$ nanocores in the suspension. The measured intrinsic viscosity is evidently substantially larger than would be expected for a suspension of hard spheres, for which $[\eta]_{HS} = 5/2$; the difference can be used to compute the apparent swelling $\Delta \equiv 2$ h/d$\approx 0.65$ of the particles using the expression, $[\eta]/[\eta]_{HS} = (1+\Delta)^3$, where the term on the right is a correction to the volume fraction $\phi$ in Einstein's formula to account for the "extra" volume occupied by the tethered polymer chains; d$\approx 7$ nm is the average diameter (FIG. 11C) of the un-functionalized SiO$_2$ particles; and h is the hydrodynamic thickness of the PEG brush tethered to the particle. Thus we find h$\approx 2.3$ nm, which is satisfyingly close to the value deduced from DLS.

The equilibrium radius of gyration of a PEG chain of average molar mass M$_w$ can be estimated using the formula, $$R_g = \frac{1}{\sqrt{6}} \left( C_\infty \frac{M_w}{m_o} l_m^2 \right)^{1/2} \approx 6.6 \times 10^{-2} M_w^{1/2} \text{ nm.}$$

Thus for the tethered PEG-trimethoxy silane chains with M$_w$=660 g mol$^{-1}$, M$_{w,PEG} \approx 540$ g mol$^{-1}$, R$_g \approx 1.5$ nm and h=2R$_g \approx 3$ nm. Here C$_\infty$=5.5 is the characteristic stiffness ratio for PEG; l$_m \approx 0.48$ nm is the size of a statistical segment; and m$_0$=44 is the repeat unit molar mass for PEG. A more accurate estimate for the height of the tethered brush, which takes into account crowding and stretching of polymer chains in the brush, can be obtained using de Gennes' blob model for a neutral polymer grafted to a planar substrate modified to account for the spherical geometry of the substrate. This analysis yields $$h = \sum_i \frac{\xi_i}{g_i} \approx 3.6 \text{ nm,}$$

which is larger than the brush height obtained using both experimental methods. Here $\xi$ is the correlation length and g is the number of monomers per correlation volume in each layer of correlation blobs. The fact that the brush height estimated from R$_g$ is closer to the values derived from experiment, particularly for the small polymer chain lengths considered here, implies that the PEG chains assume a more collapsed (greater attraction) to the SiO$_2$ substrate than expected for the neutral polymer assumed in the analysis.

Characterization of Electrolytes

The transmission electron microscopy (TEM) image in FIG. 11B shows that the PEGDME 250-SiO$_2$ hybrid electrolytes are comprised of homogeneously dispersed nanoparticles in a suspending fluid, with no evidence of aggregation.

This latter feature is remarkable for the notoriously "sticky" SiO$_2$ nanocores; it attests to the effectiveness of the grafted PEG oligomers in imparting colloidal stability to SiO$_2$ particles.

Figure 13:
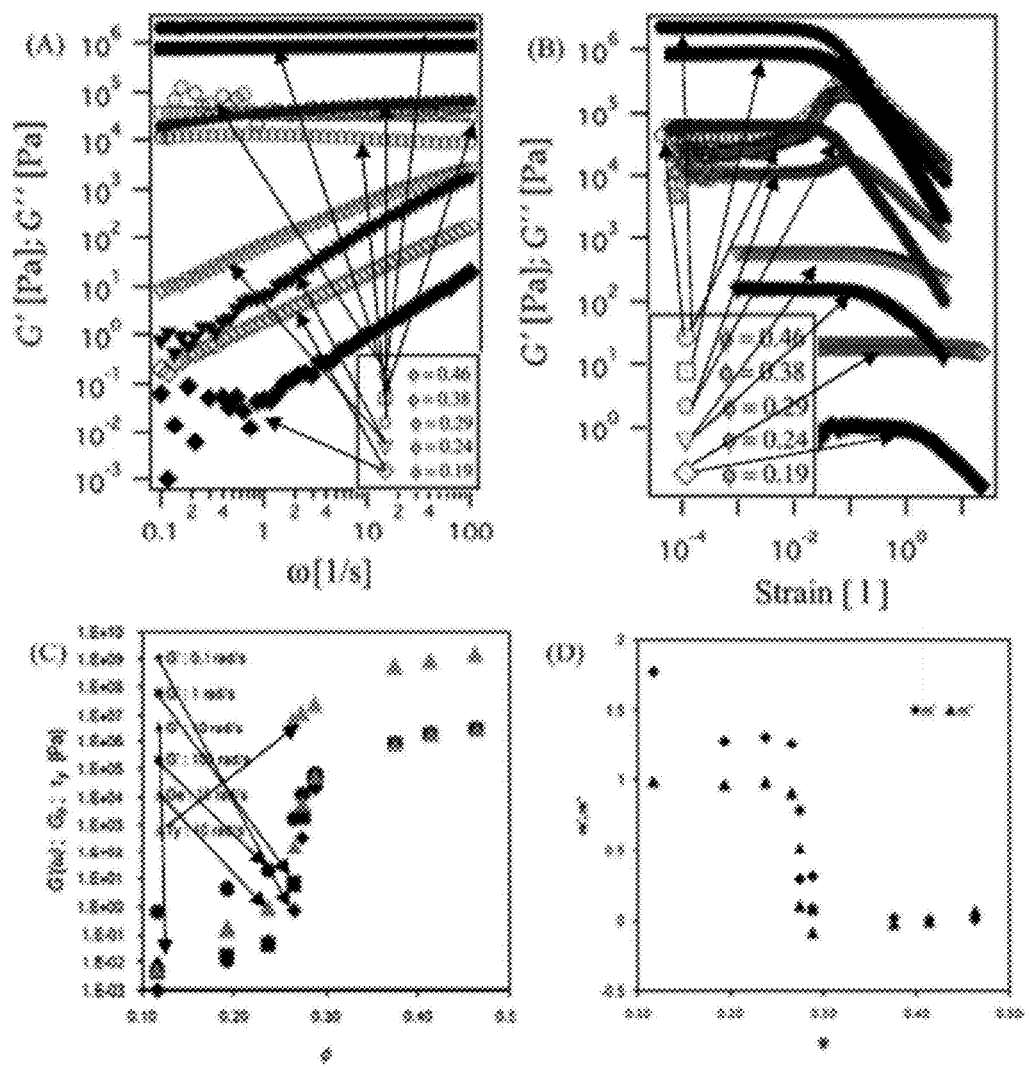
FIG. 13 shows rheology: (A) storage modulus, G', (filled symbols) and loss modulus, G", (open symbols) of PEGDME 250-$SiO_2$ hybrid electrolytes with varying φ, as a function of shear frequency, (B) G' and G" of the electrolytes as a function of strain, γ. (C) G' as obtained from frequency sweep measurements in the linear viscoelastic regime; $G_e$ and $τ_y$ as obtained from strain sweep measurements at ω=10 rad $s^{-1}$ as a function of φ. (D) Slopes m' and m" of the power law dependence of G' and G' from frequency sweep measurements.

FIG. 13A reports the dynamic shear elastic/storage, G', and viscous/loss, G", moduli of PEGDME 250-SiO$_2$ hybrid electrolytes at various SiO$_2$ volume fractions and shear frequencies, ω. In a typical elastic solid, motion of individual material elements is constrained by interactions with their neighbors and energy storage normal dominates viscous losses, G'>>G". In such a material the elastic modulus is set by interactions between neighboring material elements and generally will not change with shear frequency. At the opposite extreme are hybrid electrolyte suspensions where the viscous, fluid stresses dominate and hence G">G', and both are functions of φ. FIG. 13A shows that for a PEGDME 250-SiO$_2$ hybrid with φ=0.19, the minimum spacing between the particles, $d_{p-p}=[(\phi_m/\phi)^{1/3}-1]d\approx 0.5$ d>h, and G">>G', indicative of a fluid-like suspension. At a moderately higher SiO$_2$ volume fraction, φ=0.29; $d_{p-p}\approx 0.3$ d≈h, the storage modulus increases by more than four orders of magnitude, is greater than the loss modulus over the entire frequency range, and exhibits a much weaker dependence on frequency; indicative of a gel-like solid response. This observation confirms that the tethered PEG chains allow the jammed state to be accessed at lower φ. FIG. 13A further shows that by φ=0.46; $d_{p-p}\approx 0.1$ d<<h, G'>>G" and the dynamic moduli are essentially independent of shear frequency. This means that the suspensions are completely jammed and the tethered polymer brush highly compressed at particle volume fractions well below φ$_m$.

One advantage of a solid-like electrolyte created from a jammed suspension of particles is that, like its thermoplastic polymer host, it is processable. Specifically, at shear stresses above a critical value, τ$_y$, the jammed suspension yields and flows, and as such can be shaped in a typical manufacturing process. FIG. 13B demonstrates this feature through the effect of shear strain on mechanical moduli. In the small-strain limit γ→0, G' is independent of strain for all hybrids, which allows us to determine the apparent elastic modulus, $G_e=G'_{lim\ \gamma\to 0}$, for all materials. At low volume fractions, e.g. φ≈0.19, the condition G">>G' is observed at all strains, confirming that the materials are essentially fluids. Additionally, at shear strains order 2, the storage modulus is observed to decrease with increasing strain. Termed strain-softening, this characteristic is commonplace for polymer liquids and is thought to reflect shear alignment of macromolecules in the fluid.

At the next higher volume fraction, φ≈0.24, the shear strain at the onset of softening is much lower, in fact more than an order of magnitude lower than for a typical polymer. Additionally, at strains above this value both moduli decrease with increasing strain, and the shear stress (not shown) manifests a noticeable slope change. All of these features are characteristics of yielding, and the shear strain and stress at which the slope change is observed are the yield strain, γ$_y$, and yield stress τ$_y$ at the conditions of the measurements. At even higher volume fractions, φ≥0.29, γ$_y$ is essentially independent of φ and the loss modulus, G", manifests a pronounced maximum prior to the onset of strain-softening. This maximum is also a characteristic of yielding, it is thought to reflect enhanced viscous dissipation as the cages that constrain motion of individual particles are broken down by the imposed shear. Significantly, back-to-back experiments reveal negligible changes in τ$_y$ and γ$_y$, and at shear strains beyond the yielding transition, a cross-over to liquid-like flow behaviors, G">G', is observed; confirming that moderate shear stress/strain can be used to transform the jammed materials into a processable form, from which it rapidly recovers (becomes jammed again) upon removal of the stress/strain.

FIG. 13C reports the effect of SiO$_2$ volume fraction on G$_e$, τ$_y$, and G'. The figure shows that at a volume fraction φ=φ$_y$≈0.29 a dramatic mechanical transformation is observed in which the storage modulus, G', increases by over 4 orders of magnitude. These observations reflect a transition from a liquid-like state to a jammed, disordered solid-like material state. A similar transition is seen (FIG. 13D) when the low-frequency power-law indices, G'≈γ$^{m'}$; G'≈γ$^{m''}$, are plotted against φ, also indicative of a transition to a solid-like material at φ≈0.29. In a suspension of hard spheres, the jamming transition is known to occur at φ≈0.63. Extrapolation of this result to our hybrid system suggests that the inner 1.1 nm of tethered oligomers behave mechanically as part of the hard SiO$_2$ nanocore.

Figure 14:
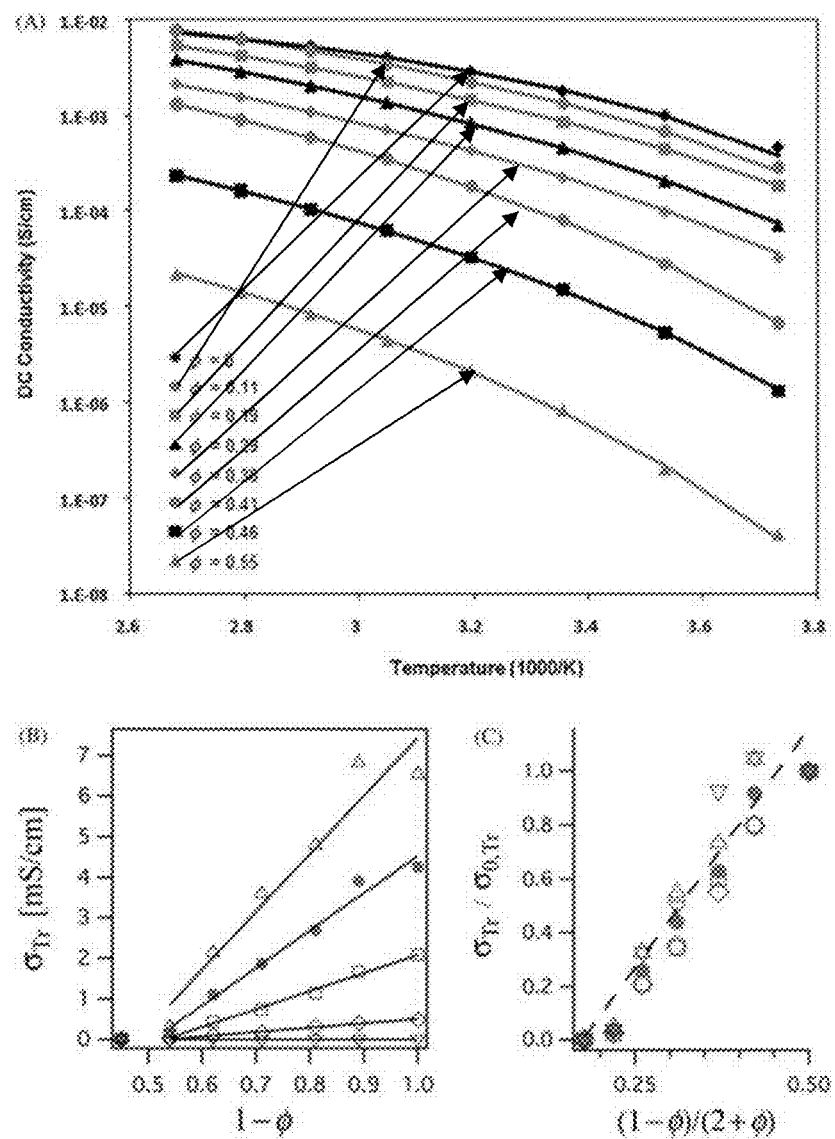
FIG. 14 is ionic conductivity: (A) full range of electrolytes from pure plasticizer to pure hybrid. Points are the actual data and lines are the VTF fits. (B) Temperature reduced conductivity $σ_{Tr}$, where $T_r$=T−$T_g$ for $T_r$=75, 90, 120, 150, 180 K. (C) Relative conductivity versus reduced core volume fraction.

Temperature-dependent ionic conductivity for PEGDME 250-SiO$_2$ hybrid electrolytes at various φ is reported in FIG. 14A. The material with φ=0.55 is the self-suspended/pure PEG-SiO$_2$ NOHMs, it contains no PEGDME 250. It is immediately evident from the plot that whether they are self- or oligomer-suspended, all hybrid electrolytes studied display Vogel-Thamann-Fulcher (VTF) temperature dependent conductivity, μ=Aexp (−B/(T−T$_0$)), over the entire temperature range. Here B is the pseudoactivation energy for coupled ion and local polymer segment motions/breathing modes; T and T$_0$ are the measurement and reference temperatures, respectively; and A is a pre-exponential factor. This behavior implies that the materials undergo no melting/crystallization transitions in the temperature range studied; this conclusion is supported by differential scanning calorimetry (DSC) measurements, which are silent in the same temperature range. These observations mean that, consistent with previous studies of Li$^+$ diffusion in PEG, segmental motion of the host and tethered PEG chains is important for the conduction mechanism. Table 2 summarizes the pseudoactivation energy B (from the VFT fits) and glass transition temperature T$_g$ (from DSC) for the materials in FIG. 14A. It is noteworthy that the pseudoactivation energy for conduction of the pure NOHMs electrolyte (i.e. fraction of tethered chains equal unity) is equivalent to that of the temperature fit of the frequency maximum in the tan(δ). This observation is significant because equivalent temperature dependence for these properties confirms that conduction occurs primarily by segmental motion of polymer chains.

TABLE 2

Pseudoactivation energy, B, of ionic conduction and glass transition temperature, T$_g$, of electrolytes as a function of SiO$_2$ volume fraction, φ

| φ | B/K | T$_g$/K |
| --- | --- | --- |
| 0 | 252 ± 26 | 181.5 |
| 0.11 | 415 ± 30 | 184 |
| 0.19 | 592 ± 5 | 186 |
| 0.29 | 718 ± 17 | 189.5 |
| 0.38 | 790 ± 38 | 194 |
| 0.46 | 856 ± 14 | 206 |
| 0.55 | 904 ± 84 | 213 |

Considering the dramatic changes in mechanical properties as hybrids are taken through the jamming transition, one might anticipate as remarkable changes in ionic conductivity. FIG. 14A and Table 2 show that this is not the case for PEGDME 250-SiO$_2$ hybrid electrolytes. In particular, FIG. 14A shows that the transition from liquid-like to a jammed physical state produces only a fractional decrease in conductivity at a chosen temperature value. The conductivity decreases noticeably, however, as $\phi$ is increased beyond $\phi_j$, and most notably for the pure NOHMs electrolytes. As a group, the hybrid electrolytes manifest the desirable attribute of maintaining both high conductivity and mechanical strength. For example, a material with $\phi=0.38$; $d_{p-p}\approx 0.2$ d=1.3 nm and mean pore size $$a = \frac{2}{3}\frac{(1-\phi)}{\phi}d \approx 1.1d = 7.6 \text{ nm}$$

displays a storage modulus close to 1 MPa and an ionic conductivity of $3.5\times10^{-4}$ S cm$^{-1}$ at 35° C., and even a practical conductivity of $1.0\times10^{-4}$ S cm$^{-1}$ at 10° C. Likewise, the pseudoactivation energy for conduction in the hybrid with $\phi=0.38$ is around 80% higher than the value in the hybrid with the lowest $SiO_2$ content ($\phi=0.11$)), while the elastic modulus, $G_e$, is close to eight orders of magnitude larger.

That remarkable changes in mechanical properties in the hybrids produce at most modest changes in ionic conductivity suggests that even in a solid-like electrolyte material, ion conduction occurs more or less unimpeded by the jammed structures that produce mechanical reinforcement. The radius of gyration of PEGDME 250 can be crudely estimated using the formula presented earlier, $R_g\approx 1$ nm. The ionic radius of the bis(trifluoromethanesulfonyl) imide) (TFSI) anion has been estimated using hole theory for transport to be 3.62 Å, substantially larger than the radius of a lithium ion, 0.76 Å. The dielectric constant D for PEG of molecular weight 200 has been reported to be 18.43 at 30° C., the Debye screening length is $\lambda_D = (\in_0 DRT/2000F^2I)^{1/2} \approx 1.5$ Å at 30° C. for a 1 M solution of LiTFSI in PEG. Here F is the faraday charge; $\in_0$ is the vacuum permittivity; and I is the ionic strength of the electrolyte. Thus for the PEGDME 250-$SiO_2$ hybrid electrolyte with $\phi=0.38$ discussed above, PEG chains are strongly confined and TFSI ions can move, at best in single-file, undisturbed by the smallest bottlenecks in the porous material. For the pure NOHMs electrolyte, $\phi=0.55$; $d_{p-p}\approx 0.05$ d=3.2 Å, even single-file passage of TFSI through the bottleneck region is on average disallowed. However, the mean pore diameter, a≈0.55 d=3.8 nm, in the "continuum" representation of the material is still large enough to allow bulk-like ion transport in the pores.

If ion transport in PEG-$SiO_2$ suspension electrolytes occurs by the same mechanisms as in bulk PEG—segmental motion and diffusion—the ionic conductivity should be to leading order proportional to the "void fraction", $(1-\phi)$. This statement is explored in FIG. 14B where the conductivity is plotted against void fraction at various temperature distances from the glass transition, $T_r = T - T_g$. Surprisingly, the figure shows that with the possible exception of the pure NOHMs electrolyte, the ionic conductivity is in fact proportional to the void fraction over the entire range of particle volume fractions. The figure also shows that the proportionality constant increases with increasing $T_r$, and that the jamming transition has no effect on ionic conductivity. Thermal and ionic conductivity in particle suspensions have been studied by several groups, using a framework proposed by Maxwell. In this model, the effective conductivity, $\sigma$, of a homogeneous suspension of particles of conductivity, $\sigma_p$, volume fraction, $\phi$, dispersed in a medium of conductivity, $\sigma_0$, can be computed using a simple formula, $\sigma/\sigma_0=(1-2\alpha\phi)/(1+\alpha\phi)$, where $\alpha=(\sigma_0-\sigma_p)/(2\sigma_0+\sigma_p)$ and $\sigma/\sigma_0$ is the relative conductance at the specified temperature. In the limiting case where the particles are perfect insulators $\alpha=1/2$ and Maxwell's formula becomes, $\sigma/\sigma_0=2(1-\phi)/(2+\phi)$.

FIG. 14C shows several important features of the ionic conductivity manifested by our hybrid electrolytes are consistent with this model. First, the strong temperature dependence seen in the main figure essentially disappears when the conductivity is expressed in terms of the relative conductivity at the same $T_r$. This means that the conduction mechanism in the hybrids is the same as in free PEG. Additionally, it means that the change in shape of the conductivity versus temperature plots in FIG. 14A originates from the effect of $\phi$ on $T_g$. Second, the figure shows that when plotted in the Maxwell form, assuming that $SiO_2$ is an ionic insulator, the relative conductivity is a linear function of the abscissa variable for all values of $\phi$, including the pure (self-suspended) NOHMs electrolyte. This result is remarkable; it means that the simple physics in the Maxwell expression are applicable over the entire range of volume fraction of $SiO_2$ in the hybrids. The uniform particle spacing produced by the tethered PEG chains allows for this favorable result, which varies from the properties expected of a system with a percolated non-conducting phase where conduction is markedly inhibited. It is important to point out, however, that the slope of the straight line in FIG. 14C is 3.5, compared to the theoretical value of 2. This difference implies that the $SiO_2$ particles do make a non-negligible contribution to the ionic conductivity of the hybrids, likely because the tethered PEG chains are able to interact with Li$^+$ which reduces its mobility. Based on findings from our previous study which show that changing the core particle chemistry from $SiO_2$ to $TiO_2$ has no effect on the conduction properties, we believe that the dense functionalization of the nanoparticle surface with oligomers inhibits the anion adsorption effect reported in "soggy-sand" electrolytes.

Figure 15:
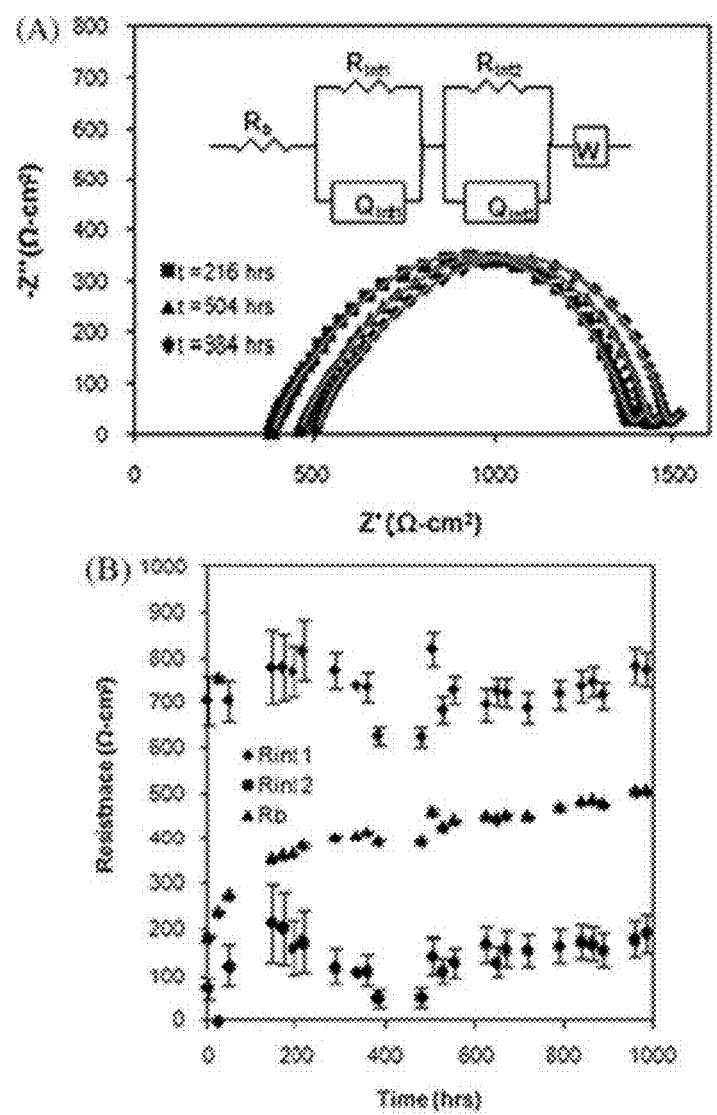
FIG. 15 provides a representative electrochemical characterization: (A) interfacial charge transfer resistance of an aging cell at discrete points in time. Lines are fits to the displayed equivalent circuit model. (B) Values of the resistances $R_{int1}$, $R_{int2}$, and $R_b$, determined by circuit fitting, as a function of time. (C) Electrochemical stability windows of pure PEGDME electrolyte (φ=0) in red, and plasticized NOHMs electrolyte (φ=0.3) in black.
Figure 15:
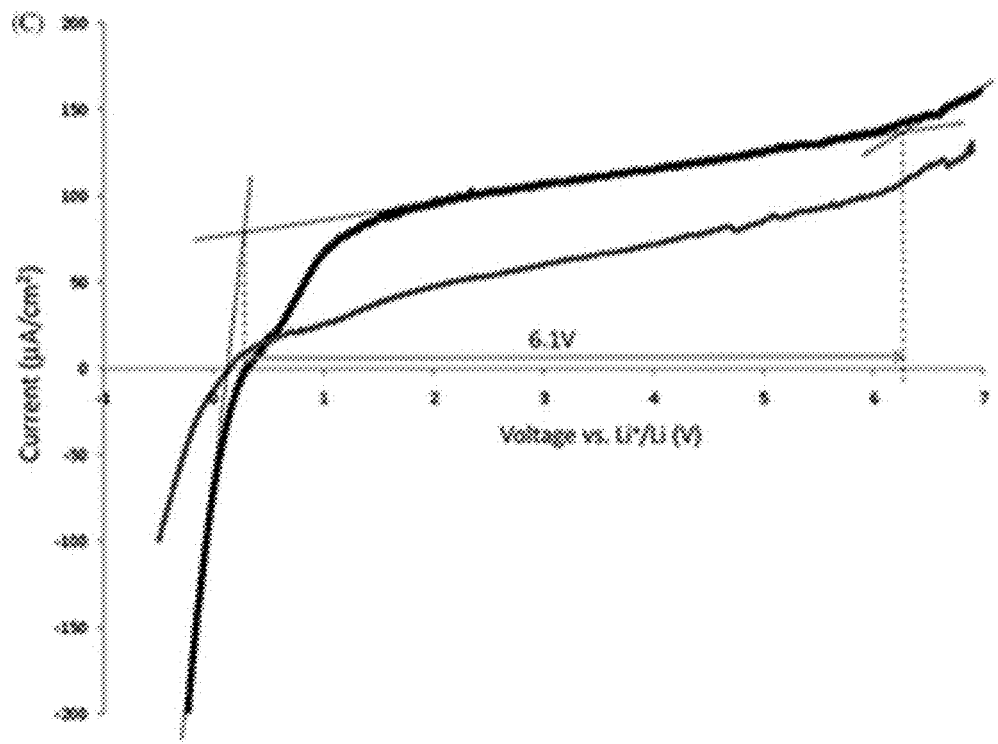
Figure 16:
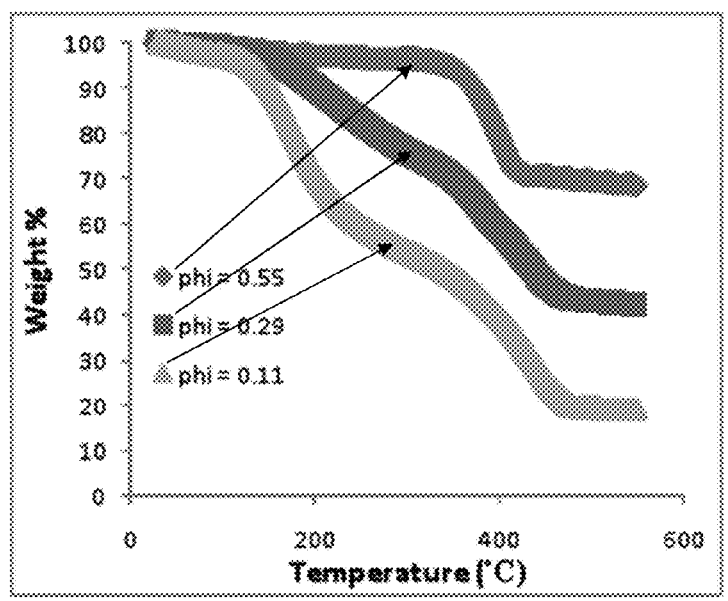
FIG. 16 shows representative TGA plots for pure and plasticized hybrid electrolytes. As shown, the pure NOHMs electrolyte is thermally stable to above 350° C. The plasticized electrolytes have reduced thermal stability due to the decomposition of PEGDME 250.
Figure 17:
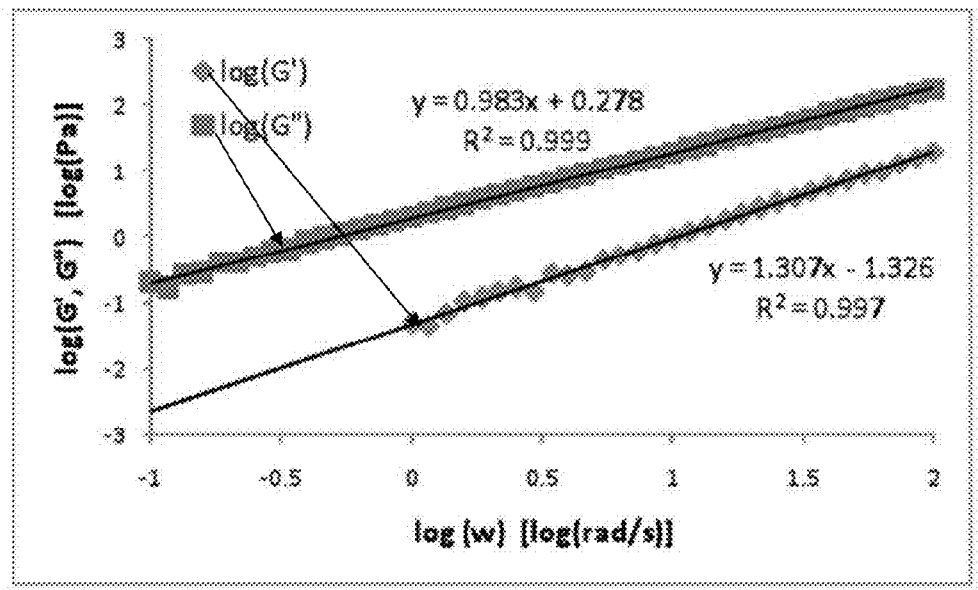
FIG. 17 shows power law frequency dependence of the moduli: Example data analysis for a hybrid electrolyte with φ=0.24. For G', G" ~$ω^m$, m is the slope in the applicable fit equation.
Figure 18:
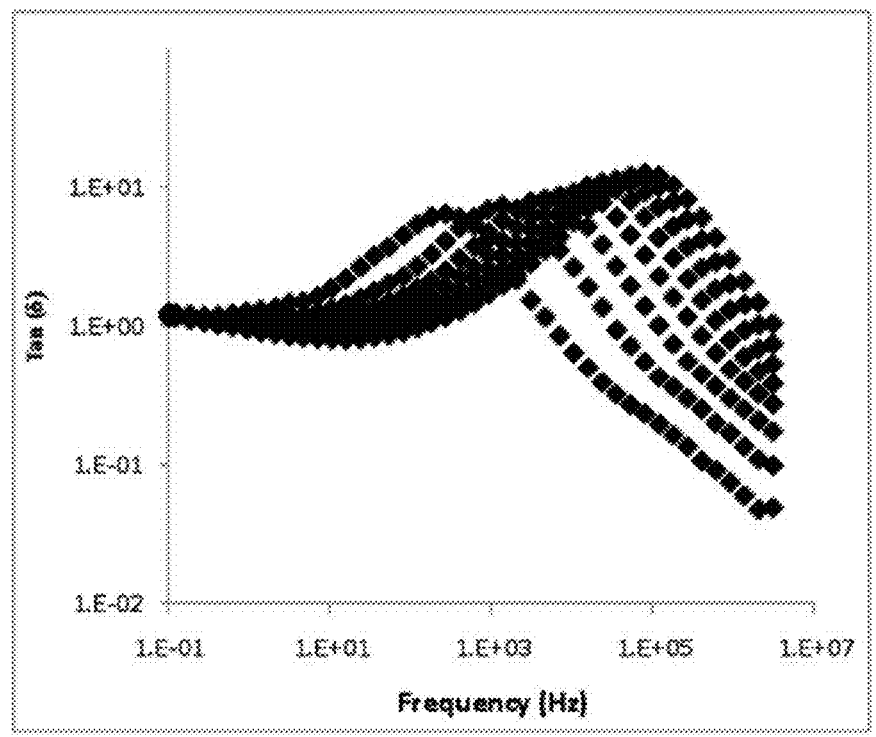
FIG. 18 shows tan(delta) VFT fit: Data of tan(δ) vs. frequency at temperatures −5 to 100° C. in 15° C. increments for an example of a pure hybrid electrolyte (φ=0.55) as obtained from dielectric spectroscopy. Values of the frequency maximum were recorded for fit to the VFT equation.
Figure 19:
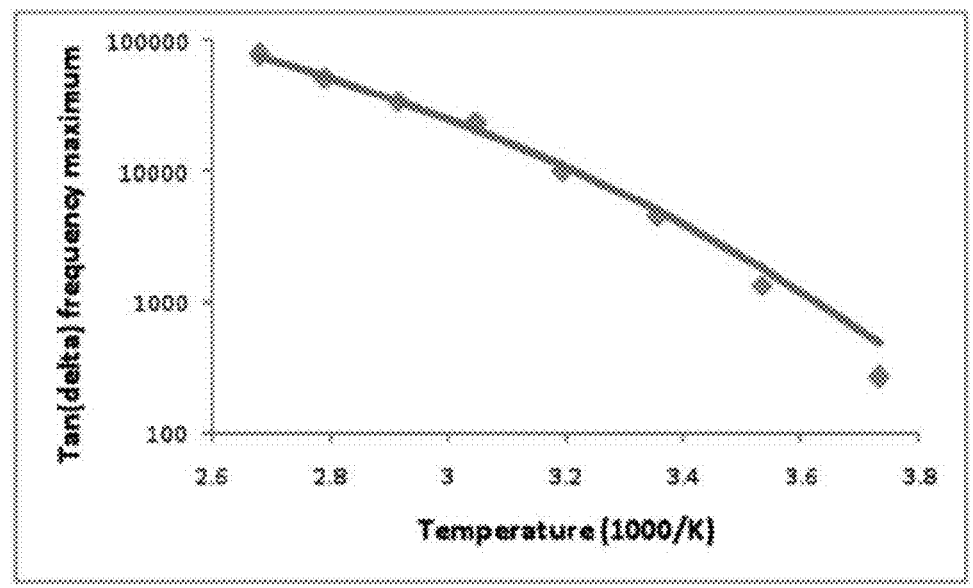
FIG. 19 shows data points for the frequency maximum of Tan(δ) as obtained from above, fit to VTF equation is line in red. For frequency VTF fit: B=−890±360. Similarly, B=−900±80 for ionic conductivity fit. This suggests that the mechanism for ionic conduction is through semental motion.
Figure 20:
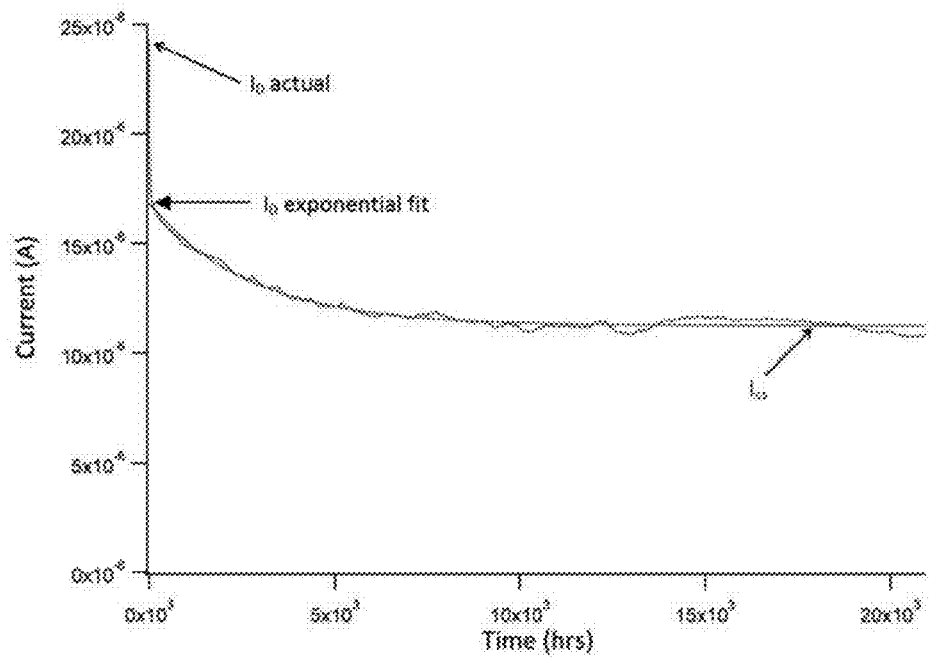
FIG. 20 is an example of a current decay while undergoing a 50 mV polarization. Calculations were performed with the actual $I_0$ and $I_0$ determined by fit to an exponential decay function; $I_{ss}$ was determined by fit to an exponential decay function
Figure 21:
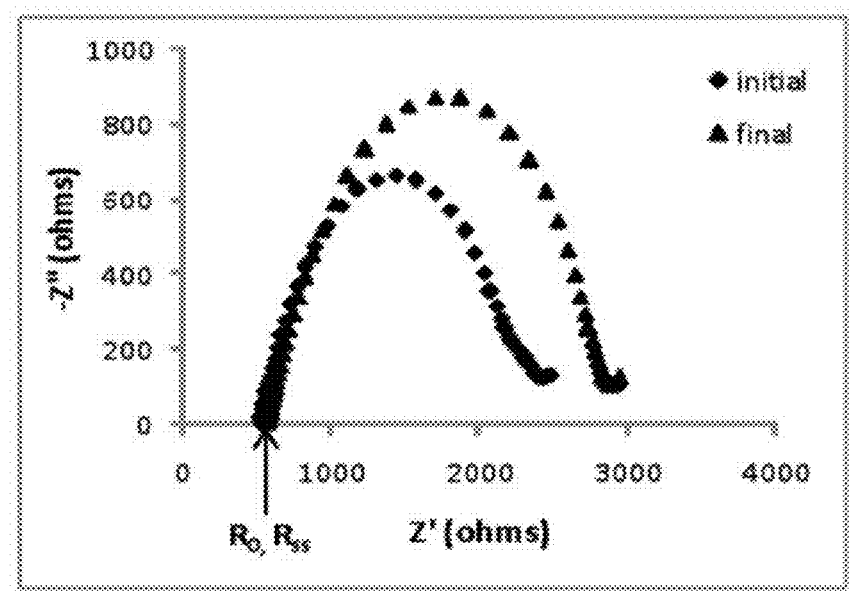
FIG. 21 shows representative impedance measurements from $10^4$ to $10^{-1}$ Hz, before and after polarization, to determine interfacial charge transfer resistances, $R_o$ and $R_{ss}$.

Electrochemical stability measurements were conducted on a jammed suspension electrolyte, $\phi=0.3$, in a symmetric, lithium/electrolyte/lithium, configuration in Swagelok cells. FIG. 15A shows the impedance response at various intervals in time; the points are the data and lines are fits to the equivalent circuit model in the inset. This circuit model has been used previously to explain the impedance response of electrolytes in symmetric lithium cells, where $R_b$ is the bulk electrolyte resistance, $R_{int1}$ and $R_{int2}$ are interfacial resistances, $Q_1$ and $Q_2$ are the corresponding constant phase element capacitances, and W is the Warburg diffusion element. FIG. 15B summarizes the magnitude of the bulk and interfacial resistances, which near steady-state values over a 1000 hour evaluation period. Consistent interfacial resistances and impedance response means that a stable solid electrolyte interfacial (SEI) layer is formed with metallic lithium. FIG. 15C shows the electrochemical stability window for both the jammed hybrid and pure PEGDME electrolytes in contact with lithium. Like most PEG/PEO based electrolytes, the cathodic stability is about 0.3 V; the anodic stability of this electrolyte is around 6.3 V. This wide electrochemical stability window allows for the potential use of this electrolyte with a range of electrode materials. Finally, the lithium transference number, the fraction of the ionic conductivity due to lithium transport, was determined by the Bruce/Scrosati method:

$$T_{Li} = \frac{I_{ss}(\Delta V - I_0 R_0)}{I_0(\Delta V - I_{ss}R_{ss})}$$

where $I_0$ and $I_{ss}$ are the initial and steady-state current of a cell undergoing a polarization potential of $\Delta V$, and $R_0$ and $R_{ss}$ and the interface charge transfer resistances before and after polarization. The transference number was determined to be less than unity, as expected for a PEG based system: $T_{Li+}=0.4\pm0.1$ when $I_0$ was taken to be the actual measured initial current and $T_{Li+}=0.65\pm0.1$ when $I_0$ is taken to be the initial current as estimated by fitting the transient current to a single exponential decay.

Nanoporous Hybrid Electrolytes

Synthesis. An alkaline stabilized dispersion of silica nanoparticles, Ludox SM-30 (Aldrich) was diluted to 4 wt % particle fraction by addition of aqueous potassium hydroxide solution, pH~10. [Methoxy(polyethyleneoxy)propyl]trimethoxysilane, 90% (Gelest) at a ratio of 0.6 g silane-PEG per 1.0 g silica was added dropwise, while stirring, in three aliquots each separated by heating at 100° C. in an oil bath for 1 hour followed by 10-15 minutes of sonication. Following the addition of the final aliquot of silane-PEG, the reaction solution was heated for 6 hours in an oil bath at 100° C. The reaction solution was then poured into wide petri dishes and heated overnight in a convection oven at 70° C. to drive off remaining water and complete the silane reaction. The following day, the NOHMs were purified by washing with ethanol 3 times to remove any free silane-PEG, and resuspended in chloroform.

Determination the Lithium Transference Number:

Lithium transference measurements performed on a Li/electrolyte, $\phi=0.30$/Li cell using the method proposed by Bruce and Scrosati where initial and steady state values of current are found for a symmetric lithium cell undergoing polarization, with corrections from impedance measurements of the interfacial resistance both before and after polarization.

Example 11

In this example, silica ($SiO_2$) nanoparticles densely grafted with amphiphilic organic chains are used to create a family of organic-inorganic hybrid lubricants. Short sulfonate-functionalized alkylaryl chains covalently tethered to the particles form a dense corona brush that stabilizes them against aggregation. When these hybrid particles were dispersed in poly-α-olefin (PAO) oligomers, they formed homogeneous nanocomposite fluids at both low and high particle loadings. By varying the volume fraction of the $SiO_2$ nanostructures in the PAO nanocomposites, we showed that exceptionally stable hybrid lubricants can be created and that their mechanical properties can be tuned to span the spectrum from simple liquids to complex gels. We further showed that these hybrid lubricants simultaneously exhibit lower interfacial friction coefficients, enhanced wear and mechanical properties, and superior thermal stability in comparison with either PAO or its nanocomposites created at low nanoparticle loadings. Profilometry and energy dispersive X-ray spectroscopic analysis of the wear track show that the enhanced wear characteristics in PAO-$SiO_2$ composite lubricants originate from two sources: localization of the $SiO_2$ particles into the wear track and extension of the elastohydrodynamic lubrication regime to Sommerfeld numbers more than an order of magnitude larger than for PAO.

In this example we report on synthesis and tribological behaviors of a family of PAO-based organic-inorganic hybrid lubricants created by dispersing densely functionalized nanoscale organic hybrids (NOHMs) and nanoscale ionic materials (NIMs) in PAO oligomers. Significantly, hybrid lubricants created using either platform manifest exceptionally stable interfacial friction and wear properties at high nanoparticle loadings. Although demonstrated here using PAO base oils and a single-core particle chemistry ($SiO_2$) and size (d≈12 nm), nanoscale hybrid lubricants created using other lubricating fluids, particle chemistries, sizes, and shape can be facilely synthesized using the approaches discussed in this example.

Preparation of PAO-NOHMs Composite Lubricants

Figure 22:
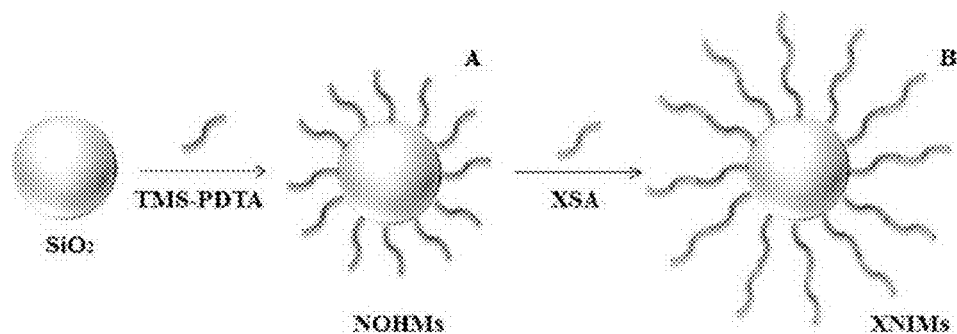
FIG. 22 is an example of a schematic representation of (A) NOHMs and (B) XNIMs synthesis.

NOHMs were synthesized by tethering a base-stabilized organic silane to $SiO_2$ nanoparticles suspended in $H_2O$. A 40 wt %, NaOH-stabilized aqueous suspension of 12 nm diameter $SiO_2$ in water, LUDOX HS-40, was purchased from Sigma-Aldrich Chemicals and used as received. (3-Trimethoxysilylpropyl)-diethylenetriamine (TMS-PDTA) was purchased from Gelest and used to form corona around the $SiO_2$ core (as shown in FIG. 22A). Prior to the linking reaction, the LUDOX HS-40 suspension was diluted in DI water to form a 3 wt % solution. TMS-PDTA in large excess (2 g TMS-PDTA/1 g $SiO_2$) was divided into three aliquots and added drop-by-drop to the silica dispersion maintained at a temperature of 95° C., with rapid stirring. This procedure ensures that in the early stages of the linking reaction TMS-PDTA/$SiO_2$ contacts occur preferentially, which favors the linking reaction to silica over the competing polymerization reaction of the TMS-PDTA molecules. After the addition of each aliquot, the reaction was allowed to proceed in an open vessel with gentle stirring until the volume of liquid reduced by half; evaporation of water is required to convert the hydrogen bonds created upon first contact of TMS-PDTA and aqueous $SiO_2$ to more stable covalent siloxane bridges.

After completion of the linking reaction, unlinked TMS-PDTA and other impurities were removed using a two-step procedure. In the first step, repeated dialysis of the suspension in 10 000 MWCO-snakeskin dialysis tubing was performed to remove molecular TMS-PDTA and NaOH. The resultant suspension from step 1 was further purified by repeated precipitation in tetrahydrofuran (THF, Sigma-Aldrich). This procedure simultaneously removes the inevitable small fraction of TMS-PDTA polymers created in the linking step with Mw greater than the 10 000 MWCO of the dialysis membrane and provides a convenient method for gently (relative to evaporation) stripping the last residue of water from the suspension. (Water is miscible in all proportions with THF.)

Figure 23:
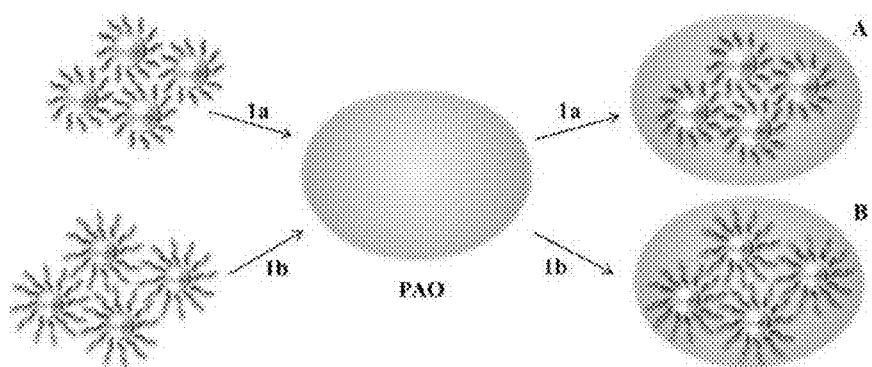
FIG. 23 is an example of a schematic representation of (A) PAO-NOHMs (path 1a using 5:1 toluene/2-propanol as a solvent) and (B) PAO-XNIMs (path 1b using toluene as a solvent) blending.

To create hybrid lubricants, we obtained Synfluid PAO 100 cSt from Chevron Phillips Chemical and used it as received. A solution-blending procedure, involving a 5/1 mixture of toluene and 2-propanol as solvent, was employed to produced PAO-NOHMs composites (as shown in FIG. 23A). Specifically, NOHMs obtained using the procedures outlined in the previous section were first dispersed in the toluene/2-propanol solvent to form a homogeneous, transparent solution. The desired amount of PAO, based on the NOHMs loading targeted, was dissolved in toluene, and the solution was added to the NOHMs suspension with vigorous stirring. The resultant composite solution was transferred to a convection oven, and the solvent was driven off.

TMS-PDTA was selected for this study for at least three reasons. First, it is an amphiphilic molecule that forms stable solutions in water at high PH as well as in alcoholic solutions of many organic liquids. Second, the large number of accessible amino groups it imparts to the particle surface provides a mechanism for creating strong, stable bonds with metallic substrates, even at elevated temperature. Additionally, these tethered amino groups provide numerous sites for additional surface functionalization, which can be used to manipulate dispersion state and interfacial properties of the resulting NOHMs in a range of lubricant base oils. Finally, the material is available inexpensively from multiple commercial sources, which makes it a good candidate for large-scale synthesis of hybrid lubricants. The amphiphilic nature of TMS-PDTA is important because it allows the organosilane linking reaction to be performed on particles in base-stabilized aqueous or alcoholic suspensions, that is, the native state for most sol-gel-derived metal oxide nanostructures. This limits inevitable aggregation that occurs in conventional surface functionalization reactions on nanoparticles, which typically require that the particles are first dried and subsequently redispersed in organic solvents such as toluene. A direct benefit is that very high surface coverages ($\Sigma$=1 to 2 molecules/nm$^2$) of the silane are achieved, which in turn improves the colloidal stability and tenability of the functionalized nanoparticles.

Preparation of PAO-NIMs Composite Lubricants

NIMs were synthesized by tethering base-stabilized, sulfonate-terminated alkylaryl chains to the amine-functionalized particles synthesized in Section. Xylene sulfonic acid (XSA-1416, $M_w$=396.6 g/mol) was obtained from Oil Chem Technologies and used to create an ionically tethered corona around the NOHMs particles. (See FIG. 22B.) An ion-exchange procedure was used to remove Na+ ions present in XSA.

Specifically, Dowex HCR-W2 (Sigma-Aldrich) ion-exchange resin was used at a resin-to-XSA ratio of 20:1 by weight for this purpose. Repeated washing in nonaqueous media provides an alternative to the ion exchange method. XSA was diluted in a 5/1 mixture of toluene and 2-propanol, and the solution was run through the ion exchange column four times to ensure complete replacement of Na$^+$ ions with protons, which was confirmed by pH measurements on aqueous solutions of the sulfonic acid form of XSA obtained using the ion exchange procedure.

TMS-PDTA offers optimally three amine sites per bound ligand that can be used to form sulfonic acid-amine bonds to tether the XSA chains. To maximize the coverage of XSA, excess XSA was used for the linking step, and the excess was removed by repeated precipitation. Specifically, NOHMs synthesized in Section were diluted in a 5/1 mixture of toluene and 2-propanol and stirred overnight to produce a transparent solution. Excess XSA in the same solvent mixture was subsequently added, and the mixture was stirred for 2 days to ensure that the sulfonic-acid amine reaction went to completion. Solvent from the resulting solution was evaporated in a convection oven for 1 day, and untethered XSA chains were subsequently removed by repeated precipitation using a toluene/methyl alcohol mixed solvent with incremental addition of methyl alcohol for each successive wash. After drying, the resultant soft particles were characterized by thermogravimetric analysis (TGA), and the grafting density $\Sigma$ was estimated from the organic content to be 2 to 3 molecules/nm$^2$. Unlike their amine-functionalized SiO$_2$ particle precursors, XSA-NIMs (XNIMs, for simplicity in the following discussion) created using this procedure showed exceptional dispersion in toluene, which is consistent with the greater hydrophobicity of the corona imparted by the densely grafted XSA. XNIMs/PAO hybrid lubricants (FIG. 23B) were prepared using the same method as that employed for the PAO/NOHMs hybrids, except toluene was used exclusively as the dispersing medium.

NOHMs/XNIMs Characterization

A Zetasizer Nano ZS (Malvern Instuments) was used to measure the hydrodynamic diameter of NOHMs and XNIMs particles. An FEI T12 Spirit TEM STEM was used to obtain transmission electron microscopic (TEM) micrographs of the materials to characterize directly the dispersion state of both types of hybrid nanoparticles in PAO. A Thermo Scientific TGA was used to quantify the inorganic content in the NOHMs and XNIMs, which allows the respective grafting density to be estimated.

Dynamic Mechanical Properties of PAO-NOHMs and PAO-XNIMs Composite Lubricants

Mechanical properties of PAO base oils, PAO-NOHMs and PAO-XNIMs composite lubricants, were characterized in a dynamic shear configuration. Specifically, PAO-NOHMs and PAO-XNIMs composites were sandwiched between cone-and-plate fixtures in a mechanical rheometer (MCR 501, Anton Paar). The MCR was operated in shear mode and reports the elastic/storage modulus, G', and loss modulus, G'', as a function of a variety of variables: shear strain, $\gamma$, oscillation frequency, $\omega$, and temperature, T. Moduli measurements at fixed oscillation frequency and temperature but variable shear strain are particularly useful in that they can be used to establish quickly the universal class (e.g., linearly elastic, nonlinear viscoelastic, simple liquid, soft glass, gel) to which our composites belong.

Tribological Properties of PAO-NOHMs and PAO-XNIMs Composite Lubricants

A ball-on-three-plates tribometer was used for characterizing the interfacial friction behavior of the composite lubricants. Equivalent concentration of PAO-NOHMs and PAO-XNIMs composite lubricants dissolved in solvent was applied on the steel plates and dried completely in convection oven for the testing. These measurements were also performed using the MCR 501, in this case outfitted with the ball-on-three-plates configuration depicted in FIG. 24. To characterize the tribological behavior of a material, we applied torque and normal force to the shaft, and the steel ball rotates relative to the stationary plates. Significantly, the plates sit on a gimbal mount that allows their positions to be adjusted in all directions for even distribution of friction contacts. Additionally, in our experiments, the three plates were maintained at an angle $\alpha$=45° with respect to the measuring cell (FIG. 24), and a steel ball with radius of 6.35 mm was used to induce contacts. On the basis of this geometrical setup, the normal load and friction force can be calculated as followed $$F_L = 2 \cdot F_N \cdot \cos(\alpha) \tag{1}$$

$$F_F = M/(r_{ball} \cdot \sin(\alpha)) \tag{2}$$

$$\mu = F_F / F_L \tag{3}$$

FN and FL are the normal force applied and normal load, respectively, M is the torque applied, and $\mu$ is the friction coefficient. In this study, normal loads of 20 and 60 N were chosen, and Stribeck curves were constructed to study the effect of sliding (rotation) speed on the friction coefficient and investigate the lubrication characteristics of the PAO-NOHMs and PAO-XNIMs composite lubricants in various lubrication regimes.

Thermal Stability of PAO-NOHMs and PAO-XNIMs Composite Lubricants

Temperature-dependent rheology measurements were performed using the MCR 501 to evaluate the thermal stability of the materials. Specifically, cone-and-plate shear flow was used to measure the shear-rate dependent viscosity, or flow curve, of the materials at two temperatures, 30 and 100° C. Three discrete compositions of NOHMs (4.1, 29, and 45 wt %) and XNIMs (5.5, 38.7, and 60 wt %) in PAO were used for these experiments, where each composition is equivalent to SiO$_2$ contents of 3.7, 26.1, and 40.4 wt %, respectively. The viscosities of many PAO-based lubricating oils are known to decrease markedly with increasing temperature, but even small amounts of nanoparticle additives in the base oil have been reported to improve dramatically the thermal stability of their viscous properties. We anticipate that this stabilizing effect of nanoparticles will be as large at the high end of the particle composition range studied.

NOHMs and XNIMs Characterization

Figure 25:
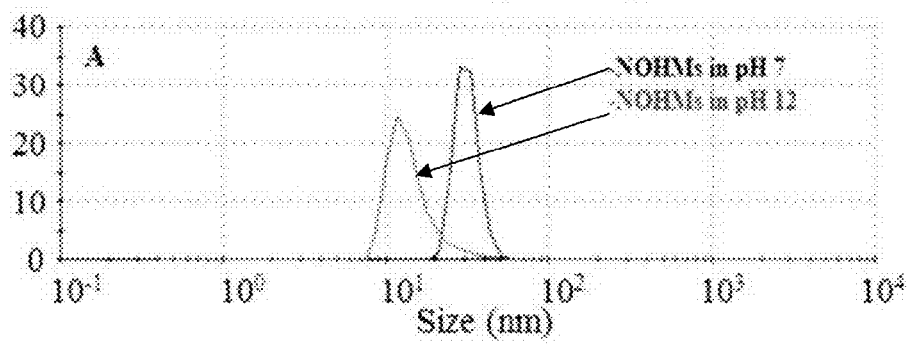
FIG. 25 shows particle size distribution (A) for NOHMs in deionized water at pH of 7 and 12 and (B) for XNIMs in toluene.
Figure 25:
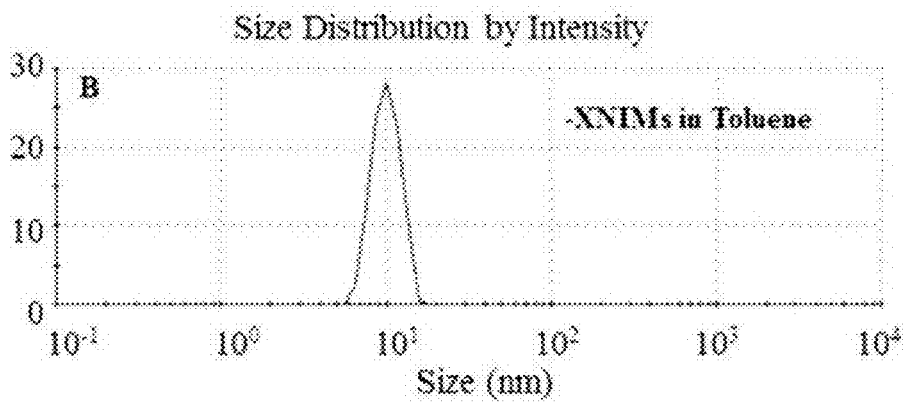

FIG. 25 reports the size distribution of NOHMs and XNIMs particles measured using a Zetasizer. According to Sigma-Aldrich, the $SiO_2$ nanoparticles in LUDOX HS-40 have an average diameter of 12 nm. FIG. 25A shows that the average size of $SiO_2$ nanoparticles increases after grafting TMS-PDTA. Specifically, the Figure shows that the average diameter of the original $SiO_2$ nanoparticles in deionized water increases from ~12 to 31 nm (FIG. 25A). The three-fold increase in diameter is substantially larger than expected from grafting of TMS-PDTA to the original $SiO_2$ nanospheres. It is tempting to attribute this result to aggregation of the primary NOHMs structures; however, the clear narrow particle size distribution achieved with surface functionalization is inconsistent with this explanation. However, when NOHMs are placed in high pH environment, where $SiO_2$ nanoparticles in LUDOX HS-40 come as a base-stabilized colloidal system to prevent $SiO_2$ nanoparticles from aggregating, we see that the size distribution of NOHMs becomes consistent with the reported size of $SiO_2$ nanoparticles. Additionally, we have that when these particles are dispersed in hydrophobic PAO and imaged by TEM, their sizes are substantially smaller and close to that expected for the TMS-PDTA grafted $SiO_2$ particles. We therefore conclude that the factor of three enhancements in the average particle diameter seen in FIG. 25A originates from spontaneous, reversible organization of the amphiphilic particles in pH neutral water. XNIMs particles were prepared in nonpolar solvent, toluene. FIG. 25B shows clear narrow particle size distribution around the reported size of $SiO_2$ nanoparticles. This result implies high canopy density of XSA around NOHMs, which allows high dispersion in nonpolar medium. We will further show inorganic content measurement from TGA, which allows canopy grafting density calculation and shows TEM image of highly dispersed XNIMs in hydrophobic PAO.

Figure 26:
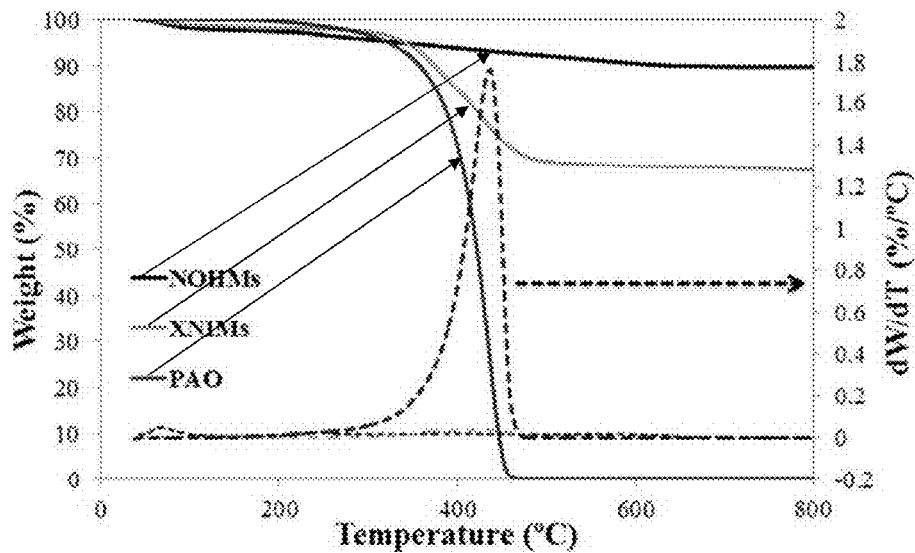
FIG. 26 is a representative thermogravimetric analysis (TGA) of PAO, NOHMs, and XNIMs.

TGA provides a simple method for quantifying the organic content of any organic-inorganic hybrid material. FIG. 26 shows the thermal degradation of the organic component in PAO, NOHMs, and XNIMs. Temperature was raised from 30 to 800° C. At this point, only $SiO_2$, which has a melting temperature of 1650° C. at 1 atm, would remain. PAO shows complete degradation at ~500° C., as expected. If one assumes that each $SiO_2$ core particle has, statistically, the same number of reactive surface hydroxyl groups in water, then it is straightforward to estimate the number of TMA-PDTA molecules grafted per NOHMs particle. If one further assumes that the particle surface is well-defined and nonporous, then the surface coverage or graft density of TMA-PDTA is determined to be 1.74 molecules/$nm^2$ of the $SiO_2$ surface. With same assumption, one can determine XNIMs graft density to be 2.47 molecules/$nm^2$ of the $SiO_2$ surface, which means that effective ionic tethering ratio is ~1.4 XSA chains/TMA-PDTA chain. Because each TMA-PDTA molecule possesses three terminal amine groups (one 1° and two 2° amines), the ratio of 1.42 XSA chains/TMA-PDTA chain is plausible, and other ligand chemistries can be expected to be introduced via the amino groups to enhance compatibility of the hybrids with base oils other than PAO.

FIG. 27A shows bulk samples of PAO, NOHMs, and PAO-NOHMs composite containing 4.1, 29, and 45 wt % of NOHMs, respectively. It can be seen that clear transparency of PAO is retained even when the white powdered form of NOHMs is dispersed in PAO. These results attest to the homogeneous and complete dispersion of the particles into PAO at all compositions studied. This point is confirmed by TEM micrographs (FIG. 28A,B) at two magnifications for PAO-NOHMs composite with the highest NOHMs. The TEM images confirm that the hybrid particles exist as primary, unaggregated nanostructures in the PAO host. As discussed in the Introduction, the exceptionally high level of dispersion achieved at these high particle loadings is anticipated to yield many benefits for interfacial friction and wear properties. Indeed, in typical base-oil/nanoparticle composites, comparable levels of dispersion are only possible for systems containing 1-3 wt % of nanoparticles, and even then, significant quantities of dispersant (reaching up to 100 times the weight of nanoparticles) must be added. The flip experiment of PAO-NOHMs composite (shown in FIG. 25C) manifests that depending on the amount of NOHMs loading, simple liquids to complex gels can be facilely created. Because mere physical blending of NOHMs nanoparticles endows this property, these types of materials should attract broad-based practical interest.

PAO-XNIMs composite samples having similar $SiO_2$ content as the PAO-NOHMs materials were prepared (FIG. 27B). Because of high grafting density of XSA ($\Sigma$=2.47 molecules/$nm^2$), XNIMs naturally exist as soft solids. Additionally, unlike the PAO-NOHMs composites, where good transparency is retained at all particle loadings, at progressively high loadings of XNIMs in PAO, the solution color changes from light-yellow to dark-brown. This behavior likely originates from the fact that XSA and the resultant XNIMs are brownish in color; it does not arise from agglomeration. This point is again confirmed using TEM of the hybrid lubricants at two magnifications (FIG. 28C,D) for the PAO-XNIMs composite with the highest $SiO_2$ particle loading. In particular, the TEM images show that the hybrid particles are free of aggregation in the PAO host. The flip experiment was also done with PAO-XNIMs composite (shown in FIG. 27D). PAO-XNIMs composite also suggests that depending on the amount of XNIMs loading, simple liquids to complex gels can be facilely created. However, PAO-XNIMs composite endows another striking feature that has not been seen from PAO-NOHMs composite. As can be seen from FIG. 27D, PAO-XNIMs composite with 38.7 wt % XNIMs shows more fluidic character than PAO-NOHMs composite with 29 wt % NOHMs, even at −10 wt % more particle loadings in PAO host. This can be explained by chemical compatibility of XSA and PAO. It was discovered that PAO-XNIMs composites with 5.5 wt % XNIMs are in fact viscoelastic gels, which we will further discuss in the rheology section.

Rheological Characterization of PAO-NOHMs and PAO-XNIMs Composite Lubricants

Figure 28:
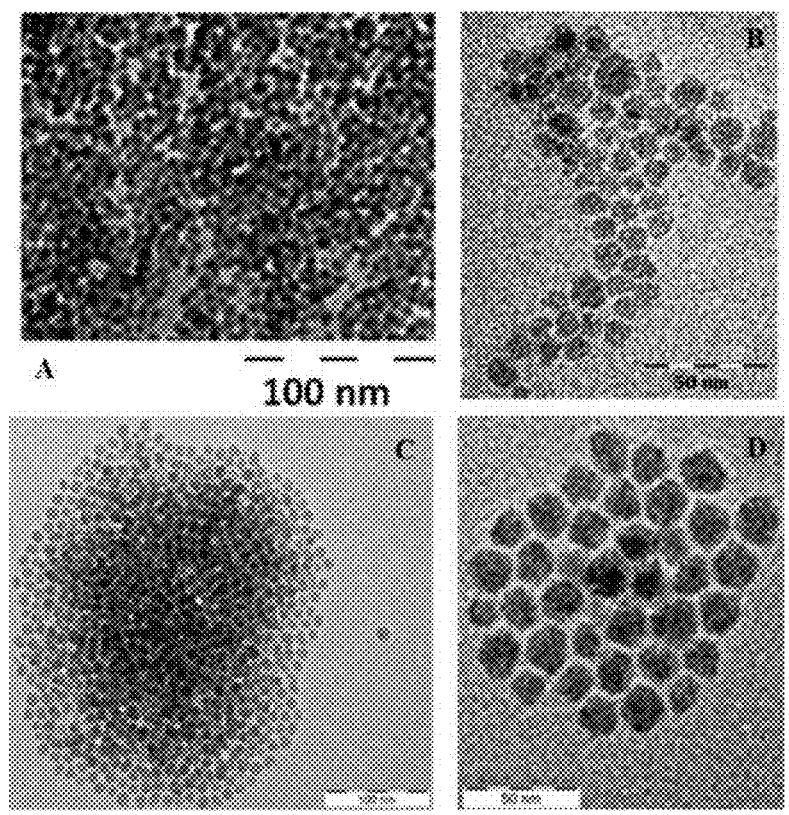
FIG. 28 is an example of a TEM micrograph of (A,B) PAO-NOHMs composite containing 45 wt % of NOHMs and of (C,D) PAO-XNIMs composite containing 60 wt % of XNIMs where A and C are prepared in lower magnification and B and D are prepared in higher magnification.

Closer examination of TEM micrograph in FIG. 28 indicates that the NOHMs and XNIMs particles are in an extremely crowded environment when dispersed in PAO. This means that motion of any individual particle requires coordinated movements of its neighbors. Therefore, each $SiO_2$ core can be thought of as being encaged by surrounding particles; physics that have very recently been shown should lead to soft glassy rheology. As pointed by Agarwal et al., oscillatory shear rheology measurements, performed at fixed frequency and variable shear strain, provide a straightforward approach for ascertaining whether a material belongs to the soft-glassy solid universal class.

Figure 29:
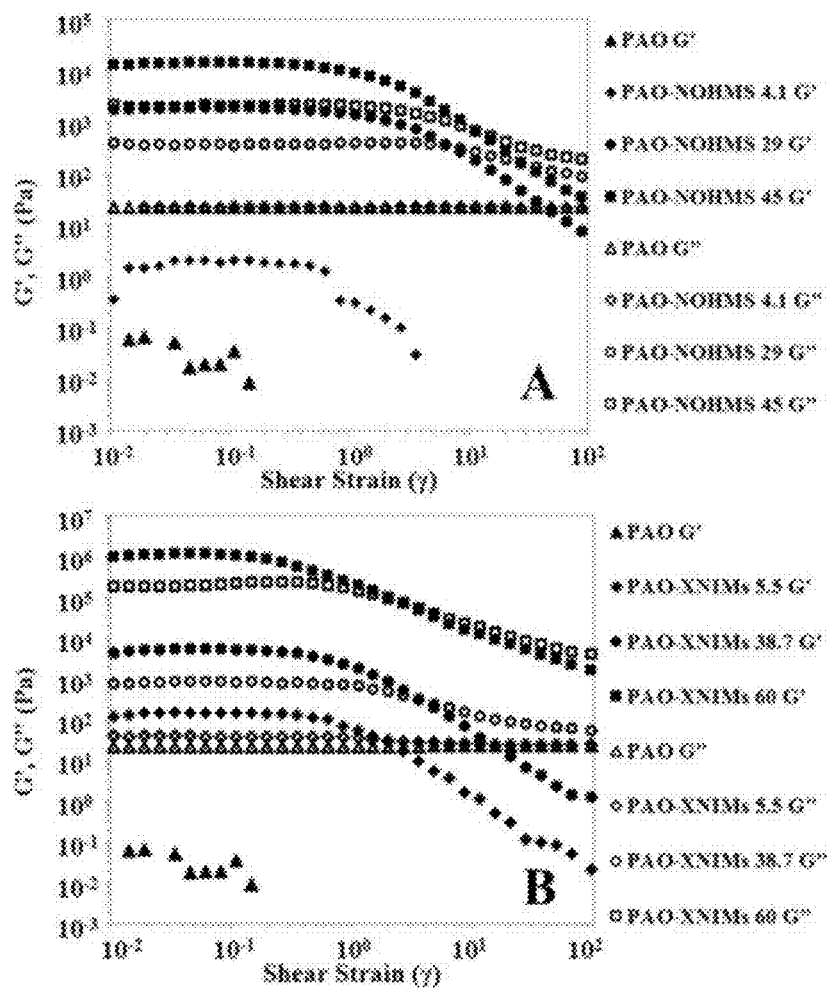
FIG. 29 shows shear modulus versus strain of (A) PAO-NOHMs composites (0, 4.1, 29, and 45 wt %) and (B) PAO-XNIMs composites (0, 5.5, 38.7, and 60 wt %).

Oscillatory shear measurements were performed at a constant angular frequency ($\omega$)=10 rad/s and at shear strains ranging from 0.01 to 100%. The strain-dependent storage (G') and loss (G") moduli deduced from these measurements are reported in FIG. 29A for PAO-NOHMs composites with varying NOHMs content and FIG. 29B for PAO-XNIMs composites with varying XNIMs content. It is apparent from the Figure that at low shear strains, both moduli are independent of shear strain for all materials studied; this range of strain defines the so-called linear viscoelastic LVE shear regime. It is also apparent that with the exception of PAO all materials manifest non-negligible storage and loss moduli, an indication that the composites are viscoelastic materials. For PAO, the loss (viscous) modulus is small but still dominates the storage modulus G">G' over the entire range of shear strains studied. This means that without any further treatment, PAO itself can be thought of as an ideal viscous liquid.

Figure 30:
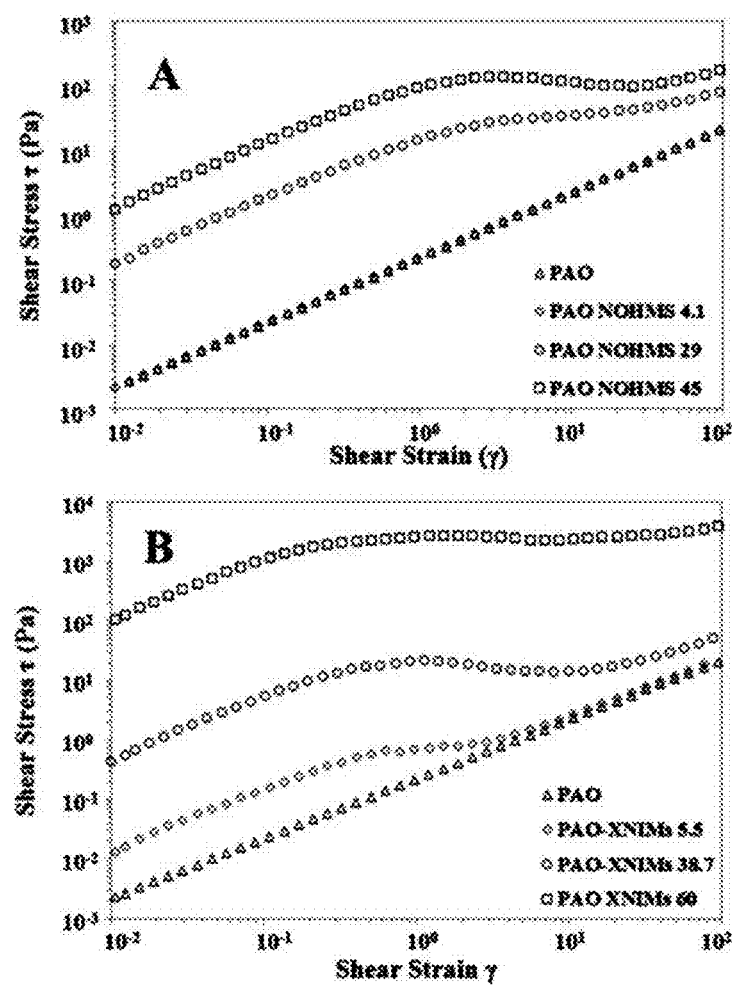
FIG. 30 shows shear stress versus strain of (A) PAO-NOHMs composites (0, 4.1, 29, and 45 wt %) and (B) PAO-XNIMs composites (0, 5.5, 38.7, and 60 wt %).

As NOHMs nanoparticles are incorporated into PAO at progressively higher loadings, the material shows several transitions, from viscoelastic liquid to viscoelastic gels, notably without losing its homogeneity (FIG. 27A). In particular, the PAO-NOHMs composite with 4.1 wt % NOHMs nanoparticles show a small amount of elasticity, but G" is substantially unchanged from that of the base PAO liquid and remains larger than G' at all shear strains, which is indicative of viscoelastic liquid behavior. When the NOHMs composition is increased to 29 wt %, completely different behavior is observed. The elastic modulus is not only now dominant (G'>G") at strains in the LVE regime but also it is more than four orders of magnitude greater than G' for PAO. Additionally, at small shear strains, G" is substantially higher than for PAO. Together, these results mean that the material is both substantially stronger and much thicker (more viscous) than PAO; both effects are significantly enhanced when the NOHMs content is increased to 45 wt %. If one ignores the strain dependence of the moduli, then our observations would imply that the latter two PAO-NOHMs composites are viscoelastic gels. The strain dependence of both moduli is, however, significant and cannot be ignored. In fact, both materials exhibit transitions from G'-dominant (solid-like) to G"-dominant (liquid-like) behavior at shear strains of 6.4 and 10.7%, respectively. As shown in FIG. 30A, the shear stress manifests a visible change of slope at strains coincident with the observed transition from solid-like to liquid-like behavior. This type of behavior is characteristic of a yielding transition and is not seen in PAO or in the PAO-NOHMs composite with 4.1 wt % NOHMs. It is strikingly similar to the transition reported by Agarwal et al. for their self-suspended nanoparticle suspensions, which suggests that the PAO-NOHMs composites with 29 and 45 wt % NOHMs are in reality soft glasses.

Figure 27:
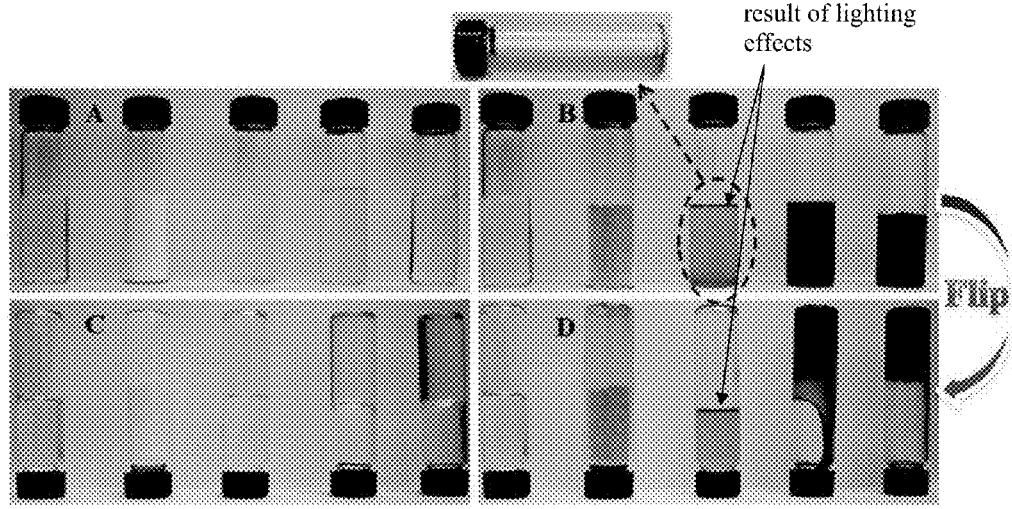
FIG. 27 is a representative photograph of (A,C) PAO, NOHMs, and PAO-NOHMs (4.1, 29, and 45 wt % NOHMs) and photograph of (B,D) PAO, XNIMs, and PAO-XNIMs (5.5, 38.7, and 60 wt % XNIMs). Each PAO-based hybrid composite matches SiO2 contents (3.7, 26.1, and 40.4 wt %, respectively). PAO-based hybrid composites shown in A and B were flipped (shown in parts C and D, respectively) and photographed after 2 days. The horizontal vial on top is included to demonstrate that the brown rings observable at the top and bottom of the upright version of the same vial are entirely a result of lighting effects.
Figure 31:
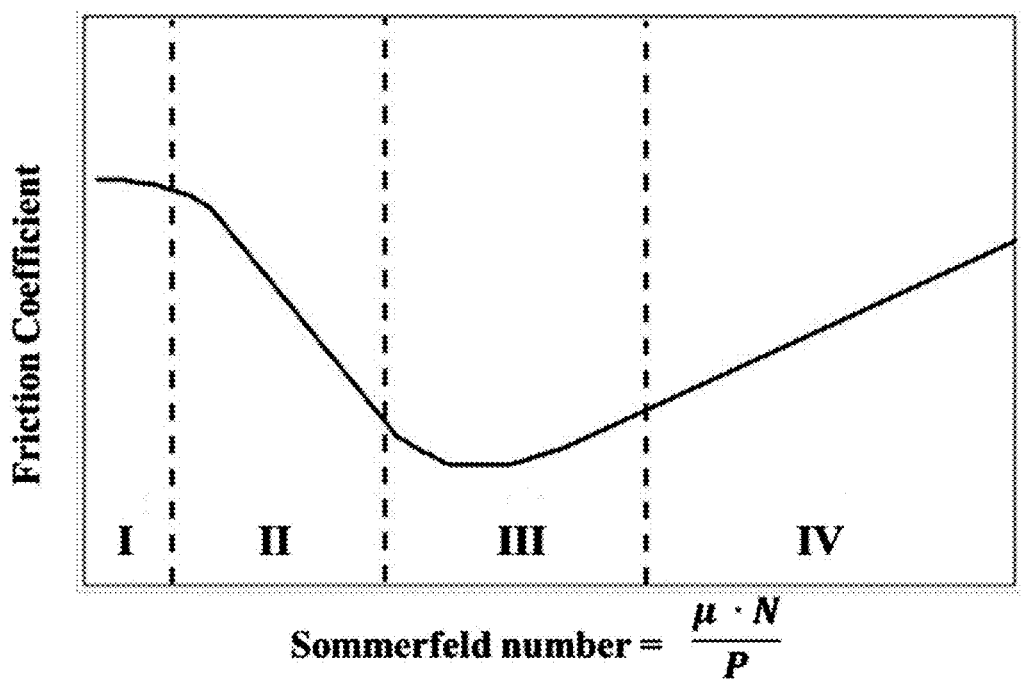
FIG. 31 is an example of a Stribeck curve illustrating the four regimes of lubrication: (I) boundary, (II) mixed, (III) EHL, and (IV) hydrodynamic (μ: kinematic viscosity, N: rotation speed, P: normal load).

The same analysis was performed on the PAO-XNIMs composite to study their rheological behavior. At each XNIMs loading, G' was found to be approximately an order of magnitude greater than the corresponding value for PAO-NOHMs composites at a comparable $SiO_2$ particle loading. These changes lead to subtle but important differences between the two types of composites. For example, the vial inversion experiment (FIG. 27D) for a PAO-XNIMs containing 5.5 wt % XNIMs shows decidedly fluid-like behavior; however, the more detailed insight made possible by the rheological measurements (FIGS. 29B and 30B) clearly shows that the materials are in reality viscoelastic gel. An even more profound example of the same behavior is manifested by the PAO-XNIMs with 38.7 wt % XNIMs nanoparticles. This material contains ~10 wt % more particles than PAO-NOHMs with 29 wt % NOHMs. Consistent with this difference in composition, the vial inversion experiment in FIG. 27 shows that it is more fluid-like, yet the more detailed rheology measurements shows that the PAO-XNIMs composite is significantly more elastic. In summary, rheological measurements show that PAO-XNIMs are viscoelastic materials and that they manifest soft glassy characteristics at particle loadings well below where this behavior is seen in PAO-NOHMs. We tentatively attribute this feature to jamming between the longer corona chains in the PAO-XNIMs; its effect on tribomechanical properties is considered next. Tribology Analysis of PAO-NOHMs and PAO-XNIMs Composite Lubricants The Stribeck curve (FIG. 31) is widely viewed as an extremely useful construction for determining conditions where a material functions as a boundary, mixed, elastohydrodynamic (EHL), or hydrodynamic lubricant. This designation is important because each lubrication regime represents distinct characteristic of the contacting surfaces. The Boundary lubrication regime typically occurs at very low speeds where load is carried by asperity points. The lubricant film is very thin in this case, and thus no pressure is built up. The mixed lubrication regime also occurs at low speeds, but the load is carried by a combination of contact pressure and hydrodynamic pressure in the lubricant film. A thin lubricant film is typically formed in this regime, and the hydrodynamic pressure contribution to the load carrying capacity is relatively small. The elastohydrodynamic lubrication regime occurs at intermediate speeds, and a thin lubricant film carries an increasing portion of the load, relative to the load borne by contact points. Here hydrodynamic pressure is larger and increases gradually with sliding speed. The hydrodynamic lubrication regime occurs at high speeds, and the contact points are completely separated by the lubricant film. Hydrodynamic pressure and load come into equilibrium, and the thickness of the lubricant film increases as speed increases.

Figure 24:
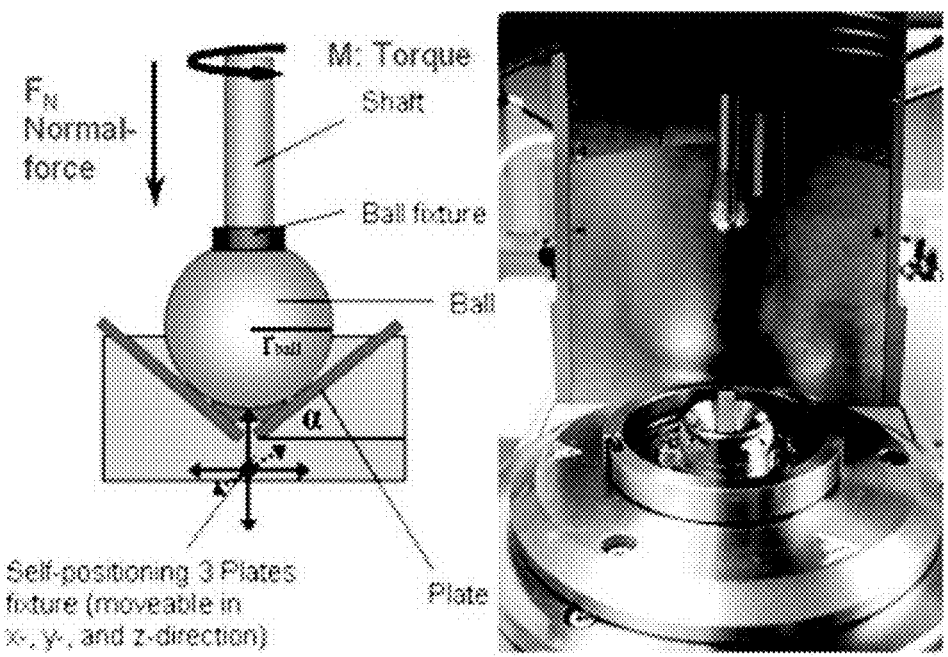
FIG. 24 is an example of a schematic setup (32) and photograph of the ball-on-three-plates tribometer used for the study.
Figure 32:
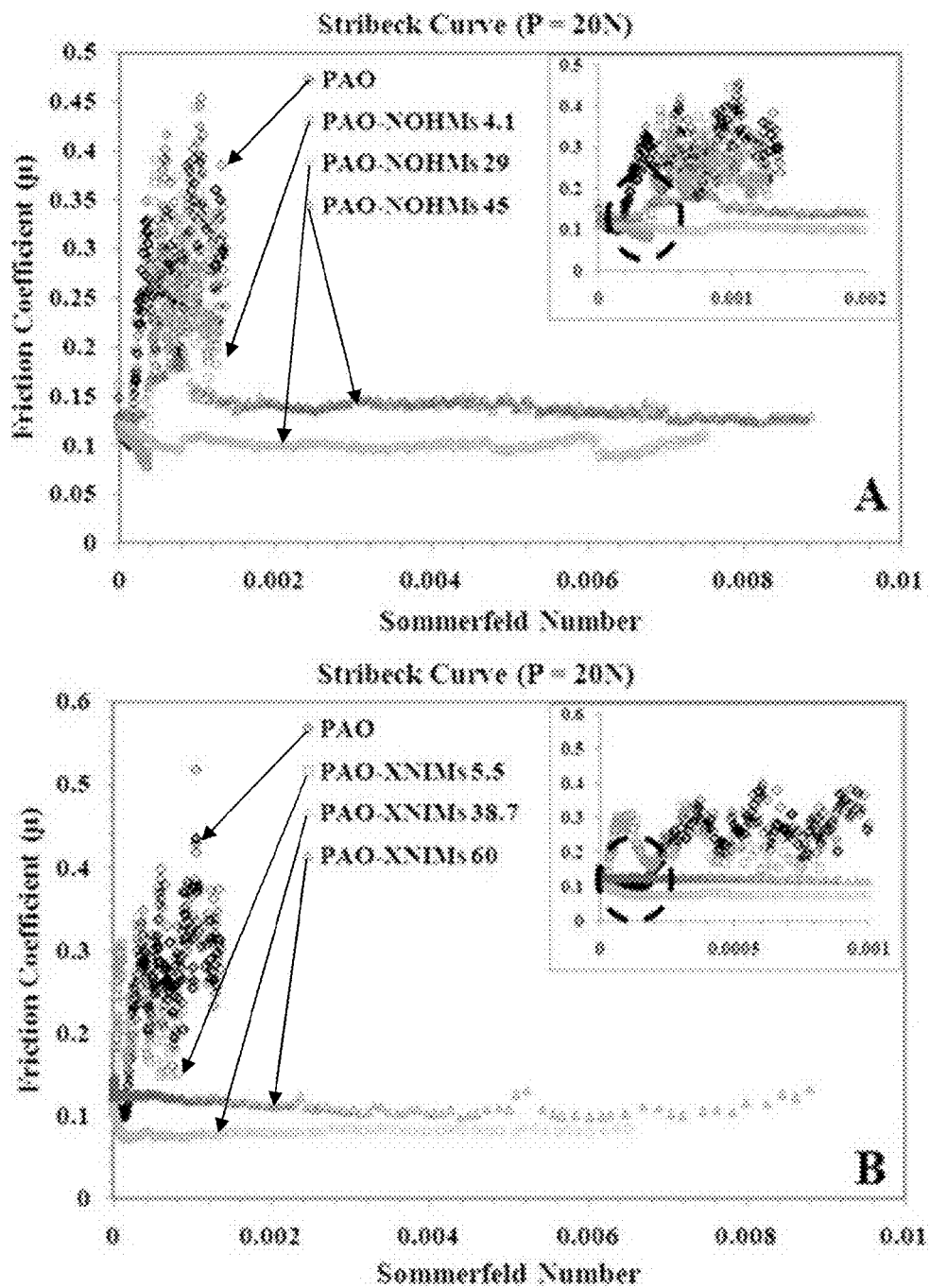
FIG. 32 is an example of a Stribeck curve for: (A) PAO-NOHMs composites (0, 4.1, 29, and 45 wt %) and (B) PAO-XNIMs composites (0, 5.5, 38.7, and 60 wt %) both under normal load of 20 N at 30° C. An amplified view of lower Sommerfeld number regime is provided in the inset (EHL regime for low particle concentration: dotted portion).

The ball-on-three-plates apparatus depicted in FIG. 24 was used to characterize the friction coefficient of PAO, PAO-NOHMs composites, and PAO-XNIMs composite.
Sommerfeld Number $$\text{Sommerfeld number} = (\mu \cdot N)/P \tag{4}$$

was used to construct the Stribeck curve for these materials. Here $\mu$ is the kinematic viscosity, N is the rotation speed, and P is the normal load. This form of modified Sommerfeld number is widely used to characterize construct Stribeck curve, and it has a unit of distance over mass (meter/kilogram in our case). As shown in FIG. 32A, when blank PAO and PAO with 4.1 wt % NOHMs loading were used, typical Stribeck curve behavior was observed, in which the friction coefficient first reaches a minimum in the EHL regime, which is followed by a rapid increase at high speeds; reflecting a buildup of hydrodynamic pressure. It is apparent from the Figure that PAO with 4.1 wt % NOHMs loading displays moderately improved friction properties relative to pure PAO. Specifically, the PAO-NOHMs composite manifests a minimum friction coefficient of 0.073 under 20 N and 0.076 under 60 N, which are measurably lower than the corresponding values for PAO, 0.1 at 20 N and 0.09 at 60 N. In addition, the EHL regime for the PAO/NOHMs composite is elongated by a factor close to 2. By eq 4, the Sommerfeld number is proportional to shaft rotation speed, indicating that the composite containing 4.1 wt % NOHMs provides better lubrication at more than twice the rotation speed. In the case of the PAO-NOHMs composite containing 29 wt % NOHMs, the minimum friction coefficient achieved is 0.09 at 20 N, which is a 10% reduction relative to the untreated PAO. However under a normal load of 60 N (FIG. 33A), a higher minimum friction coefficient of 0.1, that is, 11% higher than the unmodified PAO, is observed. Remarkably, we find, however, that at both loads the breadth of the EHL regime of the PAO-NOHMs composite increases by more than one order of magnitude. The enhancements in the EHL regime are seen to be even larger for the PAO-NOHMs composite containing 45 wt % NOHMs.

More careful analysis of the Stribeck curves for the PAO-NOHMs composites with 29 and 45 wt % NOHMs indicate that the EHL regime in these materials is more complex than typically seen in lubricants. Both materials show a regime of increasing friction coefficient at Sommerfeld numbers comparable to where the EHL ends in PAO with low NOHMs loadings. Surprisingly, this regime ends before the hydrodynamic regime is achieved, and the friction coefficient falls back to values close to the minima at the onset of the EHL. This behavior appears to be unique to the PAO/NOHMs composite lubricants, and we believe it is responsible for the dramatic extensions in the EHL achieved. We believe that the initial rise in the friction coefficient at intermediate Sommerfeld numbers originates from the jamming of the NOHMs particles already hypothesized from the previous rheology experiments. Once the cages constraining the structures are broken down by deformation, the material yields and the measured friction reflect the lubrication of PAO chains trapped between NOHMs particles in the composites.

Figure 33:
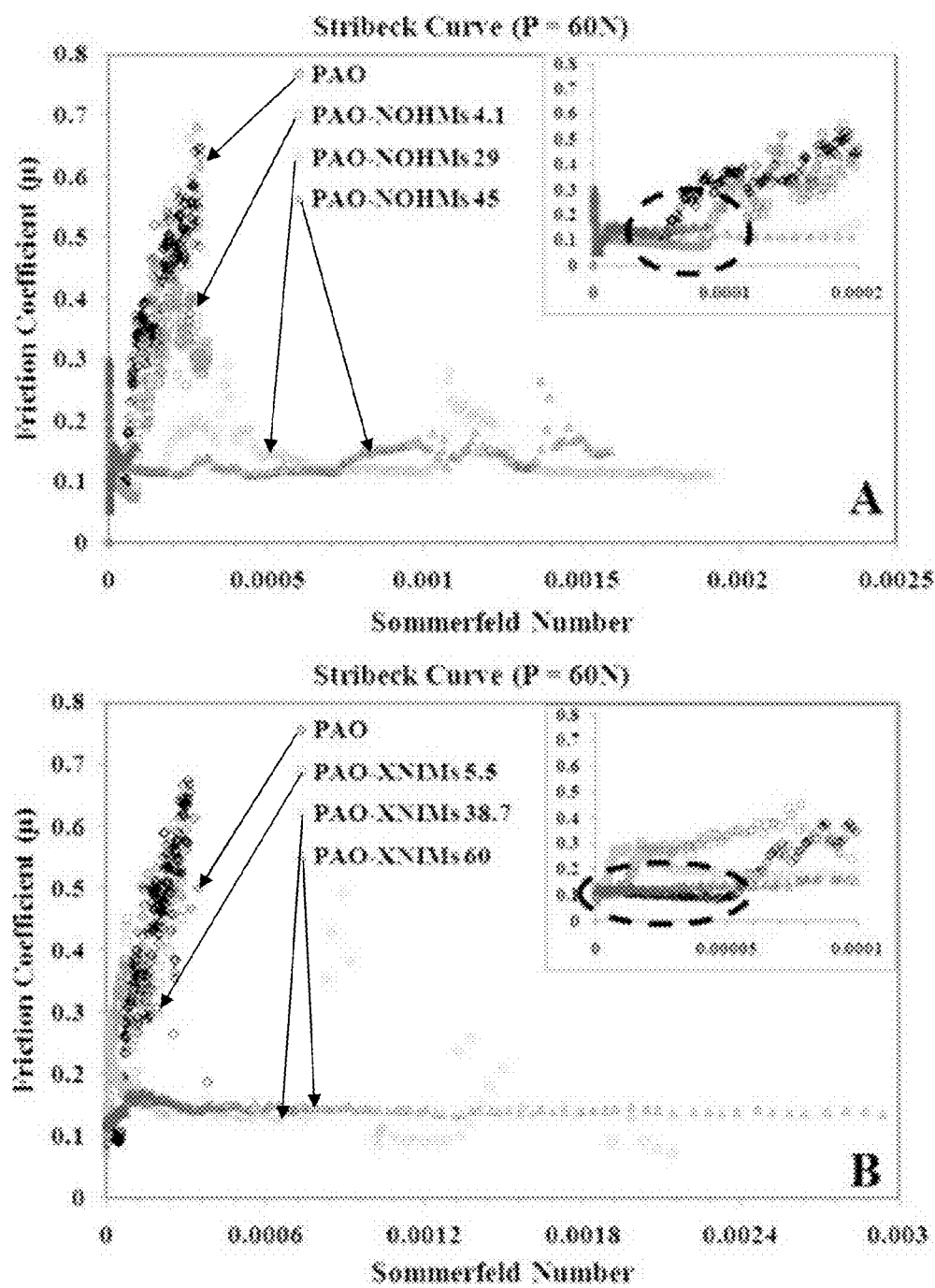
FIG. 33 is an example of a Stribeck curve for (A) PAO-NOHMs composites (0, 4.1, 29, and 45 wt %) and (B) PAO-XNIMs composites (0, 5.5, 38.7, and 60 wt %) both under normal load of 60 N at 30° C. Close-up view of lower Sommerfeld number regime is offered in the inset (EHL regime for low particle concentration: dotted portion).

As shown in FIGS. 32B and 33B, PAO-XNIMs composite with 5.5 wt % of XNIMs loading exhibits typical Stribeck curve behavior under both 20 N and 60 N of normal load. However, neither improved friction properties nor EHL regime elongation was observed. On the contrary, PAO-XNIMs composite containing 38.7 wt % XNIMs showed minimum friction coefficient of 0.07 at 20 N, which is ~38.6% reduction relative to the untreated PAO. We also observed remarkably increased breadth of the EHL regime yet with no sign of jamming effect, which was seen from PAO-NOHMs composite systems, which further confirms our finding that PAO-XNIMs composite offers a higher level of dispersion in PAO. PAO-XNIMs composite containing 60 wt % XNIMs did not improve the magnitude of minimum friction coefficient but exhibited the same benefits offered by PAO-XNIMs composite containing 38.7 wt % XNIMs. However, as with PAO-NOHMs composite, higher minimum friction coefficients were obtained under a normal load of 60 N for both PAO-XNIMs composite containing 38.7 and 60 wt % XNIMs. Jamming effect was also observed under normal load of 60 N, but as shown in FIG. 33B, its impact is significantly minimized.

The antiwear and friction-reduction properties of the PAO-NOHMs and PAO-XNIMs composites were further evaluated by increasing the shaft rotation speed to 500 rpm and holding this speed for 10 min under normal loads of 20 N and 60 N at 30° C. This speed corresponds to lubrication regime where blank PAO, PAO-NOHMs with 4.1 wt % NOHMs loading, and PAO-XNIMs with 5.5 wt % XNIMs loading are well into the hydrodynamic lubrication regime and PAO-NOHMs with 29 and 45 wt % NOHMs loading and PAO-XNIMs with 38.7 and 60 wt % XNIMs loading are in the mixed and EHL regimes. Because the PAO-NOHMs composites with 29 and 45 wt % NOHMs loading and PAO-XNIMs with 38.7 and 60 wt % XNIMs loading have lower friction coefficient at these high Sommerfeld numbers, they are anticipated to have better wear-reduction characteristics than PAO. The surface morphology of the wear track, roughness of the material in the wear track, and the wear volume were obtained using a MicroXAM Surface profiler. The average surface roughness values for steel plates and steel balls used in this experiment are 0.437 and 1.19 µm, respectively. After each wear-test, the surface roughness values are shown in Table 3, and it can be seen that PAO with NOHMs loading and PAO with XNIMs loading more effectively reduce surface roughness than the blank PAO. It is important to point out that for all tests, surface roughness increased approximately 10-fold as normal load was increased from 20 N to 60 N, except for PAO with high XNIMs loadings, where almost no improvement in surface roughness is obtained.

TABLE 3

Surface Roughness (Ra) under load of 20 and 60N at 30° C. and 20N at 100° C.

|  | Ra(µm) @ P = 20N, T = 30° C. | Ra(µm) @ P = 60N, T = 30° C. | Ra(µm) @ P = 20N, T = 100° C. |
|---|---|---|---|
| PAO | $9.76 \times 10^{-1}$ | 9.47 | 3.05 |
| PAO-NOHMs 4.1 | $5.30 \times 10^{-3}$ | $9.79 \times 10^{-2}$ | $8.63 \times 10^{-2}$ |
| PAO-NOHMs 29 | $8.21 \times 10^{-5}$ | $1.08 \times 10^{-4}$ | $4.83 \times 10^{-4}$ |
| PAO-NOHMs 45 | $1.61 \times 10^{-5}$ | $1.67 \times 10^{-4}$ | $2.07 \times 10^{-4}$ |
| PAO-XNIMs 5.5 | $4.58 \times 10^{-2}$ | $1.64 \times 10^{-2}$ | $1.94 \times 10^{-2}$ |
| PAO-XNIMs 38.7 | $7.10 \times 10^{-4}$ | $5.43 \times 10^{-4}$ | $1.20 \times 10^{-4}$ |
| PAO-XNIMs 60 | $6.11 \times 10^{-5}$ | $5.62 \times 10^{-5}$ | $4.22 \times 10^{-5}$ |

Figure 34:
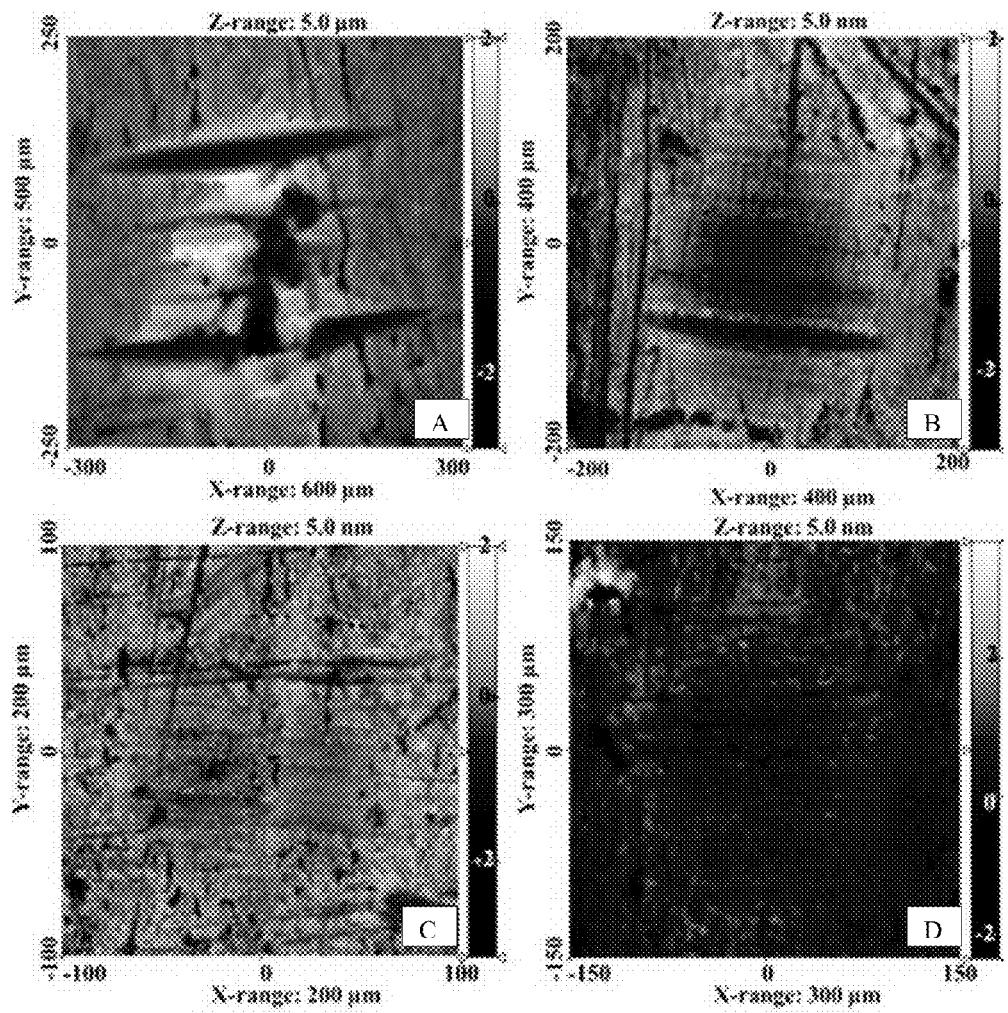
FIG. 34 is an example of a two-dimensional surface profiles under normal load of 20 N at 500 rpm for 10 min at 30° C. (PAO-NOHMs composites with (A) 0, (B) 4.1, (C) 29, and (D) 45 wt % NOHMs loading and PAO-XNIMs composites with (E) 0, (F) 5.5, (G) 38.7, and (H) 60 wt % XNIMs loading).
Figure 34:
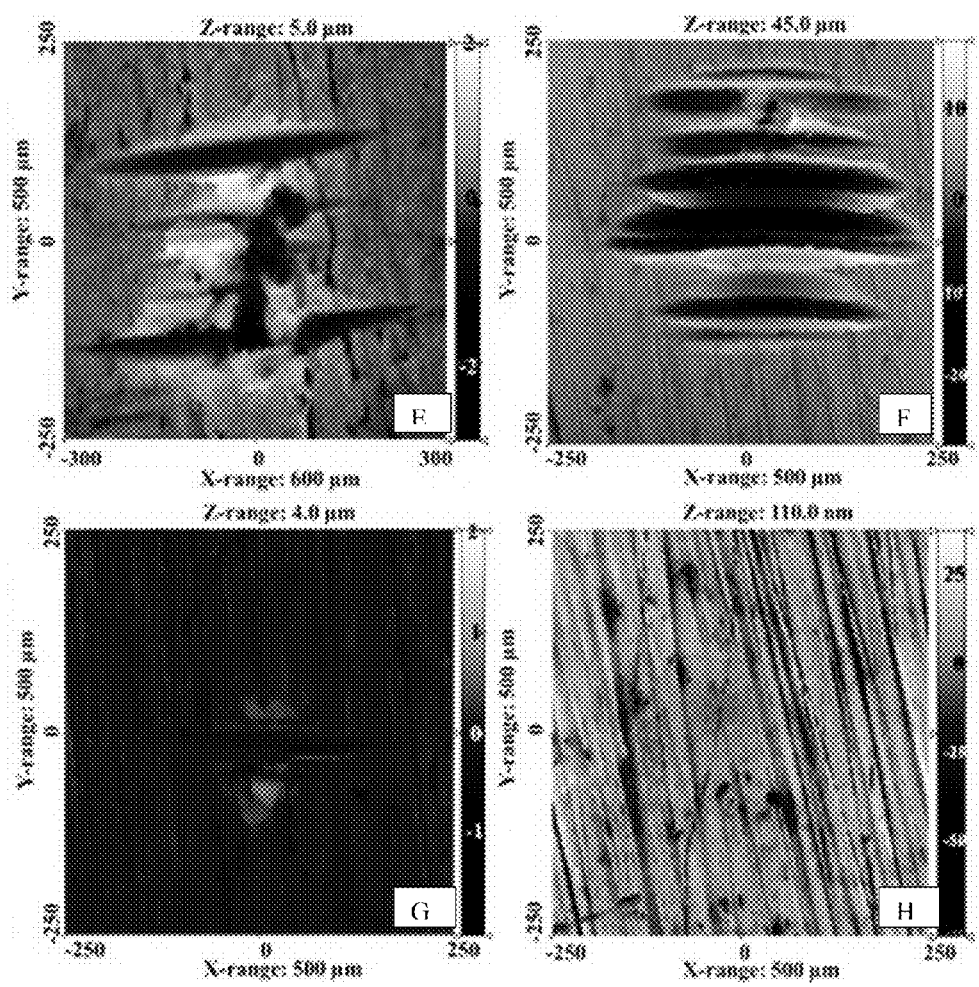
Figure 35:
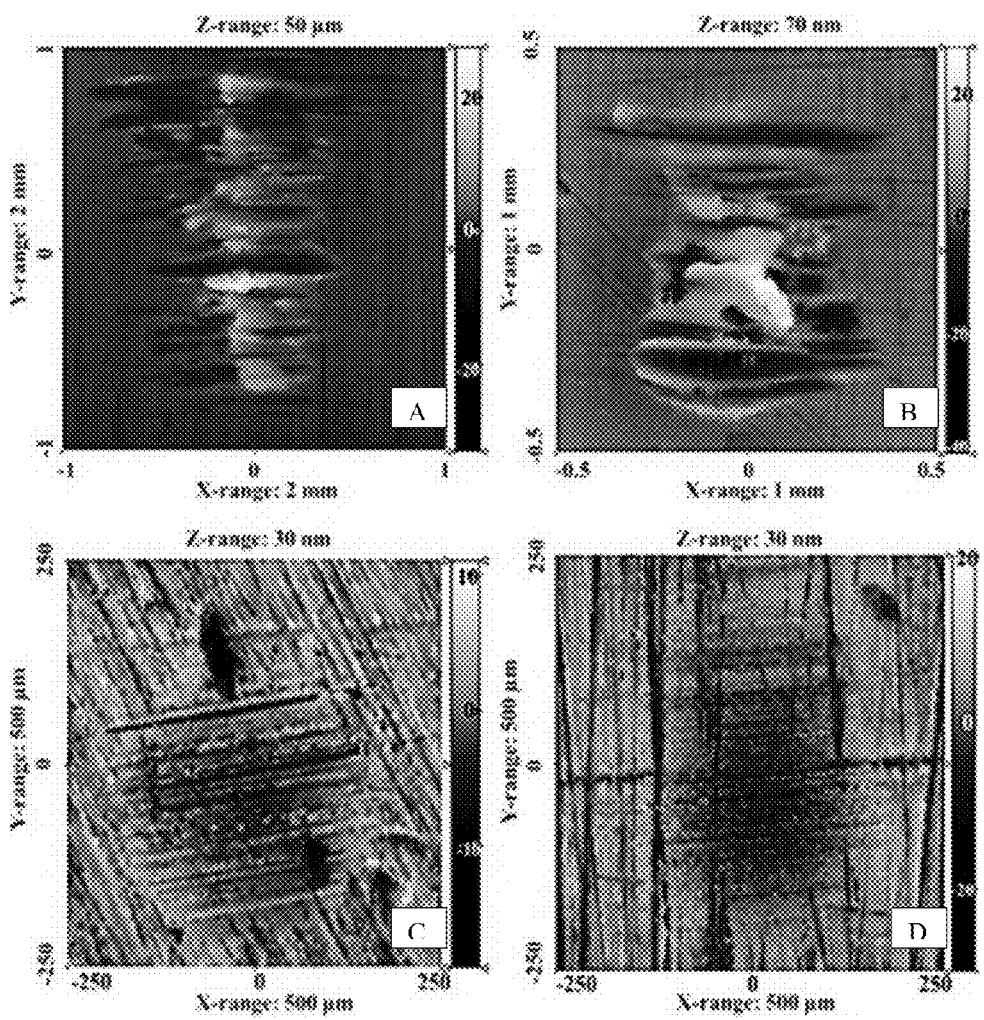
FIG. 35 is an example of a two-dimensional surface profiles under normal load of 60 N at 500 rpm for 10 min at 30° C. (PAO-NOHMs composites with (A) 0, (B) 4.1, (C) 29, and (D) 45 wt % NOHMs loading and PAO-XNIMs composites with (E) 0, (F) 5.5, (G) 38.7, and (H) 60 wt % XNIMs loading).
Figure 35:
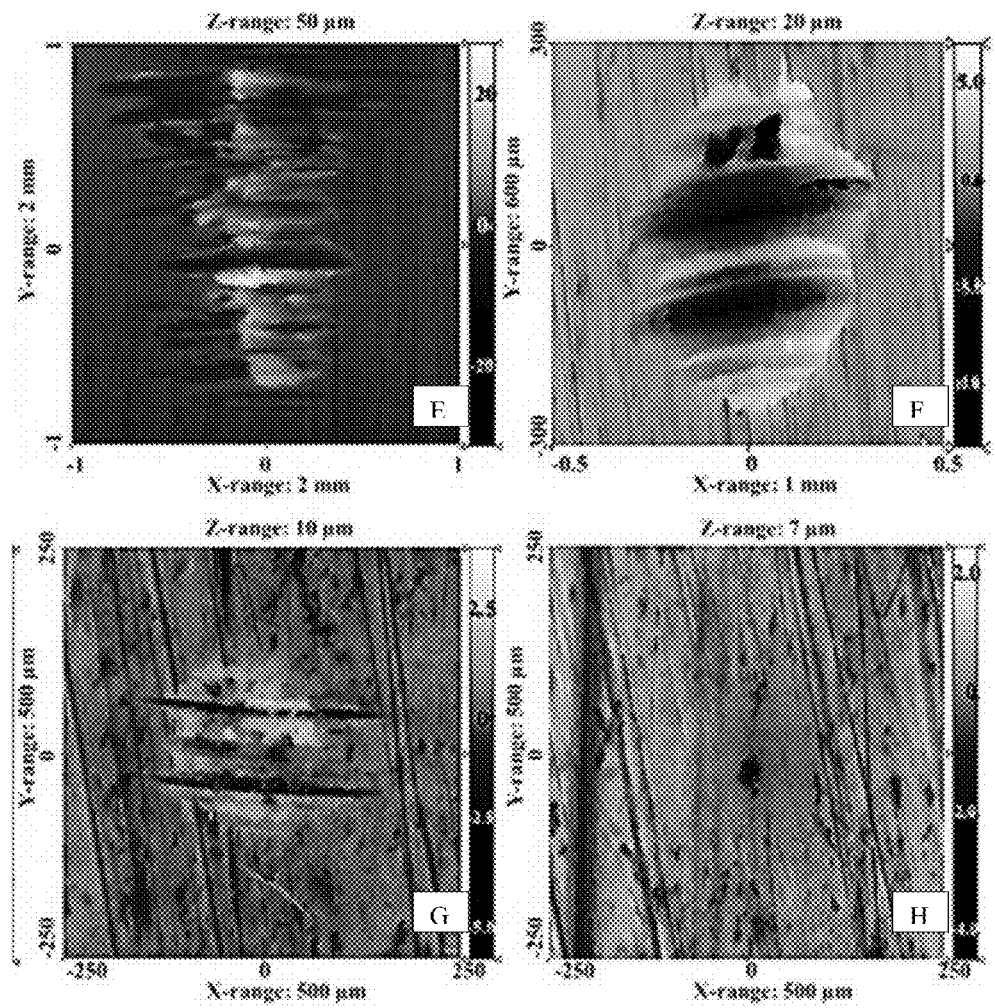

Two-dimensional surface profiles under normal load of 20 N and 60 N are shown in FIGS. 34 and 35, respectively. Each surface profiles' XYZ scale has been taken at the optimal setting to visualize the wear effect. Wear tests with blank PAO show both the largest wear area and the largest depth, except for PAO-XNIMs composite with 5.5 wt % XNIMs loading. All other NOHMs and XNIMs loadings of the PAO-NOHMs and PAO-XNIMs composites display reduced wear area as well as depth. As can be seen from FIG. 34A, a 2 mm×2 mm image had to be taken to capture fully the wear surface morphology of steel plates when blank PAO was used, which makes the intact part of steel surface appear smoother. The wear volume reduction is more conspicuous with PAO with 29 and 45 wt % NOHMs loading and PAO with 38.7 and 60 wt % XNIMs loading, for which considerable reductions in the wear track depth and smoothening of the wear area are observed. Comparable wear volume was detected with these materials. Under 20 N, PAO with 60 wt % XNIMs yielded the lowest wear volume of all materials studied, and under 60 N, PAO with 60 wt % XNIMs once again yielded the largest reduction in wear volume; implying that it is most effective as an antiwear agent at higher normal loads. All wear volume testing results are offered in Table 4.

TABLE 4

Wear Volume under Load of 20 and 60N at 30° C. and 20N at 100° C.

|  | wear volume under P = 20N, 30° C. (µm³) | wear volume under P = 60N, 30° C. (µm³) | wear volume under P = 20N, 100° C. (µm³) |
|---|---|---|---|
| PAO | $5.33 \times 10^3$ | $1.21 \times 10^6$ | $1.64 \times 10^5$ |
| PAO-NOHMs 4.1 | $6.40 \times 10^1$ | $4.23 \times 10^2$ | $1.94 \times 10^4$ |
| PAO-NOHMs 29 | 3.46 | $3.24 \times 10^1$ | $6.62 \times 10^2$ |
| PAO-NOHMs 45 | 4.19 | $1.86 \times 10^1$ | $8.19 \times 10^1$ |
| PAO-XNIMs 5.5 | $4.20 \times 10^4$ | $2.50 \times 10^5$ | $4.00 \times 10^4$ |

TABLE 4-continued

Wear Volume under Load of 20 and 60N at 30° C. and 20N at 100° C.

| | wear volume under P = 20N, 30° C. (μm³) | wear volume under P = 60N, 30° C. (μm³) | wear volume under P = 20N, 100° C. (μm³) |
|---|---|---|---|
| PAO-XNIMs 38.7 | 6.25 × 101 | 7.00 × 102 | 3.50 × 103 |
| PAO-XNIMs 60 | 2.00 × 10-1 | 1.50 × 10-1 | 4.00 × 103 |

Figure 36:
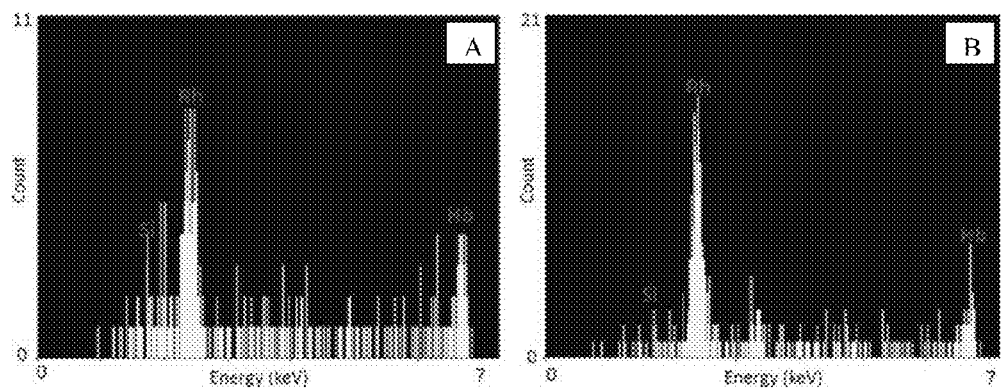
FIG. 36 is an example of an elemental analysis of wear track for (A) PAO-NOHMs composite with 45 wt % NOHMs loading and (B) PAO-XNIMs composite with 60 wt % NOHMs loading.

The increase in load-carrying capacity of the PAO-NOHMs composites with high NOHMs loadings and PAO-XNIMs composites with high XNIMs loadings can be explained in terms of the nanoparticles filling the wear track, which reduces asperity contacts, thus facilitating the formation of a boundary-lubricating film. The boundary-lubricating film is anticipated to be very thin, but its presence is clearly important for imparting antiwear properties. To evaluate the hypothesis that the antiwear properties of the PAO-NOHMs composites and PAO-XNIMs composites arise from the ability of the nanostructures to fill the wear track, we characterized the chemistry of the wear track using EDS. The results shown in FIG. 36 are for the PAO-NOHMs composite with 45 wt % NOHMs loading and PAO-XNIMs composite with 60 wt % XNIMs loading after 10 min of ultrasonication in chloroform. Elemental analysis appears to confirm our previous hypothesis that silica particles from the lubricant film diffuse- into and effectively fill the surface scars.

Figure 37:
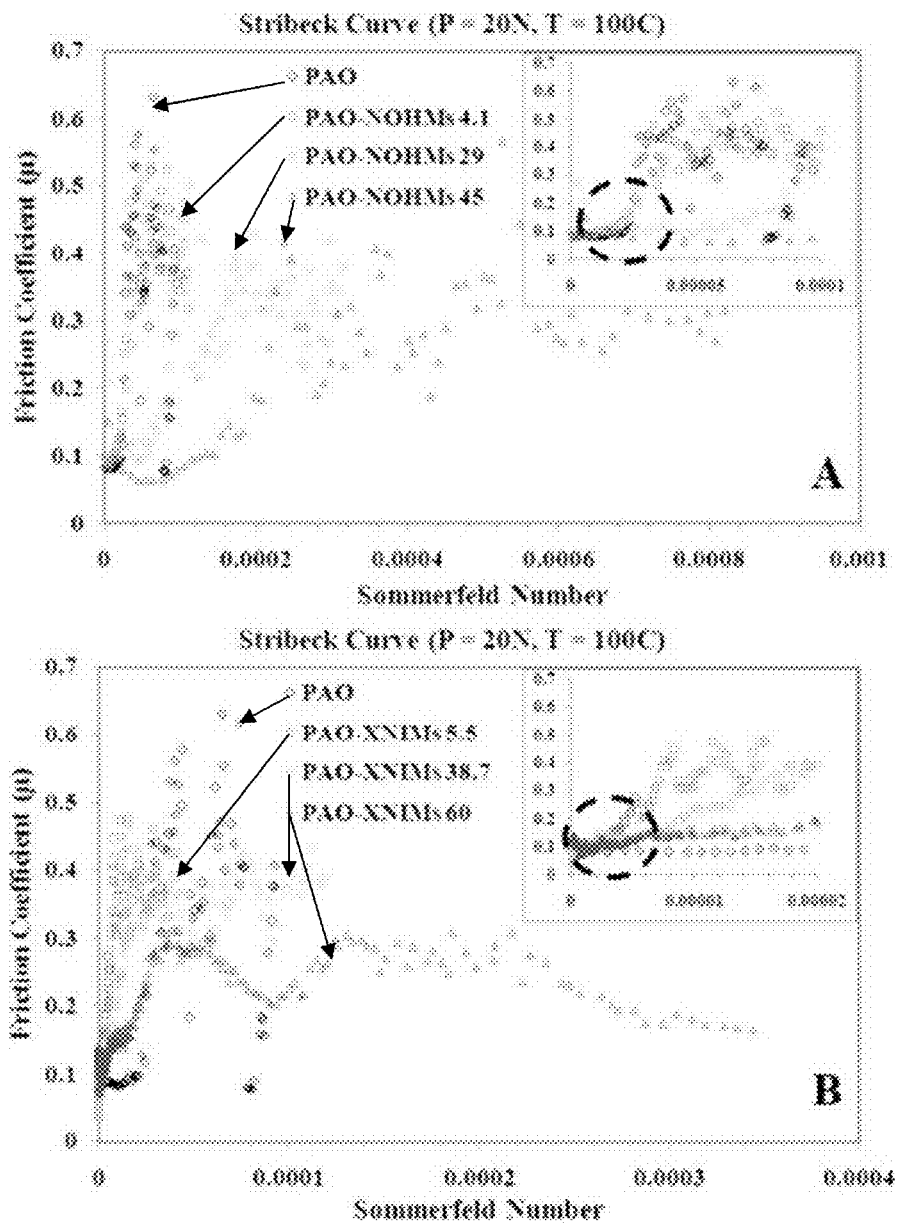
FIG. 37 is an example of a Stribeck curve for (A) PAO-NOHMs composites (0, 4.1, 29, and 45 wt %) and (B) PAO-XNIMs composites (0, 5.5, 38.7, and 60 wt %) both under normal load of 20 N at 100° C. An expanded view of the lower Sommerfeld number regime is provided in the inset (EHL regime for low particle concentration: dotted portion).
Figure 38:
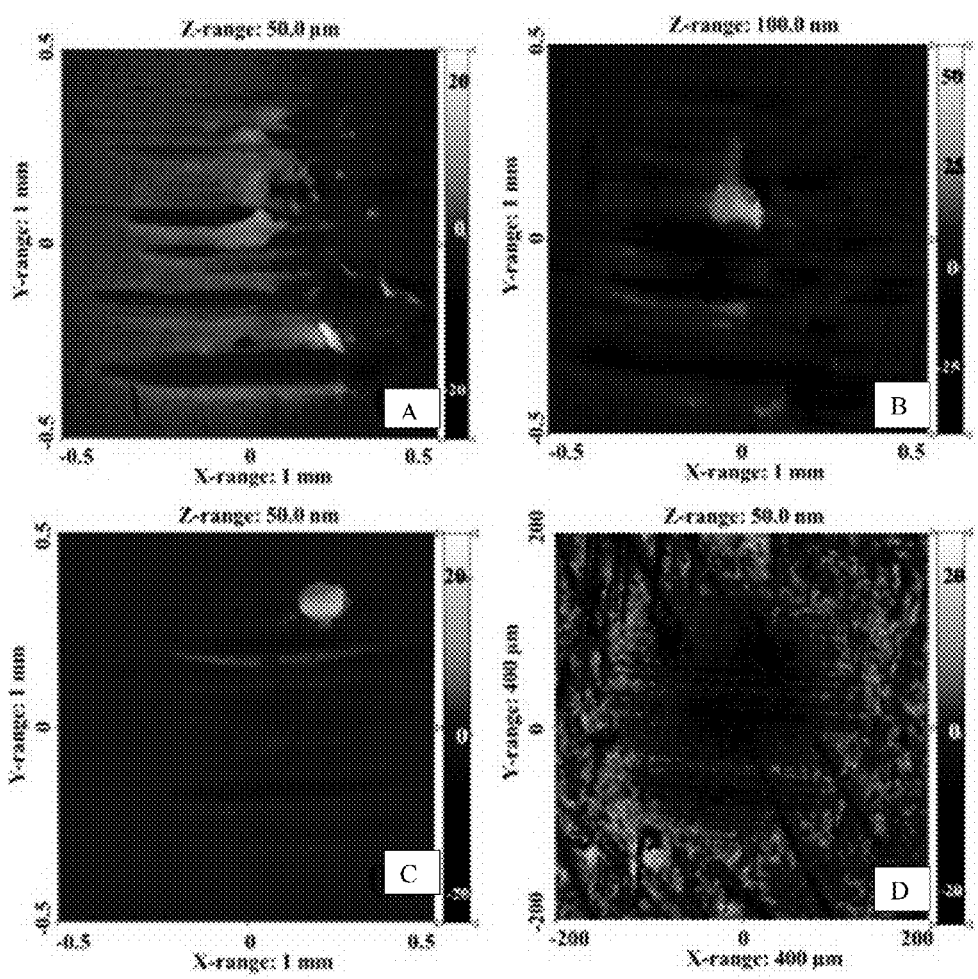
FIG. 38 is an example of a two-dimensional surface profiles under normal load of 20 N at 500 rpm for 10 min at 100° C. (PAO-NOHMs composites with (A) 0, (B) 4.1, (C) 29, and (D) 45 wt % NOHMs loading and PAO-XNIMs composites with (E) 0, (F) 5.5, (G) 38.7, and (H) 60 wt % XNIMs loading).
Figure 38:
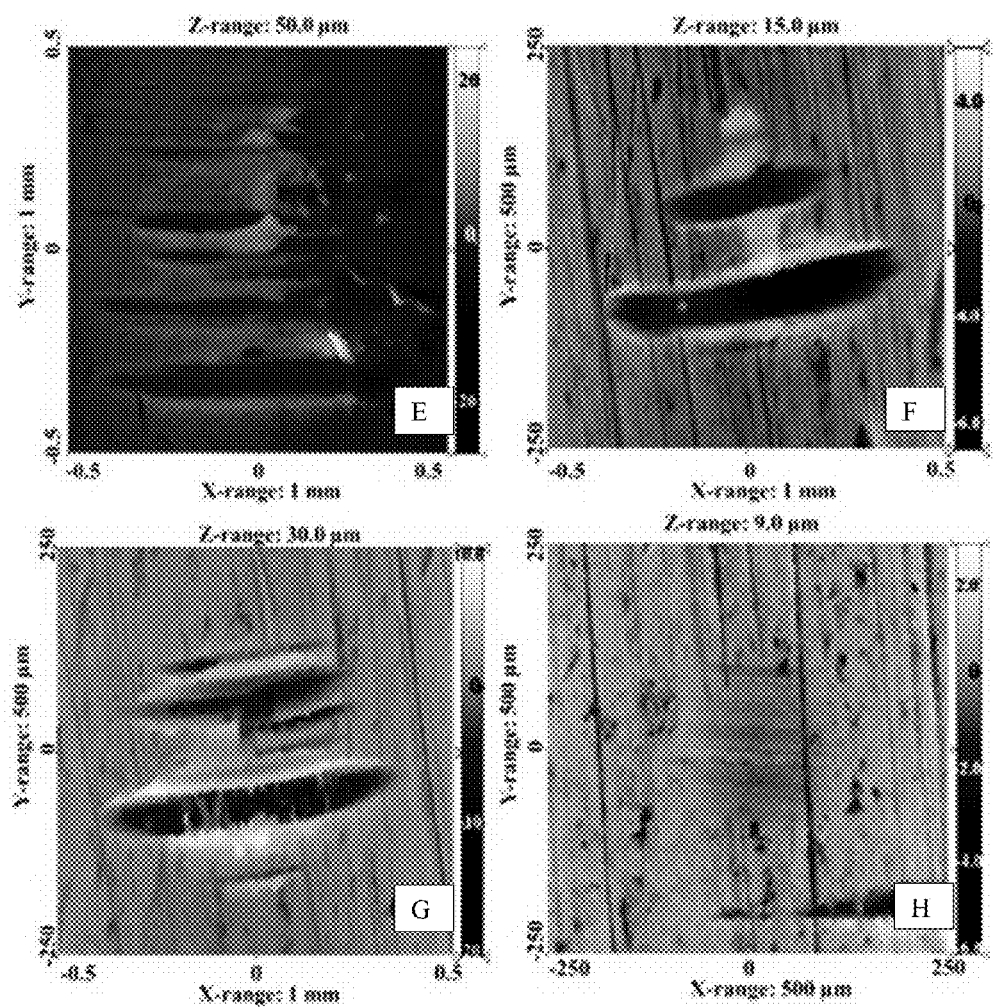

Interfacial friction measurements were also performed under normal load of 20 N at 100° C. to evaluate the effect of temperature on performance of our PAO-NOHMs and PAO-XNIMs composite lubricants. FIG. 37 is the Stribeck curve obtained from these measurements. Compared with the result obtained under the same normal load, 20 N, at 30° C. (FIG. 32), a general shortening of the EHL regime can be observed for all materials. It is known that because the viscosity of most lubricants is lower at these high temperatures a good lubricant film between contacting surfaces cannot be easily established. The more trivial reduction in the Sommerfeld number for the lower lubricant viscosity obviously also plays a role. Remarkably, even though the EHL regime is truncated, the PAO-NOHMs composite with 45 wt % NOHMs exhibits a 50% lower minimum friction coefficient than PAO (0.06 versus 0.12) and again displays a substantially enhanced EHL regime. However, PAO-XNIMs composite at 5.5 and 38.7 wt % XNIMs loadings decreased EHL regime yet offered lower minimum coefficients where PAO-XNIMs composite with 38.7 wt % XNIMs loading offered minimum friction coefficient of 0.03. PAO-XNIMs composite with 60 wt % XNIMs loading exhibited both lower minimum coefficient and longer EHL regime than PAO with no particle loadings. We speculate that because PAO-XNIMs are functionalized by PAO-compatible chains, XNIMs are also subjected to viscosity decrease as temperature is raised. Therefore, we suspect that if we can create XSA with higher molecular weight, then self-suspending nanocomposite lubricant can be created with better performance. The antiwear and friction-reduction properties at the higher temperature were evaluated using the same procedure employed at lower temperature. The 2D surface profile shown in FIG. 38 again shows that the presence of the hybrid particles in PAO significantly reduces both the wear track area and depth. Tables 3 and 4 summarize the surface roughness (Ra) values and wear volume data deduced from the images in FIG. 38. It is evident from the Table that whereas all samples display increased surface roughness and wear volume at the higher temperature, the lowest increases in all characteristics of wear are observed for the PAO-NOHMs composite with 45 wt % NOHMs loading.

In this example, it was demonstrated that silica ($SiO_2$) nanoparticles densely grafted with amphiphilic organic chains can be homogeneously dispersed in PAO base oils to form stable nanoscale organic-inorganic hybrid lubricants at both low and high particle loadings. A PAO-XNIMs composite with 60 wt % XNIMs was simultaneously shown to lower the interfacial friction coefficient, enhance wear and mechanical characteristics, and yield nanocomposite lubricants that exhibit superior stability to PAO or its nanocomposites created at low nanoparticle loadings. Similar effects were demonstrated for a PAO-NOHMs composite with 45 wt % NOHMs, but in this case, the interfacial properties of the composite material also display attractive thermal stability. Physical and chemical analysis of the wear track using profilometry and energy dispersive X-ray spectroscopy shows that the antiwear benefits of the NOHMs and XNIMs stem from their ability to deposit in the wear track and reinforce the interface between approaching solids at high sliding speeds. Therefore, it was concluded that PAO-NOHMs composite and PAO-XNIMs composite are good systems for delivering enhanced lubrication performance and wear resistance in demanding applications. Finally, based on the simplicity of the synthesis of the PAO-NOHMs and PAO-XNIMs composite lubricants and the large libraries of nanoparticles, lubricant base oils, tethered polymer chemistries, molecular weights, and architectures that can be employed, it is expected this lubricant platform will find broad applicability in formulations that will deliver attractive interface stability, without compromising higher tolerances demanded in high-performance machines.

Example 12

High lithium transference number, $t_{Li+}$, electrolytes are desired for use in both lithium-ion and lithium metal rechargeable battery technologies. Historically, low $t_{Li+}$ electrolytes have hindered device performance by allowing ion concentration gradients within the cell, leading to high internal resistances that ultimately limit cell lifetime, charging rates, and energy density. Herein, we present an electrolyte with high $t_{Li+}$ that is a charged, nanoporous network created by the dense loading of nanoparticles cofunctionalized with neutral organic ligands and tethered lithium salts. Modification of the tethered anion chemistry from $—SO_3^-$ to $—SO_3BF_3^-$ allows for enhanced ion pair dissociation, and thus higher ionic conductivities, even with use of tetraglyme, a low dielectric constant medium, as the liquid solvent. At particle volume fractions of 0.15, the electrolyte exists as a self-supported, nanoporous gel with optimum ionic conductivities of $10^{-4}$ S/cm at room temperature. Galvanostatic polarization measurements on symmetric lithium metal cells containing the nanoparticle-based electrolyte find the cell short circuit times to be inversely proportional to the squared value of the applied current density ($t_{sc}:J^{-2}$) as previously predicted for traditional polymer-in-salt electrolytes with low $t_{Li+}$, suggesting that use of electrolytes with $t_{Li+} \approx 1$ may indeed result in non-dendritic lithium plating.

Figure 39:
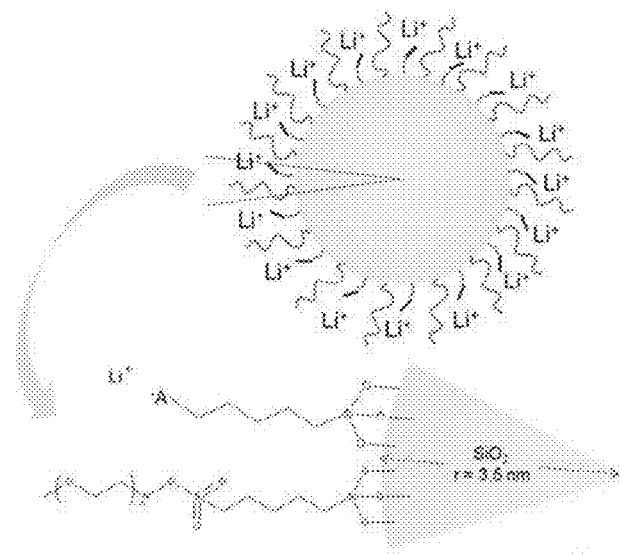
FIG. 39 is an example of a schematic of the nanometric lithium salt, where A- is $-SO_3^-$ or $-SO_3BF_3^-$. The total number of $Li^+$ is about 190 per nanocore.

In, this example, the physical properties of such a charged, 3-dimensional, nanoporous electrolyte are demonstrated and these show that the condition $t_{Li+} \approx 1$ can be facilely achieved in such systems without compromising conductivity. Shown in FIG. 39, the nanoscale lithium salt used in the current study is composed of a $SiO_2$ nanoparticle core co-functionalized with polyethylene glycol (PEG) ligands and a tethered —$SO_3^-$ or —$SO_3BF_3^-$ anion coupled to Li$^+$. Each 7 nm silica core is decorated with 2.4 attached groups per nm$^2$, equating to around 190 each of the tethered anions and PEG chains on a single nanoparticle. The role of the PEG ligands is multifold—to improve dissociation of Li$^+$ from the tethered anion, to limit aggregation of the silica nanocores even at high particle loadings, and to improve dissolution of the large salt into the chosen electrolyte media, tetraglyme, employed in this example. Molar mass per unit charge of the anionic nanoparticles are over 2200 g/mol/unit charge. This is roughly 8 times larger than the molar mass per unit charge ratio of the highly studied TFSI$^-$ anion. With straightforward modifications, the method can be adapted to produce nanoparticle-based lithium salts, and thus charged, 3-D nanoporous networks, with any of the typical anions used in lithium batteries tethered to nanoparticles of chosen size. At sufficiently high loadings and in media with a sufficiently high dielectric constant, even free anions in the electrolyte could be electrostatically excluded from the nanochannels between particles to enhance $t_{Li+}$.

EXPERIMENTAL

Synthesis.

The SiO$_2$—SO$_3$Li nanoparticles were synthesized via condensation of a silane terminated sulfonic acid, (3-trihydoxylsilyl)-propane sulfonic acid, with nanoscale silica (Ludox SM-30, Aldrich) as described previously, followed by titration with an amine terminated polyethylene glycol methyl ether ($M_n$=800, Polymer Source) and LiOH (Aldrich). The SiO$_2$—SO$_3$Li electrolytes were prepared via dissolution of the dried nanoparticle salt in chloroform, addition of an appropriate amount of tetraethylene glycol dimethyl ether (TEGDME, Aldrich), and drying first in a convection oven and then under vacuum. The amount of TEGDME was varied to change the nanoparticle content, reported as silica volume fraction, $\phi$. The SiO$_2$—SO$_3$BF$_3$Li electrolytes were prepared under argon atmosphere via dissolution of the dried nanoparticle salt in chloroform, addition of trifluoroboron diethyl ether, BF$_3$OEt$_2$ (Aldrich), in an amount stoichiometric to Li, and an appropriate amount of TEGDME, followed by drying; a similar procedure has been employed previously for modification of related functional groups. No additional salt, other than the functionalized nanoparticles as displayed in FIG. 39 used to create the nanoporous network, was added to the electrolytes in this study.

Characterization.

NMR was performed on solutions of electrolytes, $\phi$=0.15, in chloroform with varying amounts of BF$_3$OEt$_2$ with an 1NOVA 600 spectrometer. Ionic conductivity was measured with a Novacontrol Dielectric spectrometer fitted with a Quatro temperature control system. Electrochemical measurements were performed using a Solartron CellTest model potentiostat. Impedance measurements were conducted using a Solartron Frequency Response Analyser (Model 1252) at frequencies ranging from 2 kHz to 900 mHz and at an amplitude of 10 mV. Galvanostatic polarization measurements were performed using a Neware CT-3008 battery tester. Symmetric lithium coin cells for electrochemical stability, impedance, and glavanostatic polarization measurements were prepared in a MBraun glovebox. Each coin cell contained a Teflon donut ring, I.D.=0.25" and thickness=0.030", that was charged with the gel electrolyte under investigation. All coin cell measurements were performed at room temperature (18° C.).

$^{11}$B and $^{19}$F NMR.

Figure 40:
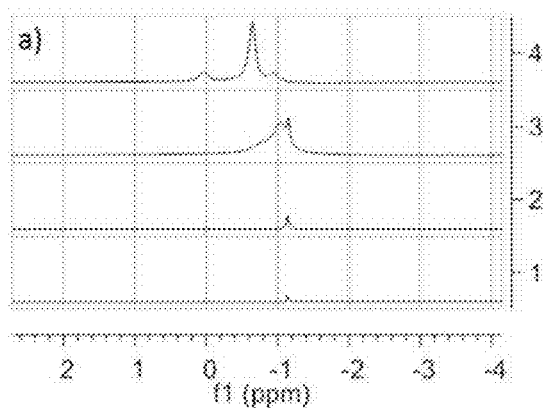
FIG. 40 shows a) $^{11}$B-NMR and b) $^{19}$F-NMR of electrolytes in chloroform.
Figure 40:
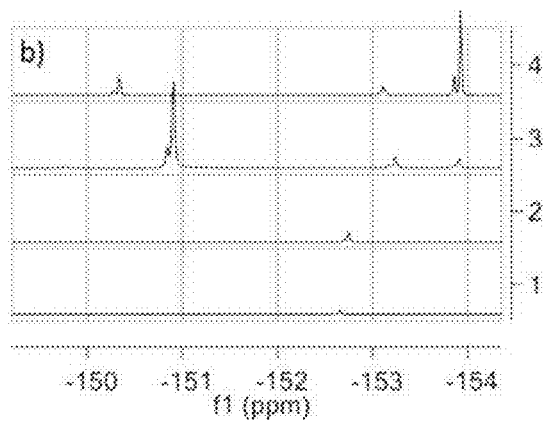

$^{11}$B and $^{19}$F NMR confirm the chemical modification of SiO$_2$—SO$_3$Li to SiO$_2$—SO$_3$BF$_3$Li, as performed on solutions of electrolytes, $\phi$=0.15, in chloroform with varying amounts of BF$_3$OEt$_2$, as shown in FIGS. 40(a) and 40(b). Systems 1 and 2 were synthesized from the SiO$_2$—SO$_3$Li salt with 50% and 100% stoichiometric equivalents, respectively, of BF$_3$OEt$_2$ with respect to sulfonate anion number. System 3 was synthesized with 100% stoichiometric equivalents of BF$_3$OEt$_2$ (to produce the SiO$_2$—SO$_3$BF$_3$Li salt) and additional 400% stoichiometric equivalents of BF$_3$OEt$_2$ were added to the measurement solution. System 4 is only BF$_3$OEt$_2$ in solution. As shown in FIGS. 40(a) and 40(b), only one peak is visible in systems containing only 50% and 100% stoichiometric amounts, no excess, of the additive. In addition, all peaks in the $^{19}$F-NMR spectra are split 1:4, correlating with the natural abundancy of $^{10}$B:$^{11}$B, indicating that all fluorine atoms remain bonded to boron. This knowledge, combined with chemical intuition of the chemistries involved, suggests that BF$_3$OEt$_2$ has chemically combined with —SO$_3^-$ to form —SO$_3$BF$_3^-$ and OEt$_2$ byproduct. The low molecular weight byproduct and any unreacted BF$_3$OEt$_2$ is likely removed during vacuum drying, the final step in the electrolyte preparation process.

Ionic Conductivity.

Figure 41:
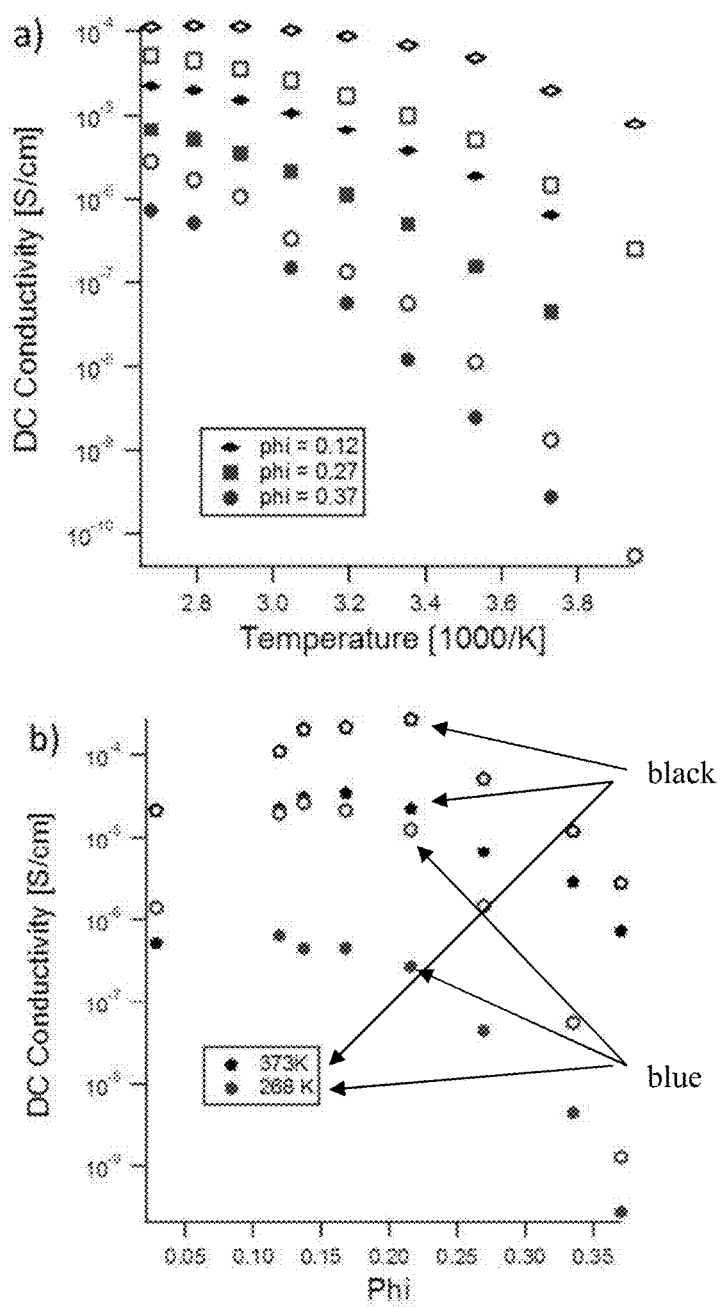
FIG. 41 shows and example of DC conductivity for electrolytes containing nanometric $SiO_2$—$SO_3Li$ salt [closed symbols] and $SiO_2$—$SO_3BF_3Li$ salt [open symbols] in tetraglyme as a function of temperature (a) and composition (b).

Temperature-dependent ionic conductivity for electrolytes containing SiO$_2$—SO$_3$Li and SiO$_2$—SO$_3$BF$_3$Li at selected loadings is reported in FIG. 41(a). The anion modified with BF$_3$OEt$_2$ has improved ionic conductivity over the entire investigated temperature range. Interestingly, the effect of temperature on ionic conductivity of electrolytes containing the SiO$_2$—SO$_3$BF$_3$Li salt is reduced as shown by a reduction in the relative change in conductivity over a given temperature range. Ionic conductivity is nearly temperature invariant from 50-100° C. in electrolytes with certain SiO$_2$—SO$_3$BF$_3$Li loadings. FIG. 41(b) reports the ionic conductivity of electrolytes with varying nanoparticle concentrations, in terms of silica volume fraction, $\phi$, at selected isotherms. It is apparent from the results that there is an optimum composition for achieving electrolytes with improved ionic conductivity. This behavior is analogous to the optimum salt composition observed in conventional liquid electrolytes and reflects a balance between an increase in the mobile ion concentration that accompanies addition of more salt, and the reduced mobility of ions as ionic interactions reduce fluidity. The highest room temperature (25° C.) ionic conductivity, $\sigma$=1×10$^{-4}$ S/cm, is observed for the electrolyte containing the SiO$_2$—SO$_3$BF$_3$Li salt at a loading of $\phi$≈0.15. At this composition, the charged nanoparticles strongly interact and the electrolyte exists as a gel with a yield stress greater than that of gravity.[16,17] The large majority of the ionic conductivity, therefore, is expected to be due to the mobility of Li$^+$.

Electrochemical Stability.

Figure 42:
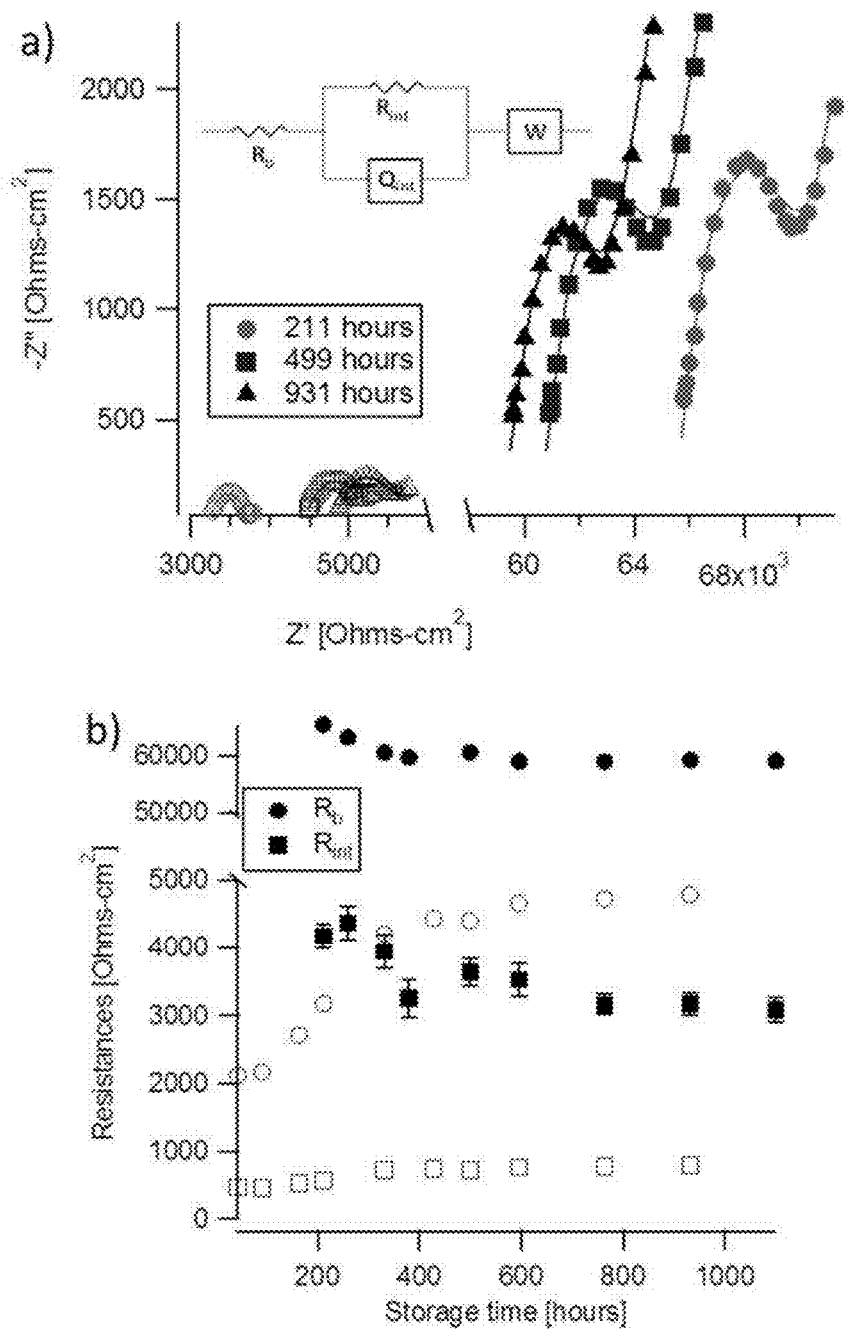
FIG. 42 shows and example of (a) Impedance response of Li/electrolyte/Li cells containing nanometric $SiO_2$—$SO_3Li$ salt [closed symbols] and $SiO_2$—$SO_3BF_3Li$ salt [open symbols] as fit to an equivalent circuit model and (b) Resistances as a function of time as determined from the equivalent circuit model.
Figure 43:
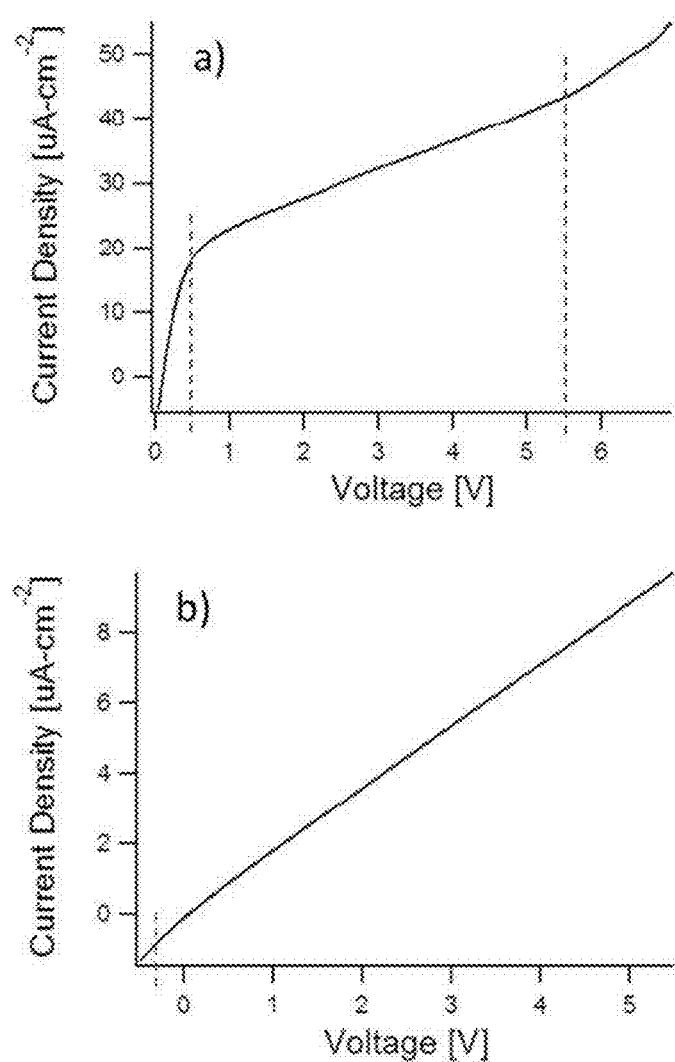
FIG. 43 shows electrochemical stability windows of electrolyte containing nanometric (a) $SiO_2$—$SO_3BF_3Li$ salt and (b) $SiO_2$—$SO_3Li$ salt, as measured in a symmetric Li/electrolyte/Li coin cell configuration.

To characterize the electrochemical stability of the electrolytes, impedance spectroscopy was performed for a representative material with salt concentration $\phi$=0.15, in a symmetric Li/electrolyte/Li coin-cell configuration. FIG. 42(a) shows the impedance response at various intervals in time; the points are the data and lines are fits to the equivalent circuit model in the inset where $R_b$ is the bulk electrolyte resistance, $R_{int}$ is the interfacial re-sistance, $Q_{int}$ is the corresponding constant phase element capacitance, and W is the Warburg diffusion element. FIG. 42(b) summarizes the magnitude of the bulk and interfacial resistances, which approach steady-state values over a 1000-hour evaluation period. Consistent interfacial resistances and impedance response means that a stable solid electrolyte interfacial (SEI) layer is formed with metallic lithium. Electrolytes containing SiO$_2$—SO$_3$BF$_3$Li have both lower interfacial and bulk resistances. In contrast, electrolytes with SiO$_2$—SO$_3$Li have a wider electrochemical window, −0.3 to over 6 V, versus 0.4 to 5.5 V for electrolytes containing SiO$_2$—SO$_3$BF$_3$Li (FIGS. 43(a) and 43(b)). As shown in our earlier work, these wide electrochemical stability windows are characteristic of oligoglycol-based electrolytes.

Mobile Ion Concentration.

Mobile ion concentration, or the fraction of $Li^+$ dissociated from the $SiO_2$—$SO_3BF_3^-$ anion, was determined using dielectric spectroscopy measurements and a recently proposed model that analyses electrode polarization in single-ion conductors of low conductivity. For a single-ion conductor, the ratio of the dielectric loss to storage, $\tan(\delta)=\epsilon''/\Sigma'$, measured at an angular frequency $\omega$, can be shown to be a function of the mobile ion concentration through the formula, $$\tan(\delta) = \frac{\omega \tau_{EP}}{1 + \omega 2\tau 2_{EP}/M},$$

where $\tau_{EP}$ is the electrode polarization relaxation time and M is the ratio of the sample thickness, L, to twice the Debye length. Mobile ion concentration, $p_0$, can then be determined by $$p_0 = \frac{\sigma_0}{q\mu},$$

where $\sigma_0$ is Luc ii conductivity, q is the charge of a monovalent cation, and the mobility $$\mu = \frac{qL^2}{4M\tau_{EP}kT}.$$

Figure 44:
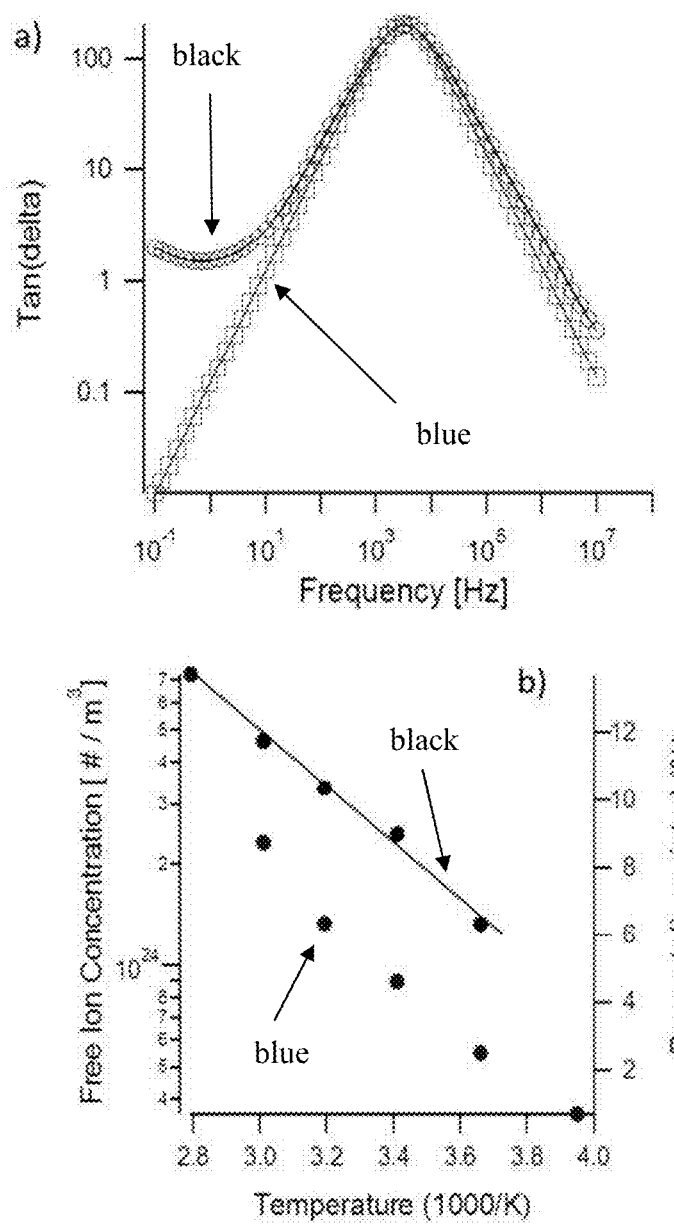
FIG. 44 shows (a) Frequency dependence of tan δ, experimental [black] and fit [blue] and (b) subsequently calculated mobile ion concentration as a function of temperature of a $SiO_2$—$SO_3BF_3Li$ electrolyte, φ=0.17.

FIG. 44(a) displays the frequency dependence of $\tan(\delta)$ as obtained at 0° C.; the fit to this data as obtained using the Origin® nonlinear curve fitting routine is displayed in blue. The calculated mobile ion concentration of the electrolyte containing the nanometric $SiO_2$—$SO_3BF_3Li$ salt at $\phi=0.17$ obtained by performing these measurements at multiple temperatures is shown in FIG. 44(b). The mobile ion concentration is seen to display Arrhenius temperature dependence at temperatures above the phase transition temperature of the electrolyte ($T_c=-18°$ C. by DSC measurements). The overall magnitude of the free ion concentration is high with respect to what has previously been determined for polymer electrolytes containing sulfoisophthalate anions, likely due to the specific chemical and steric features of the $SiO_2$—$SO_3BF_3^-$ linkage and to the affinity of PEG for $Li^+$. It is known that this latter attribute can lead to PEG-wrapped $Li^+$ ions, which enhances the ability of these ions to disassociate from their counterions.

Lithium Plating Via Galvanostatic Polarization and Determination of Lithium Transference Number.

Galvanostatic polarization measurements were conducted to investigate the efficiency of lithium plating from the nanoporous $SiO_2$—$SO_3BF_3Li$ based electrolyte. Previous reports find the short circuit time $t_{sc}$ of symmetric lithium cells containing a polymer-in-salt electrolyte to follow the relationship:

$$t_{sc} \propto \tau_s = \pi D\left(\frac{eC_0}{2Jt_a}\right)^2,$$

where $\tau_s$ is Sand's time, a function of the ambipolar diffusion coefficient D, ion concentration $C_0$, current density J, and the anion transference number $t_a$. In a single-ion conducting electrolyte, $t_a \rightarrow 0$ and $t_{sc}$ diverges. For non-zero values of $t_a$, the time required for growth of the dendrite across of the cell ($\tau_g$) should also be considered so that $t_{sc} \propto \tau_s + \tau_g$. As previous optical measurements indicate that dendrite grow at a velocity $v=\mu_a E$, where E is the electric field and $E=J/\sigma$, the time for dendrite growth may be approximated as $$\tau_g = \frac{\mu_a J}{\sigma}.$$

Knowledge of the mobile ion concentration in conjunction with ionic conductivity data allows for the calculation of the ambipolar diffusion coefficient, D. Table 5 displays the mobile ion concentration and resulting diffusivity at 18° C. of an electrolyte containing the nanometric $SiO_2$—$SO_3BF_3Li$ salt at $\phi=0.15$ for two cases: in case 1, the mobile ion concentration is as calculated by the fit to the electrode polarization model that assumes negligible anionic mobility; in case 2, the mobile ion concentration is assumed to be the limit where complete ion dissociation exists and all Li in the system is free. The magnitude of D is higher in case 1 than D in an equivalent concentration of LiTFSI in TEGDME, where the Li salt is believed to be fully dissociated. This suggests that if the electrode polarization model is applicable to this system, diffusion of $Li^+$ is by a different mechanism, such as hopping between the anion sites available on the nanoparticles rather than diffusion in concert with the TEGDME molecules.

TABLE 5

Ambipolar diffusion coefficient, D, as a function of mobile ion concentration, $C_0$.

| Case | $C_0$ (#/$m^3$) | D ($m^2$/s) |
| --- | --- | --- |
| 1 | $9.4 \times 10^{23}$ | $2.1 \times 10^{-9}$ |
| 2 | $5.3 \times 10^{25}$ | $3.7 \times 10^{-11}$ |

Figure 45:
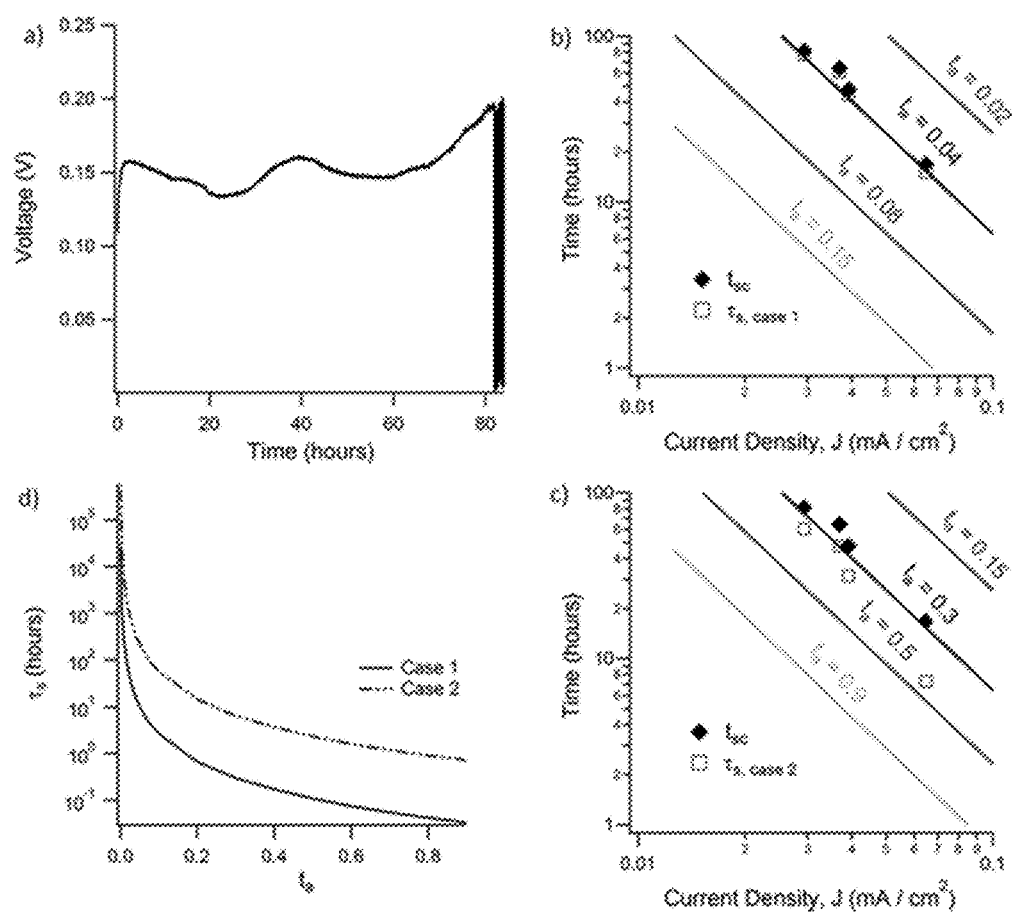
FIG. 45 shows a) Galvanostatic polarization measurement on a Li/$SiO_2$—$SO_3BF_3Li$ electrolyte, φ=0.15/Li coin cell, J=0.0294 mA/cm$^2$, to determine short circuit time $t_{sc}$. Summary of galvanostatic polarization measurements at varying current densities compared to predicted $\tau_s$, considering variables as in b) case 1 and c) case 2.

The short circuit time $t_{sc}$ for symmetric lithium metal cells containing the $SiO_2$—$SO_3BF_3Li$ electrolyte, $\phi=0.15$, were determined from a sharp drop in potential vs. time diagrams, example in FIG. 45(a). FIGS. 45(b) and 45(c) show the relationship between $t_{sc}$ and current density J, as well as lines displaying predicted $\tau_s$ for electrolytes with the same parameters as in case 1 and case 2, respectively, with varying $t_a$. Notably, $t_{sc}:J^{-2}$, as predicted. By substituting the relevant values for case 1 for the other variables in $\tau_s$, assuming that $t_{sc}=\tau_s$, calculating $t_a$, using this value to determine $\tau_g$, modifying the value of $\tau_s$, and iterating until convergence, we find $t_{Li+}\approx 0.96$ for this system. The converged values of $\tau_s$ for case 1, after accounting for predicted $\tau_g$, are displayed in FIG. 45(b); the maximum error was less than 10%. The same approach was applied to case 2, however, $\tau_g$ was determined to be much longer under these conditions. After accounting for $\tau_g$ in the first iteration, $\tau_s$ was not proportional to $J^{-2}$, and further iteration was not possible to determine $t_a$ under these conditions. At a first approximation, $t_{Li+}\approx 0.7$ for case 2. For comparison purposes, voltastatic polarizations were also performed to determine $t_{Li+}$ of this system; these measurements predicted $t_{Li+}\approx 0.6-0.9$. FIG. 45(d) shows the asymptotic effect of $t_a$ on $t_{sc}$, making it clear that to achieve electrolytes with substantially larger $t_{sc}$ based on suppressing of $t_a$ alone will require improvements in the salt and electrolyte chemistry to facilitate a combination of good ion pair dissociation, high ionic conductivity, and $t_a \rightarrow 0$.

In summary, a facile route towards single-ion conducting electrolytes based on nanometric lithium salts that at high particle loadings create charged, nanoporous networks is described. By tethering organic counteranions to nanoparticles, electrolytes with reasonable ionic conductivity ($1\times10^{-4}$ S/cm) at room temperature and high lithium transference number were demonstrated.

What is claimed is:

1. A composition comprising:
   a) a plurality of organic-hybrid silica nanoparticles, the individual nanoparticles comprising a silica core and an organic polymeric corona comprising amphiphilic polymer chains having at least one alkyl amino moiety, the alkyl moiety of the alkyl amino moiety having 2 to 18 carbon atoms, with a molecular weight of 100 g/mol to 50,000 g/mol, the individual amphiphilic polymer chains of the organic polymeric corona covalently bonded to the silica core; and
   b) a carrier selected from a hydrogenated organic poly(α-olefin) oligomer (PAO), a fatty acid, and combinations thereof,
   wherein the organic-hybrid silica nanoparticles are dispersed in the carrier and do not exhibit observable aggregation and/or phase separation.

2. The composition of claim 1, wherein the organic-hybrid silica nanoparticles are present at 0.1% by weight to 75% by weight.

3. The composition of claim 1, wherein the organic-hybrid silica nanoparticles have a silica nanoparticle core having a diameter of 3 nm to 100 nm.

4. The composition of claim 1, wherein the volume fraction of the nanoparticles is 0.02 to 0.5.

5. The composition of claim 1, wherein the hydrogenated organic poly(α-olefin) oligomer has a molecular weight of 100 g/mol to 50,000 g/mol.

6. The composition of claim 1, wherein the hydrogenated organic poly(α-olefin) oligomer is an oligomer of a C2 to C12 α-olefin.

7. A method of lubricating a mechanical device comprising disposing a composition of claim 1 between two surfaces such that the coefficient of sliding friction between the surfaces is reduced.

8. The method of claim 7, wherein the composition of claim 1 is present as a thin film.

9. A device comprising the composition of claim 1.

10. The device of claim 9, wherein the device is a digital light processing instrument, engine, escalator, moving platforms, wind turbine, wind mill, magnetic hard Disk drives, microelectromechanical system, or automated syringe.

* * * * *